US012376523B2

(12) United States Patent
Dondeyne et al.

(10) Patent No.: US 12,376,523 B2
(45) Date of Patent: Aug. 5, 2025

(54) METHOD AND APPARATUS FOR AUTOMATICALLY PICKING A FRUIT

(71) Applicant: OCTIVA BELGIUM BV, Leuven (BE)

(72) Inventors: Pieter Dondeyne, Heverlee (BE); Dries Gielis, Everberg (BE); Tom Coen, Zemst (BE)

(73) Assignees: OCTIVA BELGIUM BV, Leuven (BE); OCTIVA GROUP B.V., De Lier (NL)

( * ) Notice: Subject to any disclaimer, the term of this patent is extended or adjusted under 35 U.S.C. 154(b) by 893 days.

(21) Appl. No.: 17/056,865

(22) PCT Filed: Apr. 26, 2019

(86) PCT No.: PCT/IB2019/053441
§ 371 (c)(1),
(2) Date: Nov. 19, 2020

(87) PCT Pub. No.: WO2019/224627
PCT Pub. Date: Nov. 28, 2019

(65) Prior Publication Data
US 2021/0337733 A1 Nov. 4, 2021

(30) Foreign Application Priority Data

May 22, 2018 (BE) .................................. 2018/5327
Sep. 21, 2018 (BE) .................................. 2018/5651

(51) Int. Cl.
*A01D 46/30* (2006.01)
*B25J 9/16* (2006.01)
*B25J 15/08* (2006.01)

(52) U.S. Cl.
CPC ............ *A01D 46/30* (2013.01); *B25J 9/1612* (2013.01); *B25J 15/08* (2013.01)

(58) Field of Classification Search
CPC ....... A01D 46/30; B25J 9/1612; B25J 15/024; B25J 15/08
See application file for complete search history.

(56) References Cited

U.S. PATENT DOCUMENTS 10,464,217 B1 * 11/2019 Phan ........................ B25J 15/10
10,602,664 B1 * 3/2020 Stubbs .................... B25J 9/1697
(Continued)

FOREIGN PATENT DOCUMENTS

BE 1023881 B1 9/2017
BE 1023905 B1 9/2017
(Continued)

OTHER PUBLICATIONS

Search Report from corresponding BE Application No. BE201805327, Jan. 10, 2019.
(Continued)

*Primary Examiner* — Matthew Troutman
*Assistant Examiner* — Ashley A Kaercher
(74) *Attorney, Agent, or Firm* — Workman Nydegger

(57) ABSTRACT

An improved method and apparatus for automatically picking a fruit is described. During the clamping stage, the movement of the fingers is controlled such that a specific maximum clamping force is not exceeded. In addition, during at least a part of the removal stage, the mutual position of the fingers is controlled by the drive such that their mutual distance does not increase.

25 Claims, 23 Drawing Sheets

(56) References Cited

U.S. PATENT DOCUMENTS

| | | | |
|---|---|---|---|
| 2016/0073584 A1* | 3/2016 | Davidson | A01D 46/30 |
| | | | 294/198 |
| 2017/0105346 A1* | 4/2017 | Davidson | A01D 46/30 |
| 2019/0160692 A1* | 5/2019 | Miyazaki | B25J 15/0009 |
| 2020/0008355 A1* | 1/2020 | Nir | A01G 3/0335 |
| 2020/0323140 A1* | 10/2020 | Gielis | A01D 46/24 |
| 2021/0337733 A1* | 11/2021 | Dondeyne | B25J 9/1612 |
| 2022/0142050 A1* | 5/2022 | Chen | B25J 9/162 |
| 2022/0346319 A1* | 11/2022 | Kim | B25J 15/0052 |
| 2023/0068237 A1* | 3/2023 | Knopf | G06T 7/70 |

FOREIGN PATENT DOCUMENTS

| | | | | | |
|---|---|---|---|---|---|
| BE | 20175187 | B1 | | 11/2017 | |
| BE | 20175889 | B1 | | 7/2019 | |
| CN | 202009581 | U | | 10/2011 | |
| CN | 105479472 | A | * | 4/2016 | A01D 46/30 |
| CN | 106233938 | A | * | 12/2016 | A01D 46/30 |
| CN | 107593113 | A | | 1/2018 | |
| CN | 108207332 | A | * | 6/2018 | A01D 46/30 |
| CN | 108271533 | A | * | 7/2018 | A01D 46/30 |
| CN | 108370723 | A | * | 8/2018 | A01D 46/24 |
| CN | 108811763 | A | * | 11/2018 | A01D 46/264 |
| CN | 108908308 | A | * | 11/2018 | A01D 46/30 |
| CN | 108966842 | A | * | 12/2018 | A01D 46/30 |
| CN | 109479522 | A | * | 3/2019 | A01D 46/30 |
| CN | 109500834 | A | * | 3/2019 | A01D 46/30 |
| CN | 110122074 | A | * | 8/2019 | A01D 46/30 |
| CN | 111923073 | A | * | 11/2020 | |
| CN | 112136539 | A | * | 12/2020 | A01G 3/08 |
| CN | 112262658 | A | * | 1/2021 | A01D 46/30 |
| CN | 112335407 | A | * | 2/2021 | A01D 46/30 |
| CN | 112549065 | A | * | 3/2021 | A01D 46/30 |
| CN | 112606033 | A | * | 4/2021 | B25J 13/085 |
| CN | 112970428 | A | * | 6/2021 | A01D 46/30 |
| CN | 113183172 | A | * | 7/2021 | A01D 46/30 |
| CN | 115004948 | A | * | 9/2022 | |
| JP | 2012148380 | A | * | 8/2012 | |
| KR | 101717884 | B1 | | 3/2017 | |
| WO | 9625842 | A1 | | 8/1996 | |
| WO | WO-2016055552 | A1 | * | 4/2016 | A01D 46/24 |
| WO | 2018015416 | A1 | | 1/2018 | |
| WO | WO-2018087546 | A1 | * | 5/2018 | A01D 46/22 |
| WO | WO-2019224627 | A1 | * | 11/2019 | A01D 46/30 |
| WO | WO-2021178408 | A1 | * | 9/2021 | A01D 46/30 |

OTHER PUBLICATIONS

Search Report from corresponding BE Application No. BE201805651, May 6, 2019.

International Search Report and Written Opinion from PCT Application No. PCT/IB2019/053441, Aug. 1, 2019.

* cited by examiner

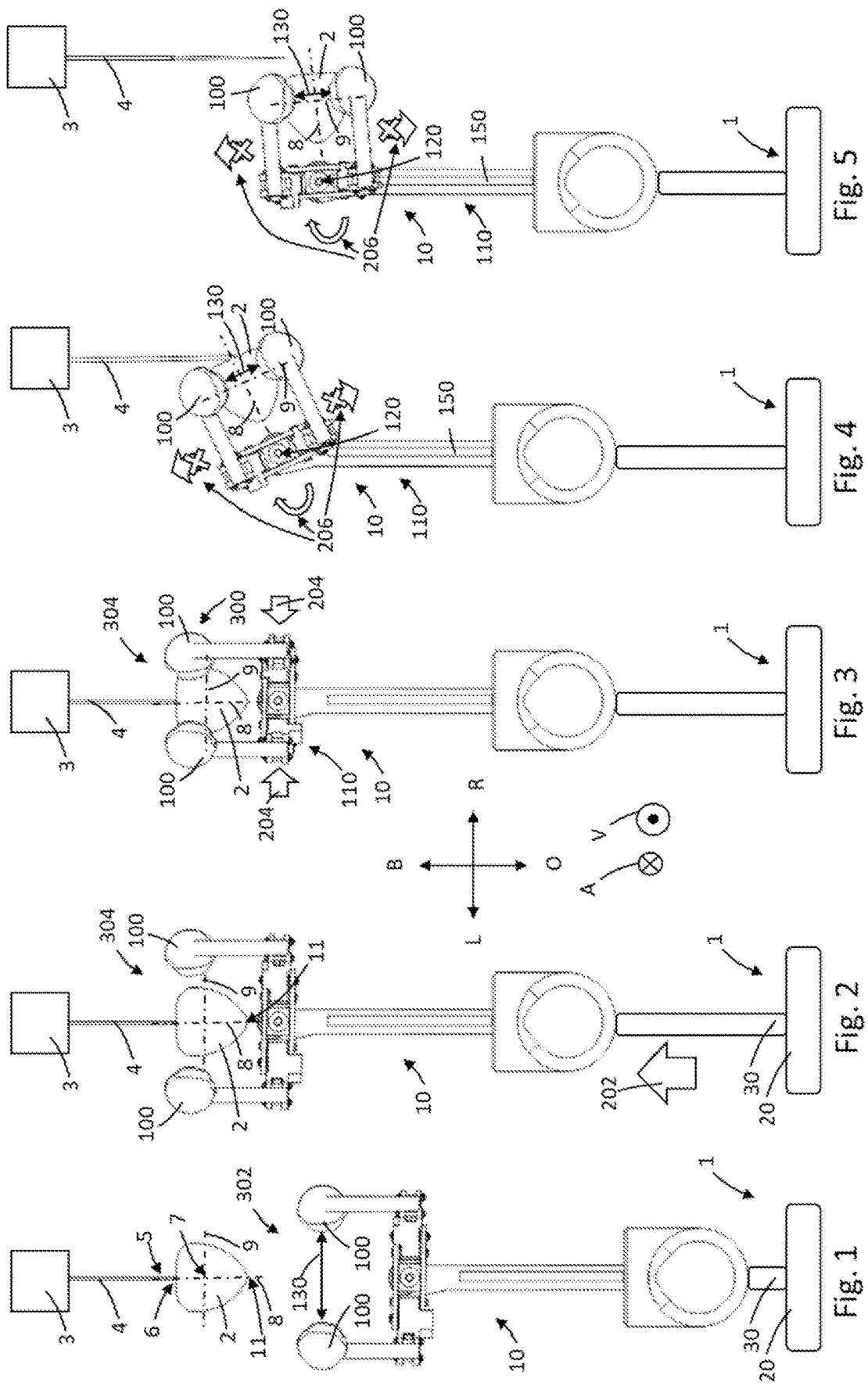

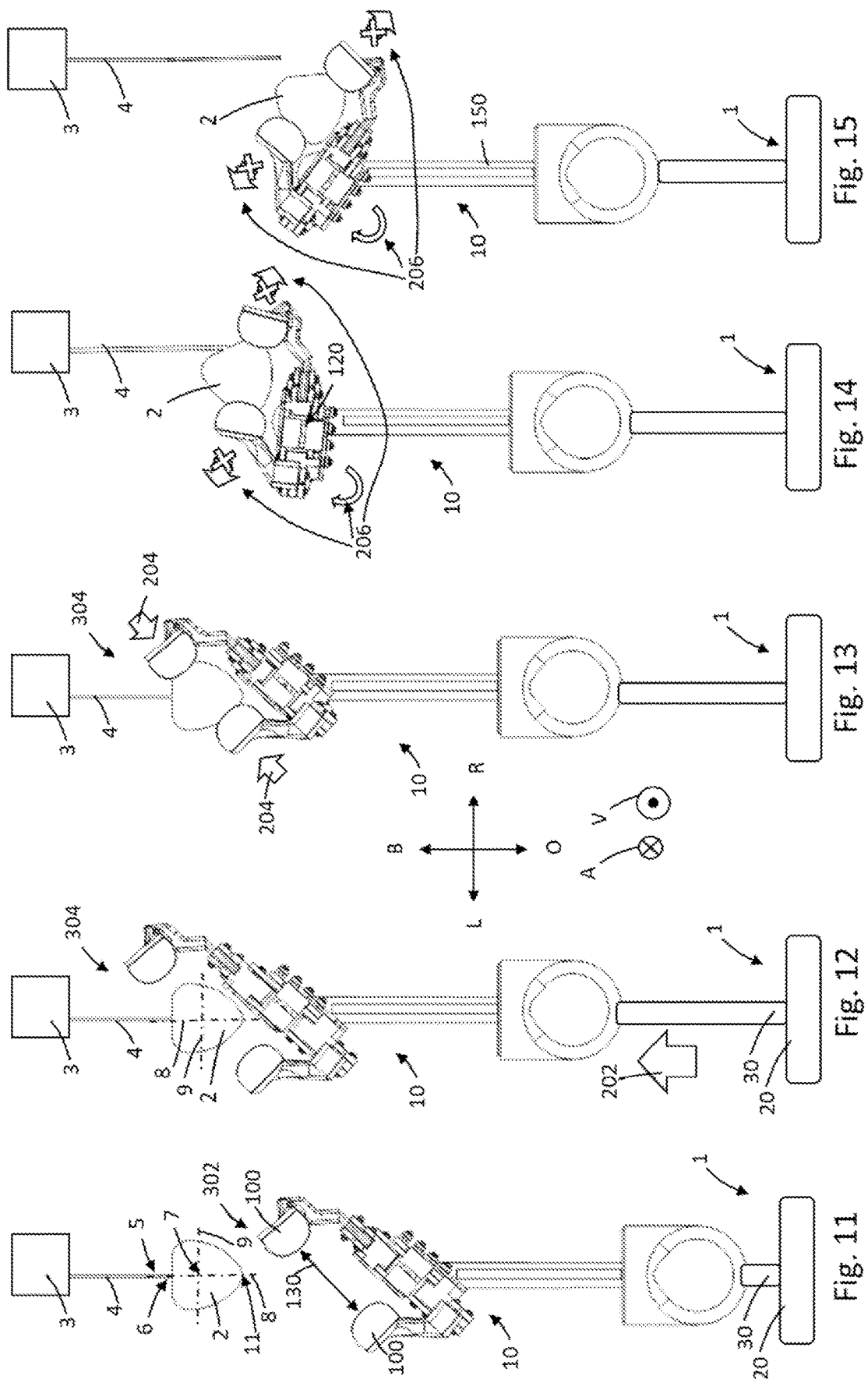

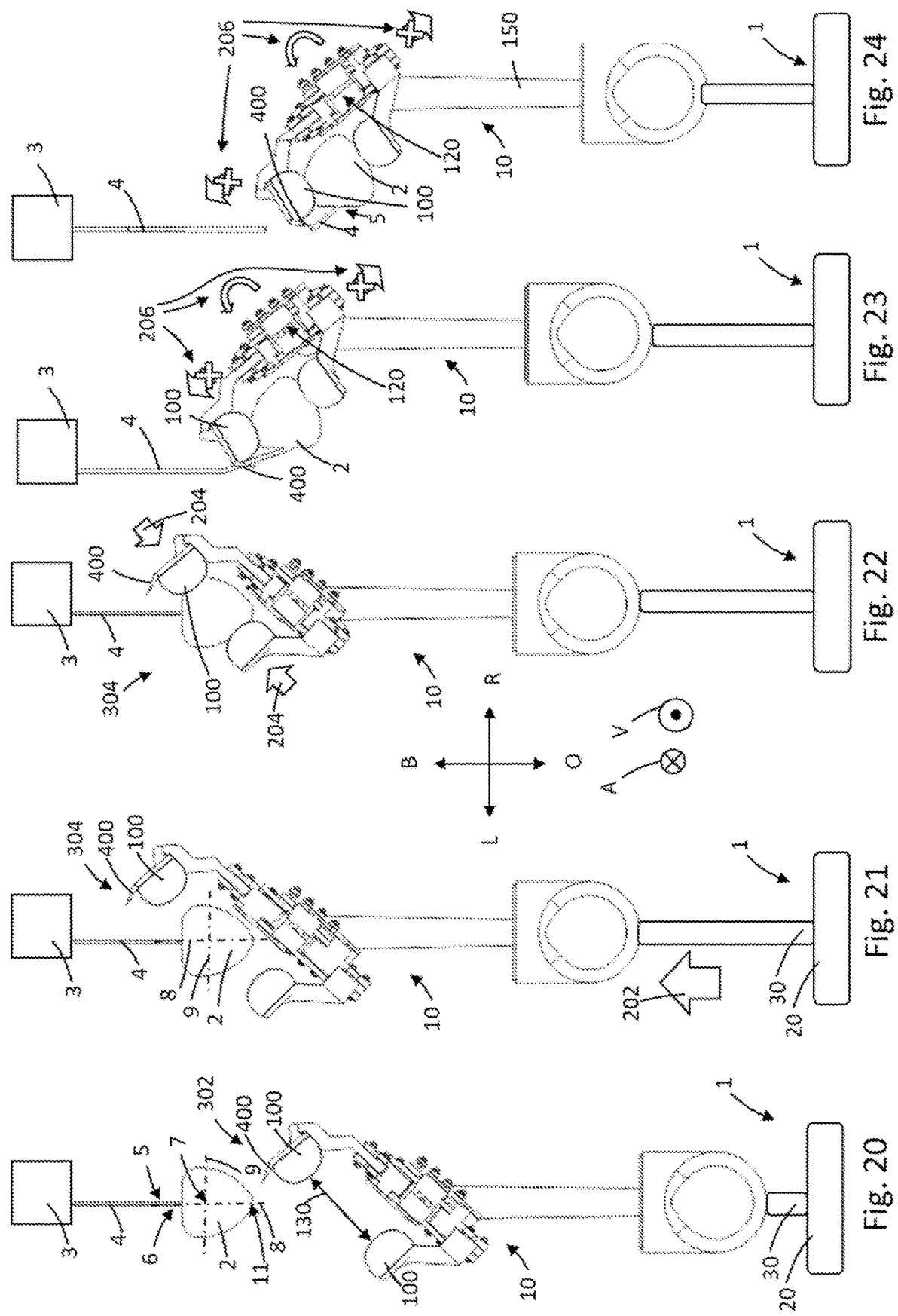

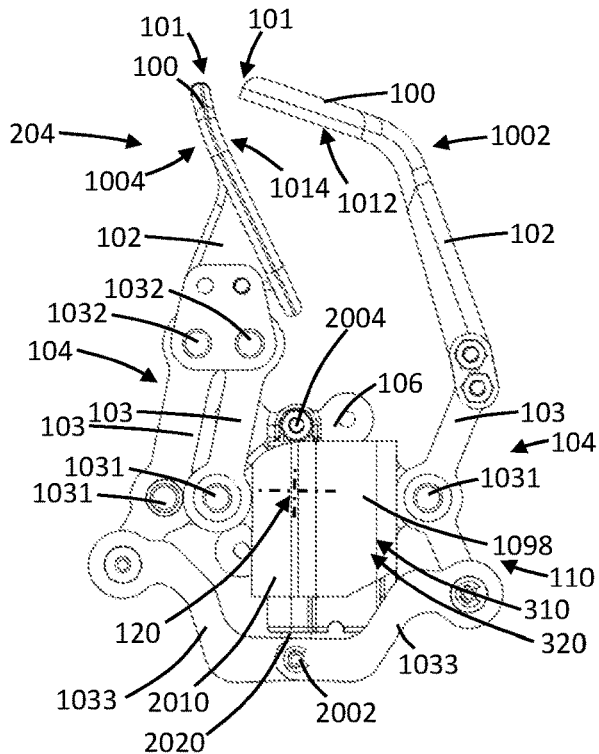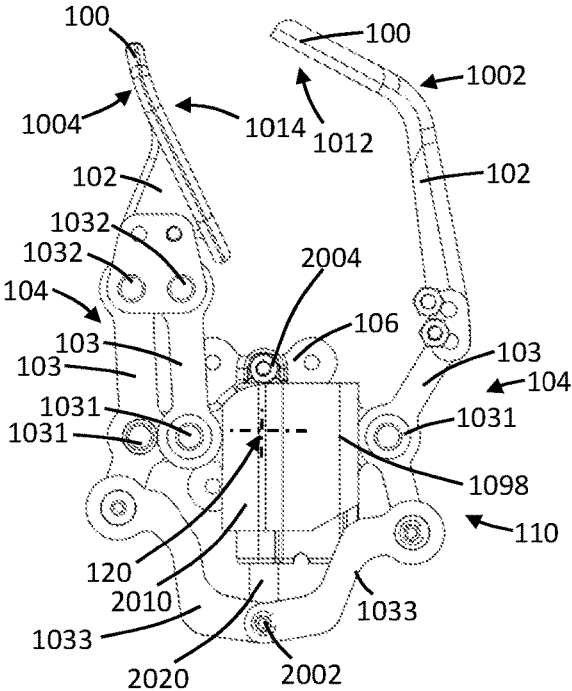
Fig. 35        Fig. 36
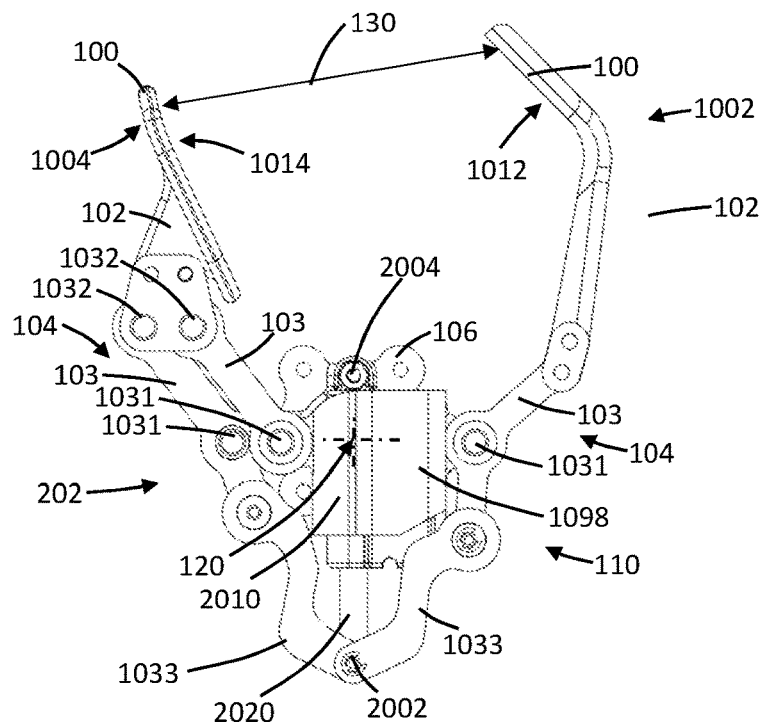
Fig. 37

METHOD AND APPARATUS FOR AUTOMATICALLY PICKING A FRUIT

FIELD OF THE INVENTION

The present invention relates to tools to be used in agriculture and horticulture, more specifically to devices for picking fruit.

STATE OF THE ART

A gripper mechanism for an apparatus for picking fruits or false fruits, in particular delicate fruits or false fruits, such as fruit or vegetables, such as strawberries, tomatoes, kiwi fruit, etc. is for instance known from previous applications by the applicant, such as the publications BE1023881, BE1023905, and pending patent applications BE2017/5187 and PCT/EP2017/068187 which are incorporated herein by way of reference. Such apparatus for instance comprise a robotic arm disposed on a movable platform to which robotic arm a gripper mechanism is attached for picking fruits. As described, such an apparatus may be provided with a suitable visual system or suitable optical or other sensors capable of determining the location of the fruit to be picked and subsequently by means of a suitable control of the suitable drives by means of a suitable controller, controlling the movable platform, the robotic arm and the gripper mechanism such that an automatic method for picking the fruit to be picked is realized.

In said previous patent applications a gripper mechanism for picking delicate fruits or false fruits is described, using at least two fingers to grab hold of the piece of fruit to be picked. In order to keep the pressure exerted on the fruit as low as possible during the picking of delicate fruits or false fruits, such as for instance strawberries, it is suggested to make use of a gripper mechanism having two or more fingers that is utilized in carrying out an automated method for picking, wherein this method comprises a rotary motion during picking the fruit.

Furthermore an embodiment of a gripper mechanism is described, wherein on the side facing the piece of fruit to be picked, the at least two fingers are provided with an elongated, elastic deformable surface, which surface is configured for upon contact with the piece of fruit to be picked, assuming a concave shape that at least partially follows the contour of the piece of fruit to be picked. This embodiment preferably comprises such a shape and suppleness along the exterior that it damages other fruits as little as possible, because with fruits growing in bunches or strings, such as for instance strawberries, contact with other fruits cannot always be prevented when approaching the fruit to be picked and moving back to the position where the fruit is to be deposited. Furthermore an embodiment is described wherein the elastic deformation properties of the surface can be controlled to a highly detailed extent by allowing the surface to support on a framework of synthetic material, which can be produced, for instance through additive manufacturing, also called 3D printing.

An alternative embodiment of a gripper mechanism including fingers for a device for picking a fruit is furthermore also known from pending patent application BE2017/5889 which is incorporated herein by way of reference. The gripper mechanism comprises fingers having a core consisting of a first material and an outer shell disposed around the core and consisting of a second cast synthetic material, wherein the second cast synthetic material has a hardness that is lower than the hardness of the first material. When the fingers are dimensioned relatively large and have to show sufficient elastic properties to be able to cater for sufficient variation in size of the various fruits to be picked, such a gripper mechanism provides an answer to the problem of the fingers still having to be able to show sufficient rigidity to avoid impermissible deformations during carrying out fast movements while picking, as a result of which for instance the fruit does not remain sufficiently clamped in the gripper mechanism during picking.

However, the need for an improved method for automatically picking such fruits remains, as well as for improved gripper mechanisms wherein the risks of impermissible deformations or uncontrolled movements of the fingers is reduced, in particular when performing fast automatic movements when picking delicate fruits or false fruits, such as for instance strawberries, tomatoes, kiwi fruit, raspberries, blackberries, etc. Furthermore, a need remains for an improved gripper mechanism which is capable of, to a sufficient extent, dealing with the variation in sizes of the various fruits to be picked, and which reduces the risk of contacting adjacent fruits during picking. This is particularly important in case of delicate fruits that hang in bunches or strings, such as for instance strawberries, vine tomatoes, cherry tomatoes, . . . . In addition, it is furthermore desired that the gripper mechanism is capable of reducing damage to the delicate fruits to be picked, and is also able, reliably and fast, to pick a larger variety in dimensions of the fruits to be picked. In addition, the wish remains to realize a simple, reliable and durable structure and operation of the gripper mechanism, preferably having minimal dimensions.

SUMMARY

For this purpose, according to a first aspect of the invention, a method is provided for automatically picking a fruit from a plant using an apparatus comprising a gripper mechanism comprising two or more mutually movable fingers, the method comprising:
- an approach stage, wherein the gripper mechanism is put into a clamping position, wherein the fingers are positioned next to the fruit to be picked for a subsequent clamping of the fruit to be picked, wherein while the gripper mechanism is in the clamping position, the fingers are mutually moved towards the fruit to be picked until they clamp the fruit; and
- a removal stage wherein the fruit clamped in the fingers is removed from the plant, Characterized in that
- during the clamping stage, the fingers are moved such that a specific maximum clamping force is not exceeded; and
- during at least a part of the removal stage, the mutual position of the fingers is controlled by the drive such that their mutual distance does not increase.

It is clear that during at least a part of the removal stage the mutual position of the fingers is controlled by the drive such that their mutual distance does not increase, even when a force exceeding the specific maximum clamping force is exerted on one or more of the fingers. It is clear that this means that the absolute value of the resulting force exerted on the one or more fingers exceeds the absolute value of the resulting force of the clamping force, and this when considered according to the direction of movement of the fingers and in the opposite direction.

That way delicate fruits can be picked fast and efficiently without risking impermissible damage as during the removal stage the fingers can be subjected to accelerations resulting in forces that are larger than the maximum clamping force.

It is furthermore clear that in the clamping position, the fingers are situated next to the fruit to be picked, so that in this clamping position, during the subsequent clamping stage, the fingers are able to clamp by a mutual movement of the fingers towards the fruit to be picked. In other words, in this clamping position the fingers are in this way close to, partially surrounding, on either side, on opposite sides, on different sides and/or partially around the fruit to be picked.

According to a second aspect of the invention, an apparatus is provided for automatically picking a fruit from a plant according to the method according to the first aspect of the invention, the apparatus comprising a gripper mechanism comprising two or more mutually movable fingers, Characterized in that the drive is configured such that:
during the clamping stage, the movement of the fingers is controlled such that a specific maximum clamping force is not exceeded;
during at least a part of the removal stage, the mutual position of the fingers is controlled by the drive such that their mutual distance does not increase.

It is clear that during at least a part of the removal stage the mutual position of the fingers is controlled by the drive such that their mutual distance does not increase, even when a force exceeding the specific maximum clamping force is exerted on one or more of the fingers.

According to a third aspect of the invention, an apparatus is provided wherein the gripper mechanism comprises the following:
a carrier to which the at least two mutually movable fingers are attached;
a basis to which the carrier is bearing mounted so as to be rotatable about a substantially horizontal axis of rotation, and wherein
considered from above, the fingers extend from the carrier with a longitudinal axis according to the direction of the axis of rotation and the fingers and are disposed on the carrier so as to be mutually movable via a movement mechanism.

Preferably the apparatus comprises a gripper mechanism which further comprises little arms configured for attaching the fingers to the carrier such that at least during the clamping stage the fingers contact the fruit at a position above the carrier and by an upward motion, from an approach position below a bottom end of the fruit, are put into the clamping position.

According to a fourth aspect of the invention a method is provided for automatically picking fruit wherein:
during the approach stage, by an upward motion, from an approach position below a bottom end of the fruit, the fingers are put into the clamping position; and wherein as early as in the approach position, considered from above, the fruit is in at least partial overlap with the space situated in between at least two of the fingers.

According to a fifth aspect of the invention, a method and apparatus is provided for automatically picking fruit, wherein the drive comprises one or more electromechanical linear actuators that have a static load capacity that is sufficiently high for preventing a mutual movement of the fingers (100), even when a force exceeding the specific maximum clamping force is exerted on one or more of the fingers (100), and wherein the one or more electromechanical linear actuators:
during the clamping stage, are controlled as one or more force determining drive elements; and
during at least a part of the removal stage, are controlled as one or more position determining drive elements.

Various advantageous embodiments are stated in the dependent claims and described in the description and figures.

In this application the term "fruit" is used in the broadest meaning, without being limited to the strictly botanical meaning of the term. "Fruit" also in particular includes false fruits such as strawberries, figs, rose hips and the like. "Fruit" moreover also includes fruits in the botanical sense of the word, which in everyday usage are classified as vegetables such as tomatoes, cucumbers and sweet peppers.

BRIEF DESCRIPTION OF THE DRAWINGS

A few embodiments will now be described by way of example on the basis of the figures wherein:
FIGS. 1-6 show various steps of an embodiment of a method for automatically picking a fruit from a plant using an embodiment of an apparatus with a gripper mechanism having two fingers;
FIGS. 11-15 show similar steps of an embodiment of a method, similar to FIGS. 1-5;
FIGS. 19-24 show even further alternative embodiments of a method and apparatus comprising a cutting element;
FIGS. 29-52 show further alternative embodiments of the apparatus.

DETAILED DESCRIPTION OF VARIOUS EMBODIMENTS

Figure 6:
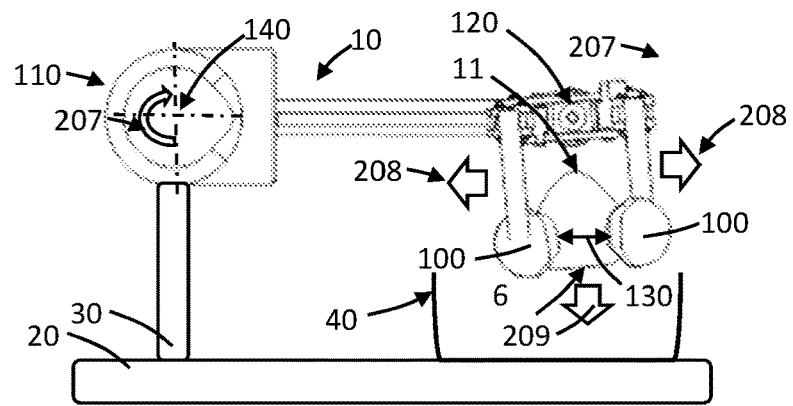

FIGS. 1-6 show various steps of an embodiment of a method for automatically picking a fruit 2 from a plant 3 using an embodiment of an apparatus 1 with a gripper mechanism 10 having two fingers 100. As can be seen, the fruit 2 hangs from a schematically shown plant 3 by a stalk 4. As indicated above, the method is particularly suitable for automatically picking fruits 2, including false fruits, such as strawberries. According to the embodiment shown, the fruit 2 for instance is a strawberry. The plant 3 for instance is a strawberry plant 3 which is cultivated in a conservatory at a certain level above the ground surface, for instance on suitable tables, trays or other nursery systems. As already described in more detail in for instance PCT/EP2017/068187, this allows the fruit to be detected and localized from below, for instance using a suitable camera system, suitable detectors, etc. in order for subsequently putting the apparatus 1 comprising the gripper mechanism 10 close to the fruit to be picked, for instance by means of a mobile base platform 20, which by means of suitable propelling means such as for instance wheels driven by a suitable controller, is able to move to the wanted position for carrying out the shown method for picking the fruit 2, as is also described in more detail in PCT/EP2017/068187, which is included here by way of reference.

It is clear that numerous alternative embodiments are possible, in particular in terms of the fruit 2 to be picked. As described further in more detail, the method is suitable for delicate fruits, which risk unwanted damage if too large a force is exerted during the method of picking. Additionally, the method is suitable for picking fruits 2 that hang from a plant 3 by a stalk 4, and in particular when the fruit 2 hangs substantially down from the end 5 of the stalk 4 to which the fruit is attached, similar to what is shown in FIG. 1. It is clear that alternative embodiments are possible, and that in particular the stalk 4 does not necessarily need to be positioned vertically as shown, any suitable angle, curvature, etc. of the stalk 4 is possible, as long as preferably the fruit 2 hangs from the end 5 of the stalk 4, in order for the center of gravity 7 of the fruit 2 to be situated below the point of attachment 6 of the end 5 of the stalk 4 to the fruit 2. In addition or supplementary to the above-mentioned fruits, including false fruits, the method described and the related apparatus is particularly suitable for numerous types of fruits 2, in particular delicate fruits, such as for instance berries such as tomatoes, melons, blueberries, grapes, bananas, etc.; hips such as rose hips, etc.; stone fruit such as cherries, prunes, peaches; oranges or citrus fruits; blackberries, raspberries, etc.; pomes such as apples, pears, etc.; cucumber fruit such as cucumbers, etc.; but numerous other fruits or false fruits as well, such as strawberries, figs, sweet peppers, pineapples, Chinese gooseberry or kiwi fruit, etc. Preferably such fruits 2 are cultivated naturally or by means of suitable nursery systems at a specific distance above the ground surface, in order for the fruit 2 to hang down from the end 5 of the stalk 4.

It is clear that the apparatus 1 shown in FIG. 1 comprises a gripper mechanism 10 comprising two fingers 100. Although such an embodiment is advantageous as a smaller number of fingers 100 reduces the risk of interference with and/or damage to the adjacent fruits during picking, in particular to fruits 2 such as strawberries that grow close to each other in bunches or strings from a plant 3. As can be seen, in the step of the embodiment of the method shown in the front view of FIG. 1, the apparatus 1 and the gripper mechanism 10 put the fingers 100 in a suitable position for performing the approach stage 202 shown in FIG. 2. For that purpose, a first axis 8 was drawn through the point of attachment 6 and the center of gravity 7 of the fruit 2, which according to the exemplary embodiment shown runs substantially vertically. Furthermore, a reference plane 9 was also shown transverse to this axis 8, in the center of gravity 7 of the fruit 2, which plane according to the exemplary embodiment shown runs substantially horizontally.

As shown by the upward arrow 202 in FIG. 2, during the approach stage 202 the gripper mechanism 10 is taken to a clamping position 304 wherein the fingers 100 are positioned next to the fruit 2 to be picked for a subsequent clamping of the fruit 2 to be picked. According to the exemplary embodiment shown including gripper mechanism 10, this means that both fingers 100 are situated on either side of the fruit 2, that means on either side of the axis 8. It is clear that when performing the approach stage 202 the fingers 100 are preferably positioned such that their mutual distance is large enough to perform the upward motion wherein the fruit 2 is able to get in between the fingers 100. As shown in FIG. 3, this means according to the embodiment shown that both fingers 100, in the view shown, are situated on either side of the fruit 2 relative to the axis 8, at a substantially equal level and at least partially extend between the point of attachment 6 and the bottom end 11 of the fruit 2. As shown in FIGS. 11-15, it is clear that alternative embodiments are possible wherein in the approach stage the fingers are positioned at different levels. Furthermore, it is clear that according to even further different embodiments, the gripper mechanism 10 may comprise more than two fingers 100, such as three, four, five, etc. wherein the fingers 100 are suitably disposed for in the approach stage, divided around the surface of the fruit 2, being positioned on either side of the fruit 2 with at least two of the fingers 100, so as to enable a subsequent clamping of the fruit. In addition, during the approach stage 202, preferably at least one of the fingers 100 is moved upward along the fruit 2 past the bottom end 11 in an upward motion, that means a motion having an upward component. That means that during the approach stage 202, preferably the position of this at least one finger 100 relative to fruit 2 allows that this at least one finger 100 next to the fruit 2 can be moved upwards. In addition, this means that during the approach stage 202, the mutual distance between this at least one finger 100 and at least one other finger 100 is controlled such that the fruit 2 can be slid in between said at least one finger 100 and the at least one other finger 100. As will be clarified in more detail below on the basis of the top view of for instance FIG. 10, this allows the approach stage to be carried out fast by means of an upward motion of the gripper mechanism 1. The gripper mechanism 10 shown is able to move its fingers 100 during the approach stage immediately with an upward motion in a plane in which the fruit 2 to be picked is already situated. A motion in or out of the plane of the view shown in FIG. 2 therefore is no longer required during the approach stage 202. During the approach stage 202, approaching the fruit 2 with the fingers 100 along its bottom end 11 in the direction of the point of attachment 6 of the stalk 4, in order for the fruit 2 to be placed between the fingers 100 with an upward motion so that when reaching the clamping position 304 the fruit 2 can immediately be clamped, offers the additional advantage that when this upward motion is carried out during the approach stage 202, the possible interference of the fingers 100 with the surrounding fruits 2 is reduced. It is clear therefore that preferably, as shown and described in more detail below, during the approach stage 202 the fingers 100 are placed in the clamping position 304 by means of an upward motion from an approach position 302 below the bottom end 11 of the fruit 2, as for instance shown in FIG. 1, and that in the approach position 302, considered from above, the fruit is then situated at least partially between two of the fingers 100. According to the exemplary embodiment shown, a movement transverse to the plane of the view, is limited as much as possible, so that the gripper mechanism can cover an as short as possible distance from the approach position 302 to the clamping position 304 and in that way the movement can be carried out as quickly as possible. According to the exemplary embodiment shown, the upward motion can for instance be carried out by a suitable movable arm 30, which by means of a suitable drive and controller coupled thereto is configured for moving the gripper mechanism 10 up and down to a wanted position. Such a movable arm 30 for positioning a gripper mechanism 10 in height relative to the mobile base platform 20, was for instance described in more detail in PCT/EP2017/068187. It is clear that numerous alternative embodiments are possible that can make a suitable up-and-down motion of the gripper mechanism 10 relative to the base platform 20 possible.

FIG. 3 schematically shows the subsequent clamping stage 204 by means of two arrows. While the gripper mechanism 10 is in the clamping position 304, the drive 110 mutually moves the fingers 100 towards the fruit 2 to be picked until they clamp the fruit 2 as shown in FIG. 4. As described in more detail below, the drive 110 for instance comprises a passive drive consisting of one or more springs that cooperate with the fingers 100 for moving the fingers 100 towards each other during the clamping stage 204 until the fruit 2 to be picked is clamped in between the fingers 100. To prevent the fruit from getting damaged while being clamped, according to such an embodiment it is opted for to select the force generated by the springs for mutually moving the fingers 100 towards each other such that the clamping of the fingers 100 does not exceed a specific maximum clamping force on the fruit 2. Said maximum clamping force is preferably determined such that it corresponds to a maximum force which, when exerted by the fingers 100 on a fruit 2, reduces the risk of impermissible damage to the delicate fruit 2 to be picked. As will be described in more detail below, the fingers will therefore be moved such during the clamping stage 204 that a specific maximum clamping force is not exceeded. This means that said clamping force is not exceeded in a clamping stage 204 wherein, while the gripper mechanism 10 is in the clamping position 304, the fingers 100 are mutually moved towards the fruit 2 to be picked until they clamp the fruit 2.

It is clear that in the context of this application the term drive, and in particular in relation to the drive 110, must be interpreted as a system or drive system configured for moving the fingers and/or other parts of the gripper mechanism in a wanted manner. As will be clarified below, the drive 110 can in this way comprise one or more suitable drive elements. Said drive elements of the drive 110 may comprise passive mechanical drive elements, such as for instance a spring or another suitable elastic element, or any other suitable passive mechanism configured for driving, controlling and/or directing the movement of the wanted part of the gripper mechanism. As described further below, the drive 110 may comprise one or more active drive elements, such as for instance suitable actuators, or the drive elements of the drive 110 can be formed by means of a suitable combination of active and passive drive elements. It is clear then that the term drive, in particular when referring to drive 110, refers to a system comprising one or more active of passive drive elements and/or a combination thereof. The drive elements may then be of any suitable type such as mechanical, magnetic, electric, hydraulic, pneumatic, etc. and/or any suitable combination. It is clear that in this way embodiments in which the movement of the fingers during the clamping stage is driven, determined or controlled by the drive 110 such that a specific maximum clamping is not exceeded when mutually moving the fingers towards the fruit to be picked until they clamp the fruit, is also possible when the drive 110 comprises passive drive elements, such as the above-mentioned springs.

It is clear that alternative embodiments are possible, wherein for instance instead of springs or another suitable passive drive element, the drive 110 comprises an active drive element such as for instance a suitable actuator to drive the mutual movement of the fingers 100 in the direction of the fruit 2 to be picked. According to the exemplary embodiment shown, both fingers 100, for instance each by a spring, are mutually moved towards each other in the direction of the fruit 2 to be picked. However, it is clear that according to alternative embodiments the drive 110 may for instance comprise a common spring or actuator driving the movement of both fingers 100. According to a further different embodiment, it is not required that all fingers 100 are moved towards each other during said clamping stage 204, as long as one finger is movable to be mutually moved towards the other fingers by the drive 110 until the fruit 2 is clamped between the fingers 100 of the gripper mechanism 10. Furthermore it is clear that the above also applies to alternative embodiments wherein a different number of fingers than the two fingers 100 of the embodiment shown are being used.

In FIGS. 4 and 5 an embodiment is shown of a subsequent removal stage 206, wherein the fruit 2 clamped in the fingers 100 is removed from the plant 3. As will be described in more detail below, according to the exemplary embodiment shown, a movement is carried out preferably during the removal stage 206 in order for the fruit 2 clamped in the fingers to be subjected to a movement having a rotating component, as schematically shown by arrow 206. According to the exemplary embodiment shown, the fingers 100 are rotated about an axis of rotation 120 by the drive 110. As will be described in more detail below, the drive 110 for that purpose for instance comprises a suitable drive system which for instance comprises a suitable actuator, such as an electric motor and a suitable belt/pulley transmission to drive the rotation of the fingers about the axis of rotation 120. In the exemplary embodiment shown, the axis of rotation 120 is transverse to the plane of the front view shown. That means substantially transverse to axis 8 of the fruit 2 referred to above and substantially parallel to the plane 9. According to the exemplary embodiment shown, the axis of rotation 120 is substantially horizontal. It is clear that alternative embodiments are possible wherein the direction of the axis of rotation 120 deviates from the exemplary embodiment shown, for instance with a deviation of 30° or less in any suitable direction, preferably a deviation of 10° or less.

As further indicated by crossed-out arrows 206, according to the embodiment of the method the mutual position of the fingers 100 during at least a part of the removal stage 206 is controlled, driven, directed or determined by the drive 110 such that their mutual distance 130 does not increase. As will be described in more detail below, the drive 110 for that purpose comprises a suitable actuator such as for instance an electromagnetic actuator such as a solenoid, with which the mutual position of the fingers 100 is selectively blocked, or at least their mutual distance is prevented from being increased. In that way it is ensured that while carrying out the removal stage 206, in particular during carrying out a fast movement to remove the fruit 2 to be picked from the plant 3 fast and efficiently, which involves the risk of the fingers 100 being subjected to forces exceeding the maximum clamping force referred to above, the mutual distance 130 between the position of the fingers 100 will not increase in an impermissible manner which during the removal stage 206 or subsequent thereto could result in the fruit 2 not being sufficiently reliably clamped by the fingers 100, which could lead to damage or loss of the fruit 2. Furthermore, it is also clear that the reactive force of the stalk 4 during the part of the removal stage 206 up to the moment the fruit 2 is removed from the stalk or a part thereof, must be absorbed by the fingers 100. The drive of the position of the fingers 100 described above, ensures that these forces as well can be withstood without risking that the distance between the fingers could increase in an impermissible manner. Therefore a reliable clamping of the fruit is realized during the removal stage 206, whereas the risk of damage to the fruit 2 is kept in check as the mutual distance between the fingers 100 was determined during the preceding clamping stage 204 on the basis of the maximum clamping force.

As described in more detail below, it is advantageous according to the embodiment shown that during the removal stage 206 the mutual position of the fingers 100 is controlled by the drive 110 such that their mutual distance 130 remains constant. That means that during the removal stage 206 the drive 110 is controlled such that their mutual distance 130 does not decrease either. This allows realizing this with a simple drive element which blocks the mutual position of the fingers 100 during the removal stage 206, as will be described in more detail below. It is clear that numerous alternative embodiments are possible comprising a suitable selection or combination of the above-mentioned elements. It is clear then for instance that according to alternative embodiments the mutual distance 130 is not required to be controlled by the drive 110 as described above during the entire removal stage 206. It suffices that this is the case during at least an appropriate part of the removal stage 206, for instance the part of the removal stage 206 in which the fingers 100 are subjected to the largest accelerations, the part of the removal stage 206 in which the stalk 4 is expected to exert the largest reactive force, or any other appropriate part of the removal stage 206. Furthermore, it is also clear that the control of the mutual distance 130 by the drive 110 as described above is not required to be restricted to the removal stage 206. According to specific embodiments, controlling the mutual distance as described above can also be applied after the removal stage 206, in order for, just like during the removal stage 206 make a fast movement of the gripper mechanism 10 possible and still ensure a reliable clamping of the fruit 2. According to the exemplary embodiment shown, this can for instance be realized when moving the gripper for instance during further displacements of the gripper mechanism 10 from the position shown in FIG. 5 to the position shown in FIG. 6, wherein the drive 110 comprises a suitable drive element that has rotated the gripper mechanism 10 as indicated by arrow 207 about an axis of rotation 140 in order for bringing the gripper mechanism in a state that is suitable for depositing the fruit 2 in a suitable receptacle 40. As described in more detail below, for that purpose the drive 110 according to the exemplary embodiment shown for instance comprises a suitable actuator, such as an electric motor, to rotate the gripper mechanism 10 relative to the arm 30 about an axis of rotation 140 into the position as shown in FIG. 6. Once this position has been reached, a depositing stage 208 can be initiated wherein the mutual movement of the fingers 100 is no longer prevented by the drive 110. As will be described in more detail below, according to the exemplary embodiment shown, for instance the selective clamping element of the drive 110, for instance in the form of a solenoid, can be switched off, in order for the clamping action to be no longer exerted on the fingers 100, as a result of which the mutual movement of the fingers 100 is no longer prevented. As shown by arrows 208 in FIG. 6, during such a depositing stage 208 the drive 110 is for instance configured for increasing the mutual distance 130 between the fingers 100, in order for enabling the fruit 2 to be released from the fingers 100 and be deposited in the receptacle 40. As described in more detail below, the drive 110 for that purpose for instance comprises a suitable drive element that for instance is suitable for overcoming the force of the spring described above which moves the fingers towards each other, in order for the fingers to move mutually away from each other. It is clear that, as shown by arrow 209, this will make it possible that the fruit 2 is no longer clamped between the fingers 100 and therefore is released from the gripper mechanism 10 at a suitable position relative to the receptacle 40 for collecting the picked fruits. Sometimes it is advantageous that, as shown in FIG. 6, the gripper mechanism 10 and its fingers 100 are then positioned in a wanted position by the drive 110, so that the fruit can be deposited in a wanted orientation in the receptacle. According to the exemplary embodiment shown, the drive 110 controls the gripper mechanism 10 such that the fruit, for instance a strawberry, is deposited in the receptacle 40, the bottom end 11 of the fruit being oriented upward, so the bottom end facing away from the stalk, and therefore the point of attachment 6 facing downwards. It is self-evident that numerous different embodiments are possible wherein the gripper mechanism deposits the picked fruit in a wanted orientation in a suitable receptacle 40. It is clear that according to the exemplary embodiment shown the second axis of rotation 140 for rotating the entire gripper mechanism 10 relative to the arm 30, is parallel to the axis of rotation 120 for rotating the fingers 100 relative to a basis 304 of the gripper mechanism 10. However, it is clear that alternative embodiments are possible, wherein the drive makes use of alternative drive elements and/or the gripper mechanism 10 uses a different structure to have the gripper mechanism 10 and its fingers 100 carry out a suitable movement for carrying out the automatic picking of a fruit 2 and for subsequently making it possible to deposit the fruit 2 in a suitable receptacle. According to the exemplary embodiment shown, the mutual distance 130 between the fingers 100 can be increased again until they have reached a suitable distance for being used in a subsequent approach stage 202, wherein as shown in FIGS. 1 and 2 the mutual distance 130 between the fingers 100 is sufficiently large for during the upward motion of the gripper mechanism putting the fruit 2 in between the fingers.

It is clear that alternative embodiments are possible, wherein, after removal of the fruit 2 from the plant 3, during a part of the removal stage 206 and/or subsequent thereto, the drive 110 is controlled such that the mutual movement of the fingers 100 is no longer prevented. Similar to what has been described above, according to specific embodiments it is possible that after removal of the fruit 2 from the plant, during a part of the removal stage 206 and/or subsequent thereto, for instance during at least a part of the depositing stage, the drive 110 is controlled such that an increase of the mutual distance 130 between the fingers 100, or a mutual movement of the fingers 100, is no longer prevented.

Figure 7:
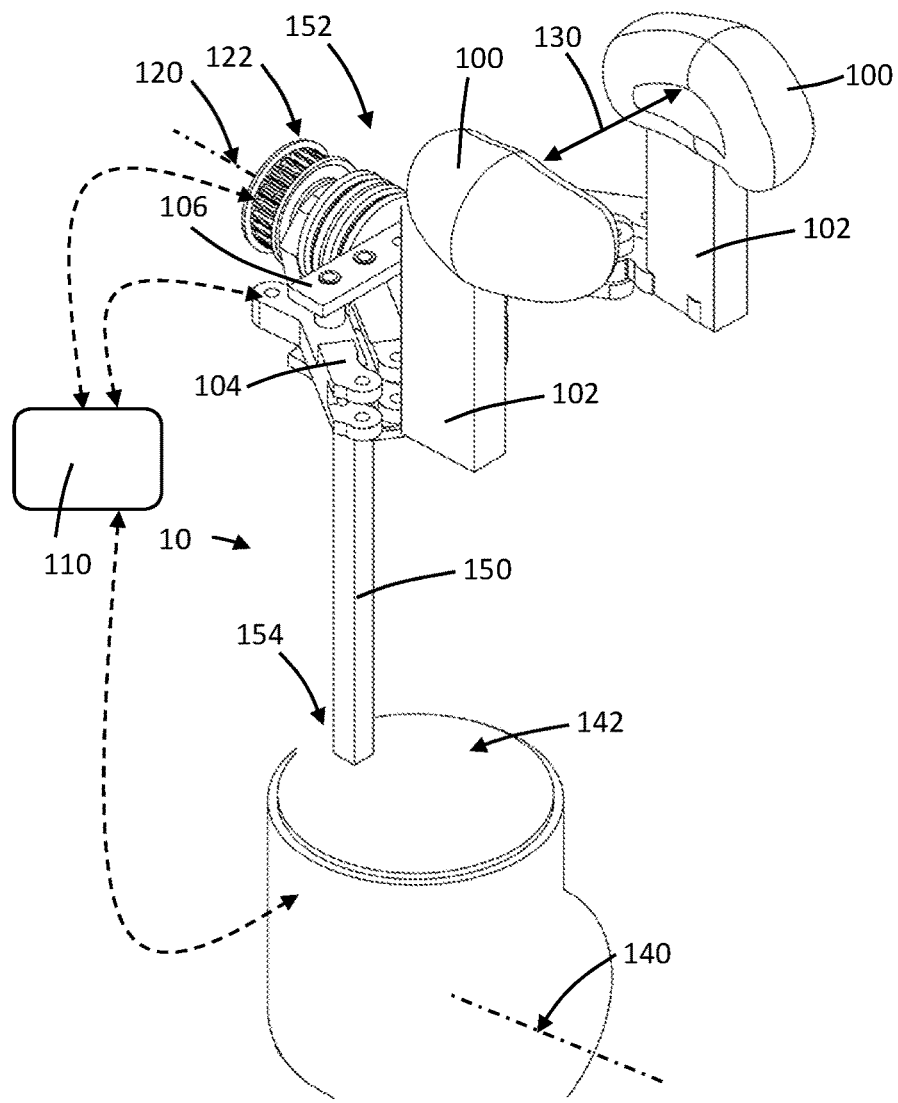
FIGS. 7-10 show various views of the apparatus according to FIGS. 1-6.

FIG. 7 shows the embodiment of the gripper mechanism 10 according to FIGS. 1-6 in more detail in perspective view. As can be seen the gripper mechanism 10 according to this embodiment comprises two fingers 100 which are disposed on a carrier 106 by means of suitable arms 102 and a movement mechanism 104. As described in more detail below, the movement mechanism 104 is configured for cooperation with the drive 110 so that the mutual distance 130 between the fingers 100 can be changed. As shown, the carrier 106 is disposed on a basis 150 so as to be rotatable about the axis of rotation 120. It is clear that for the embodiment shown, during the use of the gripper mechanism 10 as shown in FIGS. 1-6, and in particular during the approach stage 202, the clamping stage 204 and/or the removal stage 206, the axis of rotation 120 is horizontal or substantially horizontal. However, it is clear that alternative embodiments are possible wherein said axis of rotation 120 during use is disposed or positioned at an angle of 30° or less, preferably 10° or less to a horizontal plane by the apparatus 1 to which the gripper mechanism is attached. According to the exemplary embodiment shown, the basis 150 is configured as a rod 150 to which at the level of its one outer end 152, the axis of rotation 120 for the carrier 106 of the fingers 100 is disposed and at its opposing outer end a mechanism for rotating the entire gripper mechanism 10 about the axis of rotation 140 is disposed. It is clear that according to the example shown, the axes of rotation 120 and 140 are parallel to each other and extend transverse relative to the view shown in FIGS. 1-6, however, it is clear that alternative embodiments are possible, wherein said axes of rotation are disposed at a suitable angle to each other or to the horizontal plane.

As schematically shown in FIG. 7, the drive 110 controls the various movable parts of the gripper mechanism 10, as will be described in more detail below. For instance the movement mechanism 104 is controlled by the drive 110 for changing the mutual distance 130 of the fingers 100 by a suitable movement of one or more of the fingers 100, or at least allowing a part thereof near their farthest outer end transverse relative to the axis of rotation 120, substantially according to the direction indicated by arrow 130 in FIG. 7, to move relative to the carrier 106. Furthermore, the rotation of the carrier 106 that is for instance suitably disposed on the basis 150 by means of a bearing so as to be rotatable about axis of rotation 120, is controlled via suitable drive elements 122 of the drive 110 which elements are coupled to the carrier 106. Furthermore, as schematically indicated, the rotation of the entire gripper mechanism 10 about the axis of rotation 140, that means the basis 150 and the carrier 106 including the fingers 100 which carrier is attached to outer end 152 of the basis so as to be rotatable, according to the exemplary embodiment shown is for instance controlled by suitable drive elements 142 of the drive 110 which elements are coupled to the basis 150.

Figure 8:
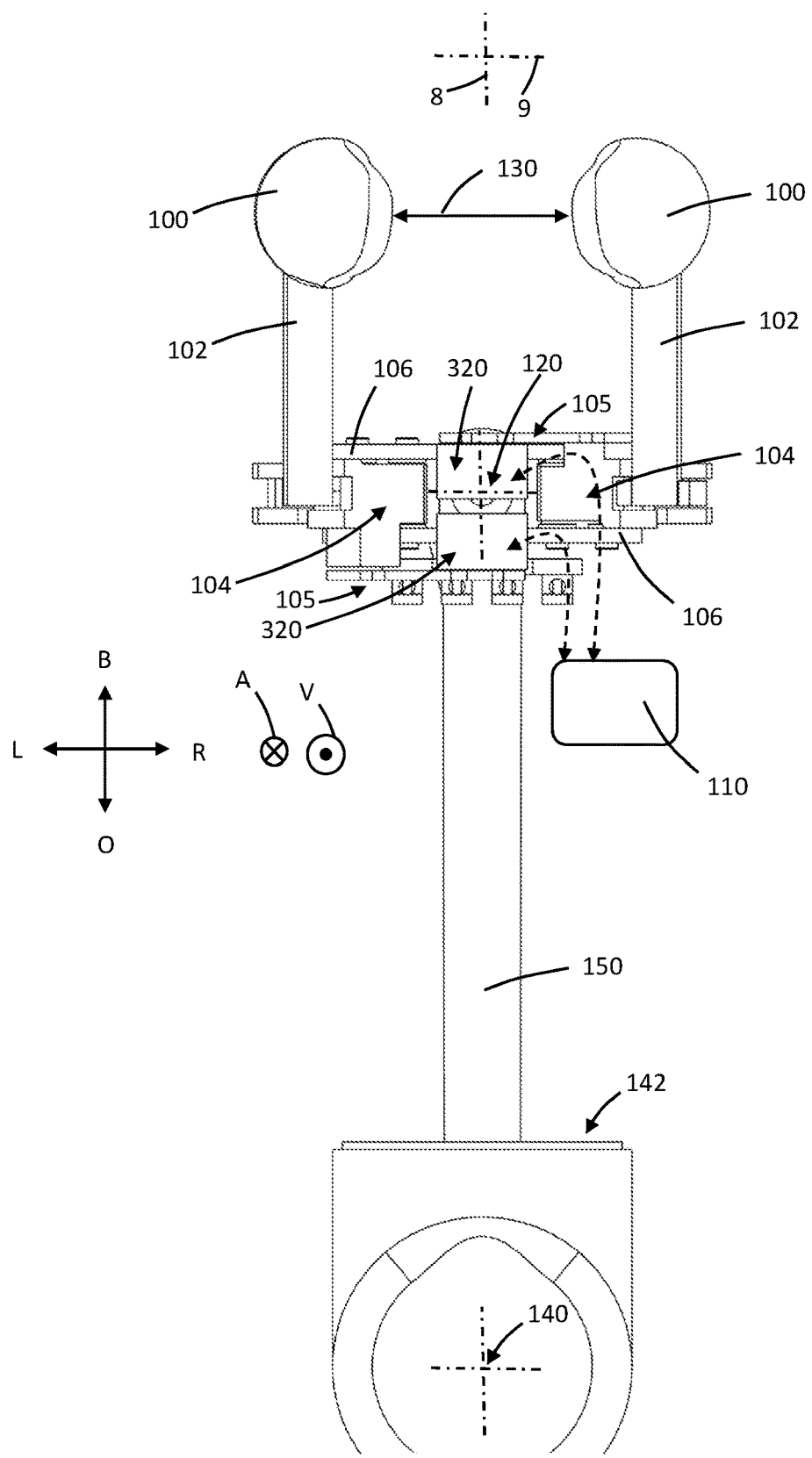

FIG. 8 shows a front view, that means a view similar to FIGS. 1-7, considered according to the axis of rotation 120 of the carrier. For reference purposes, the axis 8 and the plane 9 of the fruit 2 to be picked during the use of the gripper mechanism 10, for instance during the approach stage 202, were also indicated. Similar elements are referred to by similar references and fulfill a similar function as described above. FIG. 7 clearly shows, as will be described in more detail below, both selective blocking elements 320 the drive 110 comprises, and which upon activation prevent a mutual movement of the fingers 100. According to the exemplary embodiment shown, the selective blocking elements 320 comprise two solenoids attached to the carrier 106, which solenoids work together with two plates 105 disposed on the fingers 100 or their movement mechanism 104, which plates move along with the fingers 100. The plates are made of a suitable metal in order to be attracted by the solenoids upon activation and as a result be clamped to the carrier 106. It is clear that upon deactivation the plates 105 are able to move freely relative to the solenoids 320. It is clear that alternative embodiments for such blocking elements 320 are possible, such as for instance blocking pins, ratchet mechanisms that can selectively be activated, braking mechanisms that can selectively be activated, etc. that can be used for, upon activation, selectively preventing the mutual movement of the fingers 100.

Figure 9:
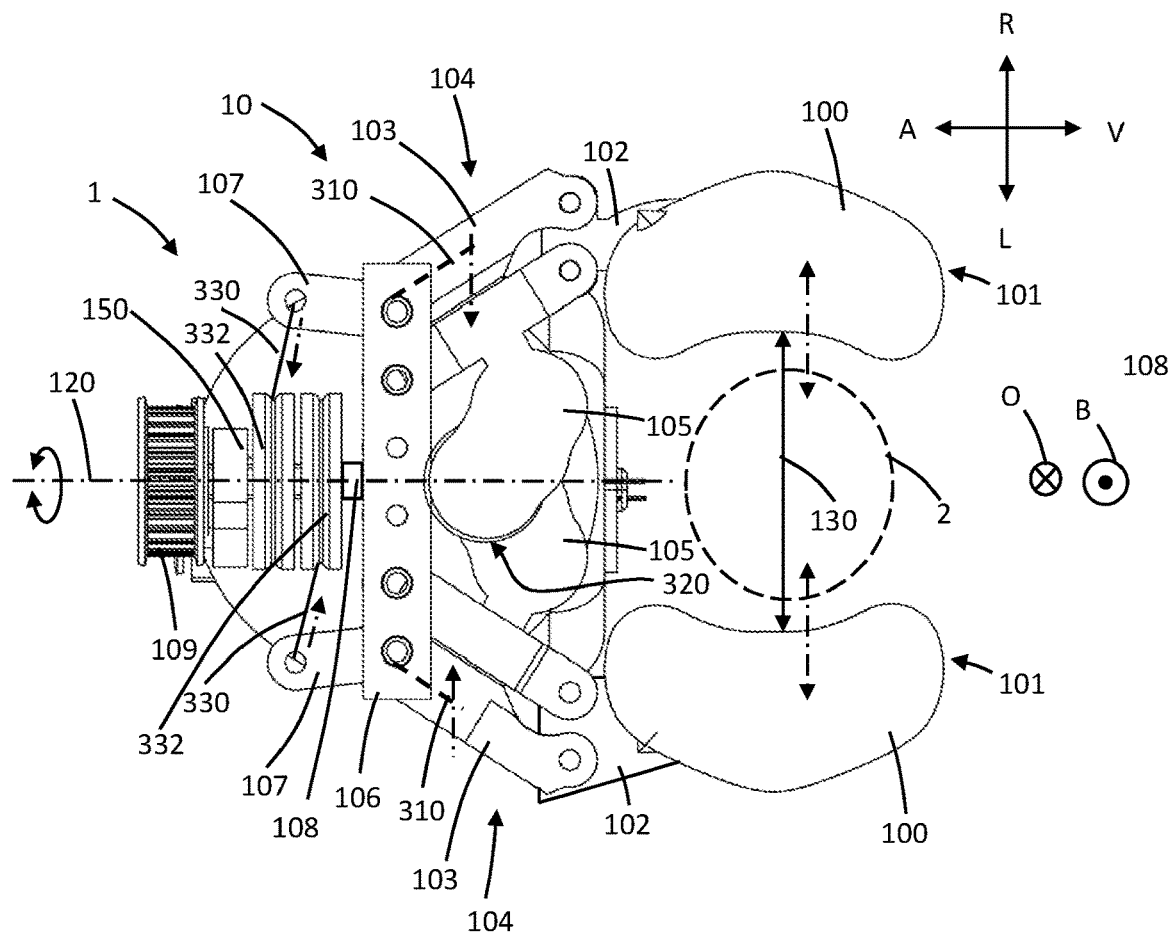

FIG. 9 shows the top view of the embodiment according to FIG. 8 in more detail, for instance in the approach stage 202. It is clear then that according to the method of the invention, preferably, as early as in the approach stage 202, when considered from above, the fruit 2 is at least partially situated between two of the fingers 100. That means that the space between the two fingers 100 is at least in partial overlap with the fruit 2 when considered from above. According to the example shown, this means that during the approach stage 202, the gripper mechanism 10 and its fingers 100 do not, or to a limited extent only, have to carry out a displacement in the direction of the axis of rotation 120. This is advantageous because, as indicated above, a shorter distance has to be covered by the gripper mechanism during the approach stage 202, in particular in comparison with known gripper mechanisms that use fingers that are disposed on a carrier that is rotatable about a substantially horizontal axis of rotation during a removal stage, such as for instance known from for instance US2016073584 or other methods for gripper mechanism, which first have to position the gripper mechanism and its fingers fully sideways next to the fruit, for subsequently in a horizontal movement bringing the fruit in between the fingers before a clamping stage and subsequent thereto a removal stage can be started with by a rotary motion about a substantially horizontal axis. It is clear that the method according to the invention is advantageous as approaching the fruit 2 from below, without the necessity of first putting the fingers sideways next to the fruit 2, results in the least risk of interference with other fruits and/or parts of the plant 3, and consequently the gripper mechanism is able to cover the shortest path up into a suitable clamping position, which makes a quick and efficient automatic picking operation possible. In addition, use can be made of simple movement mechanisms with a limited number of reliable bearing points and degrees of freedom, which is advantageous for the accuracy and robustness of the fast moving components.

The top view of the embodiment shown in FIG. 9, clearly shows that the part of the fingers 100 intended to contact the fruit 2 comprise an elongated shape, the longitudinal axis of which extends substantially according to the direction of the axis of rotation 120, or in other words that the fingers 100, as regards the part near their outer end 101, extend in a direction away from the carrier 106, wherein they are disposed eccentrically on the carrier relative to the axis of rotation 120 of the carrier 106. In that way the gripper mechanism 10 is configured for rotating the carrier 106 during at least a part of the removal stage 206 about the axis of rotation 120 by means of the drive 110. As can clearly be seen in the embodiments described above, during at least a part of the removal stage 206, the fingers 100 are in that way rotated eccentrically about the axis of rotation 120. Therefore it is clear that the carrier 106 is configured to rotate in a plane transverse to this axis of rotation 120. According to the exemplary embodiment shown, the carrier 106 then rotates in a substantially vertical plane, transverse relative to the substantially horizontal axis of rotation 120. As shown, the carrier 106 comprises a shaft 108 bearing mounted in the basis 150 so as to be rotatable which shaft is configured to allow the carrier 106 to rotate about the axis of rotation 120. According to the exemplary embodiment shown, a pulley 109 to which a suitable belt drive of the drive 110 can be coupled is attached to this shaft 108, for during carrying out the method described above, placing the carrier 106 including the fingers attached to it in the wanted angular position around the axis of rotation 120. It is clear that alternative drive elements are possible, such as any suitable actuator and/or coupling elements for allowing the drive 110 to control the rotation of the carrier 106 about the axis of rotation 120. The simple way in which the carrier 106 is bearing mounted in the basis 150 then ensures a stable and robust positioning of the carrier 106 and the fingers 100 disposed on it.

Furthermore it is clear from the top view of FIG. 9, that according to the embodiment shown, the fingers 100 are attached to the carrier 106 by means of a suitable movement mechanism 104 so that their most extreme end 101 can be moved relatively with respect to the carrier 106. As is shown, the movement mechanism according to the exemplary embodiment comprises a parallel rod mechanism which at one end is connected to the carrier 106 and at its other end is connected to the finger 100, and is configured such that, when considered in top view in the condition shown in FIG. 9, the fingers 100 can be moved transverse relative to the axis of rotation 120 as indicated by the dual arrows. It is clear that, as described above, this allows that the mutual distance 130 between the fingers 100, that means the distance between two opposing fingers 100 between which the fruit 2 can be inserted, can be changed in this way. To control the mutual distance 130 between the fingers 100, the drive 110 according to the exemplary embodiment shown makes use of elastic drive elements in the form of springs or another suitable elastic element 310 that is attached to the carrier 106 and for instance pushes against the movement mechanism 104 of the finger 100, for instance against the rod 103 of the shown parallel rod mechanism 104, so that under the influence of this force the fingers 100, as indicated by the arrows, are urged in a direction reducing the mutual distance 130, or in other words are urged mutually towards each other. As already stated above, the force delivered by the springs 310 preferably is selected such that during the clamping stage 204 the fingers 100 do not exceed a specific maximum clamping force. It is clear that, as described above, during the clamping stage 204, the springs 310 form a force determining drive element 310 of the drive moving the fingers in the direction of the fruit 2 to be picked in order for the mutual distance 130 between the fingers to decrease until the fruit 2 is clamped between the fingers. Such an elastic element 310, such as the spring, therefore preferably limits the driving force during the clamping stage 204 to a specific maximum driving force that is lower than the specific maximum clamping force allowed as described above. It is clear that alternative embodiments are possible, such as the use of elastic materials, pneumatic, electric, magnetic spring systems, etc. Clearly, further alternative embodiments are possible wherein, similar to such an embodiment, the movement of the fingers 100 during the clamping stage 204 is controlled by a drive 110 comprising one or more force determining drive elements 310.

Preferably the movement of the fingers 100 during the clamping stage 204 is controlled by the drive 110 such that a specific minimum clamping force, that is lower than the maximum clamping force, is indeed exceeded so as to ensure that the fruit 2 is sufficiently reliably clamped by the fingers 100. According to the embodiment shown, this can for instance be realized by selecting the force from the springs 310 or other suitable force determining drive elements 310 such that they generate a clamping force in the fingers 100, that means urging the fingers mutually towards each other with a specific force, which is selected from the range between the minimum clamping force and the maximum clamping force. In that way during the clamping stage 204 the drive 110 is able to ensure that with a simple passive drive of the movement of the fingers 100 in the direction of the fruit 2 to be clamped, a suitable clamping of the fruit can be realized without the risk of damaging the fruit. Furthermore it is clear that such an embodiment realizes a drive 110 in a simple manner which controls the drive such that during the clamping stage 204 the movement of the fingers 100 is controlled such that contact is made with the fruit 2 to be picked. Although in the embodiment shown, use is made of two springs, that means one for each finger, it is clear that according to alternative embodiments one spring or another suitable force determining drive element can be disposed such that it urges several fingers 100 towards each other using a specific force during the clamping stage 204.

Figure 10:
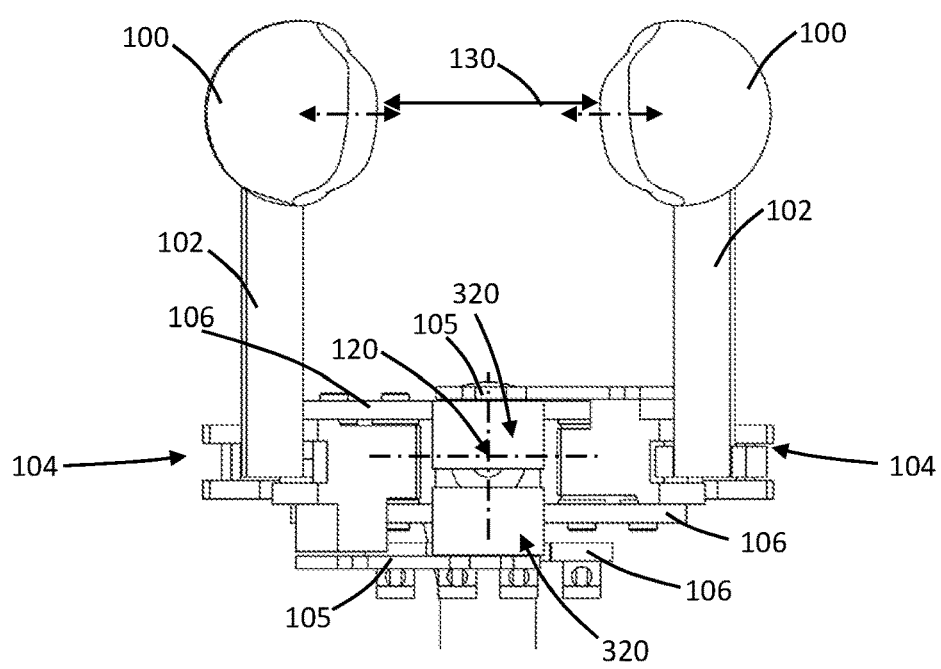

FIG. 10 shows a similar view of the fingers 100 and the carrier 106 as shown in FIG. 8 and in that way clarifies the shown elements in the related top view of FIG. 9. It is clear therefore that the plates 105 that move along with a rod of the movement mechanism 104 of the finger 100, extend transverse relative to the axis of rotation in the direction of a blocking element 320 described above such as for instance a solenoid. In the exemplary embodiment shown, the gripper mechanism 10 comprises two individually movable fingers 100, each having an associated movement mechanism 104. According to the exemplary embodiment shown, the plate 105 works together with a top solenoid 320 and is disposed such that it reciprocally moves near the top side of this solenoid according to the direction indicated by the dual arrows in FIG. 10. Therefore it is clear that the plate 105 of said one finger 100 moves just above the top solenoid 320. Similarly, the plate 105 moves just below the bottom solenoid 320. When the solenoids are not activated, the movement mechanism 104 is able to move freely, and for instance, as described above, move the fingers 100 towards each other with a specific force during the clamping stage 204 under the influence of force determining drive elements 310 such as the springs. When the solenoids 320 are activated, the position of the plates 105, the movement mechanism 104 coupled thereto and the fingers 100 coupled thereto via the little arms 102, are blocked relative to the carrier 106 and therefore also relative to each other. It is clear that in this way the activated solenoids 320 function as selective blocking elements 320 which upon activation prevent a mutual movement of the fingers 100. According to the exemplary embodiment shown, the drive comprises position determining drive elements 320 which as described above, during at least a part of the removal stage 206 are activated for preventing the mutual movement of the fingers 100. As will be described in more detail below, it is clear that alternative embodiments are also possible wherein the position determining drive elements 320 of the drive 110 only limit the mutual movement of the fingers 100 in a direction away from the clamped fruit 2.

It is clear then that according to the method described above, preferably during the clamping stage 204 the drive 110 is controlled such that the one or more position determining drive elements 320 are switched off in order for the mutual movement of the fingers 100 to be determined by the force determining drive elements 310. As described above, this means that for the exemplary embodiment shown the solenoids 320 are deactivated during the clamping stage 204 so that the mutual movement of the fingers 100 can be controlled by the springs 310. As described above, according to the embodiment shown, following the removal stage 206, for instance at the end of the depositing stage 208 shown in FIG. 6, the position determining drive elements 320 are switched off so that a mutual movement of the fingers 100 is no longer prevented. As will be described in more detail below, this allows the mutual distance between the fingers 100 to be suitably increased again to deposit the picked fruit in a suitable receptacle and in preparation of a subsequent new approach stage 202 for picking a next fruit 2. According to different embodiments it is possible that even during a part of the removal stage 206 after removing the fruit 2 to be picked from the plant 3 and/or subsequent thereto, the drive 110 is controlled such that the one or more position determining drive elements 320 are switched off so that the mutual movement of the fingers 100 is no longer prevented. The latter may for instance be advantageous if the position controlled drive elements only need to be activated to prevent an impermissible displacement of the fingers due to the reactive force of the stalk 4 during the removal stage 206 and if the rest of the movements of the gripper mechanism 10 during the subsequent steps would give no cause for impermissible displacements of the fingers when their mutual position is controlled by the force determining drive elements 310.

As can best be seen in the top view of FIG. 9, the drive 110 further comprises drive elements 330, which as shown comprise a suitable cable drive 330 which for instance via a suitable cable guide 332 is disposed on a suitable actuator for upon activation moving the cable 330 in the direction of the arrow so that an arm 107 coupled to the rod 103 moves such that the movement mechanism 104 mutually moves the fingers 100 in a direction so as to increase the mutual distance 130. Therefore this means that the drive elements 330 are suitable to be controlled to overcome the force delivered by the springs 310 and thus move the fingers 310 into an opened position wherein a clamped fruit can be released and/or a fruit 2 to be clamped can be inserted between the fingers 100 for a subsequent clamping stage. It is clear that the operation of the drive elements 330 according to this embodiment also needs to be coordinated with the solenoids 320, as the drive elements 330 will only be able to open the fingers if the solenoids are not activated to limit the movement of the fingers. It is clear that according to the embodiment shown, drive 110 comprises the force determining drive elements 310, the position determining drive elements 320, the further drive elements 330 for controlling the mutual position of the fingers 100, and the drive elements 322 for rotating the carrier 106 of the fingers 100 relative to the basis 150, and is configured for suitably controlling these drive elements during carrying out the method for automatically picking a fruit 2 as described above.

It is clear that in addition to the passive drive elements described above, alternative embodiments are possible as well, wherein for instance use is made of suitable actuators as force determining drive elements 310 for suitably moving the fingers 100 towards the fruit 2 to be clamped during the clamping stage 204 as described above. According to an alternative embodiment, for instance one or several actuators can be used which are suitably coupled to the fingers 100 or to a movement mechanism coupled to the fingers. Said actuators can then for instance be controlled by a suitable controller such that their driving force is limited to a specific maximum value. According to yet another alternative embodiment, the one or more actuators can be selected such that their maximum driving force is limited to a specific maximum force ensuring that the resulting clamping force in the fingers does not exceed the maximum clamping force. According to yet further alternative embodiments, the force determining drive elements 310 of the drive 110 may comprise one or several actuators that are controlled by a controller in order for one or more sensors for measuring the clamping force of the fingers 100, which sensors are coupled the controller, to register a clamping force that does not exceed the maximum clamping force or for the fingers to contact the fruit 2 to be picked in a suitable manner.

Furthermore it is also clear that alternative embodiments are possible for the position determining drive elements 320. For instance, the drive 110 may comprise one or more position determining drive elements 320 comprising one or several actuators which upon activation are controlled so that their driving force suffices for preventing a mutual movement of the fingers 100. According to further embodiments, it is also possible that instead of preventing the mutual movement of the fingers 100 completely, a movement in a direction away from the clamped fruit 2 is prevented by one or more selective blocking elements or actuators, whereas a movement in the opposite direction, for instance by the force determining drive elements 310 is still permitted.

Figure 16:
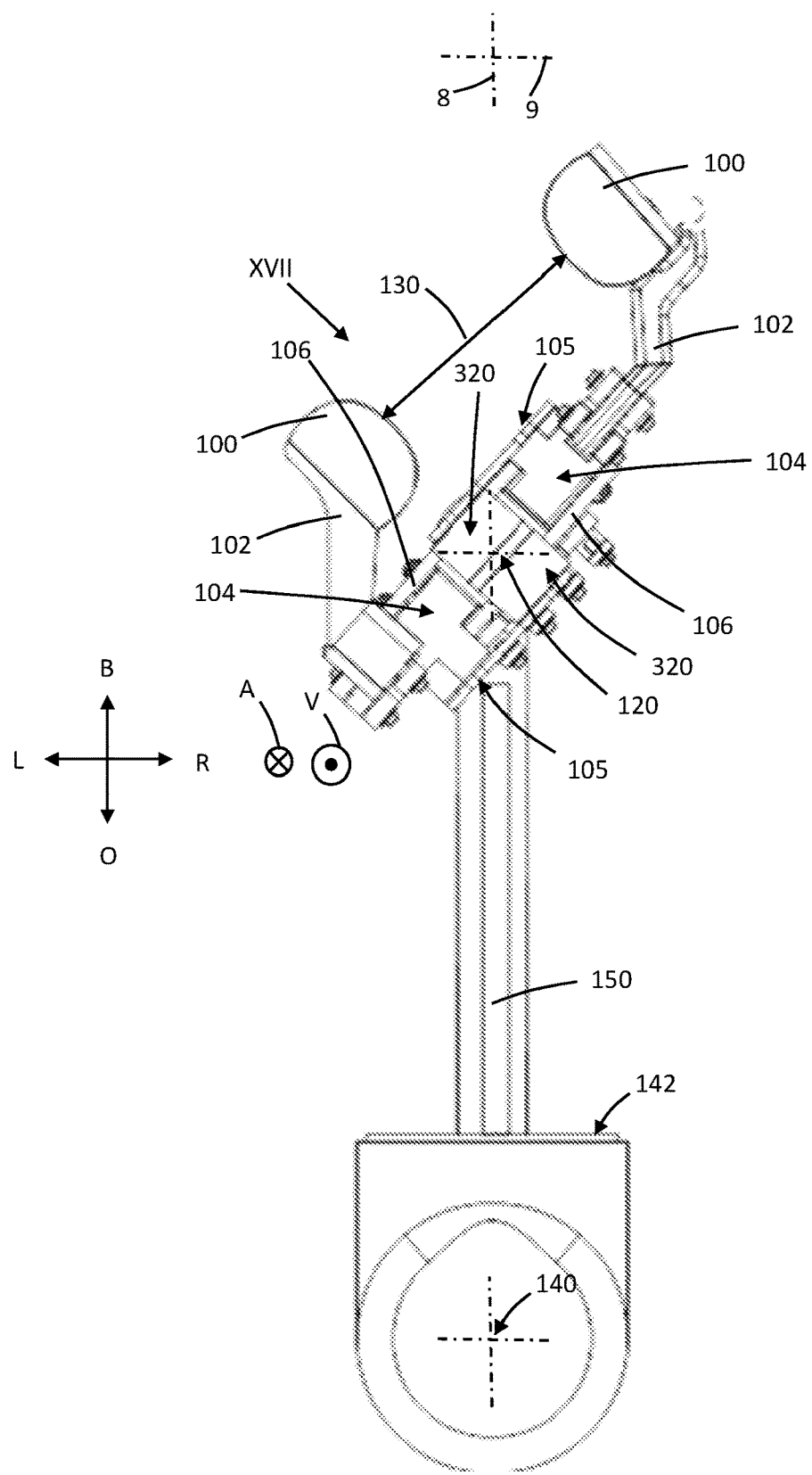
FIGS. 16-17 show various views of an embodiment of the apparatus according to FIGS. 11-15.

FIGS. 11-15 show an alternative embodiment of the apparatus similar in the carrying out of a method similar to what has been described in relation to FIGS. 1-5. Similar references refer to similar elements and steps in the method and fulfill a substantially similar function as described above. The biggest difference with the embodiment described above is that, as can also be seen in the detail shown in FIG. 16, the carrier is positioned in a different angular position relative to the axis of rotation 120 and that the fingers 100 are disposed on the carrier 106 such that at least in the clamping position 304 they are at different levels. According to the exemplary embodiment shown, in the clamping position 304, the upper finger 100 is situated above the plane 9 of the fruit 2 and the bottom finger 100 is situated at the opposing side of the fruit below the plane 9.

To clarify the relative position of the elements, similar to some of the preceding Figures a number of reference axes were defined. In the views, the indicated directions can be considered as B: Top, O: Bottom, L: Left, R: Right, A: rear, V: front. It is clear that alternative embodiments are possible wherein the directions are chosen differently, and for instance left and right, front and rear are chosen differently. Furthermore it is clear that said relative directions are only intended to indicate the relative positioning of the elements of the embodiments and in particular to clarify how the elements relate to the direction of the axis of rotation 120 that runs according to the front/rear direction. According to the exemplary embodiment shown, finger 100 on the left-hand side is therefore positioned above the finger on the right-hand side. As can be seen, in the clamping stage 204 said upper finger 100 is positioned closer to the stalk and the bottom finger 100 is positioned almost at the diametrically opposite side of the fruit. This may be advantageous, in particular in an embodiment wherein as shown, in the clamping position 304, only one finger is positioned higher than the plane 9, as in this way the other fingers can be positioned at the bottom side of the fruit and therefore a minimum interaction with adjacent other fruits or other parts of the plant, in particular with fruits such as strawberries that occur in bunches, is ensured. With some fruits it can also be advantageous for in the removal stage 206 having a finger that clamps the fruit at a position as close as possible to the point of attachment of the stalk 4, as at that location for many fruits the shape of the fruit permits realizing a reliable clamping of the fruit properly capable of resisting the reactive force of the stalk during the removal stage 206. The carrier 106 is disposed such that in the clamping position 304 the carrier 106 extends in a direction parallel to the direction defined by both fingers, that means the angle to the top/bottom direction in the plane shown in the view of FIGS. 11-16 corresponds to the angle between the points of contact of both opposing fingers 100 with the fruit in the clamping position 304, as shown in FIG. 13. As can best be seen in FIG. 17, which is a view transverse to the direction in which the carrier 106 extends according to arrow XVII in FIG. 16, this ensures that the movement mechanism 104 can be configured simple, with which the fingers 100 are movably attached to the carrier 106, in order to change their mutual distance 130, in particular the part of the finger 100 at the level of the most extreme outer end 101 according to the direction of the axis of rotation 120. According to the exemplary embodiment shown, the movement mechanism 104 is also configured like a parallel rod mechanism making a suitable movement of the fingers possible according to the direction in which the carrier 106 extends transverse to the axis of rotation 120. The movement mechanism 104 can therefore be chosen as a mechanism with 1 degree of freedom wherein nonetheless a suitable diametrical movement of the fingers 100 is made possible during carrying out the clamping stage 204, in order for an optimal clamping of the fruit to be realized, in particular when use is made of a simple and lightweight gripper mechanism having two fingers 100 only. It is clear then that according to the exemplary embodiment, the movement mechanism 104 comprises a rod mechanism of which the rods are connected to points of rotation with an axis of rotation disposed transverse relative to the axis of rotation 120 and transverse relative to the longitudinal axis of the carrier 106 that is also disposed transverse relative to the axis of rotation 120. In addition, the movement mechanisms 104 according to the exemplary embodiment shown preferably are also disposed rotation-symmetrically around the axis of rotation 120 on the carrier 106. This ensures a similar mutual displacement of both fingers when controlled by the drive 110. However, it is clear that alternative embodiments are possible, wherein for instance one of the fingers is disposed on the carrier 106 so as to be stationary and only one of the fingers is provided with a movement mechanism 104 for changing the mutual distance relative to the stationary finger when controlled by the drive 110.

Figure 17:
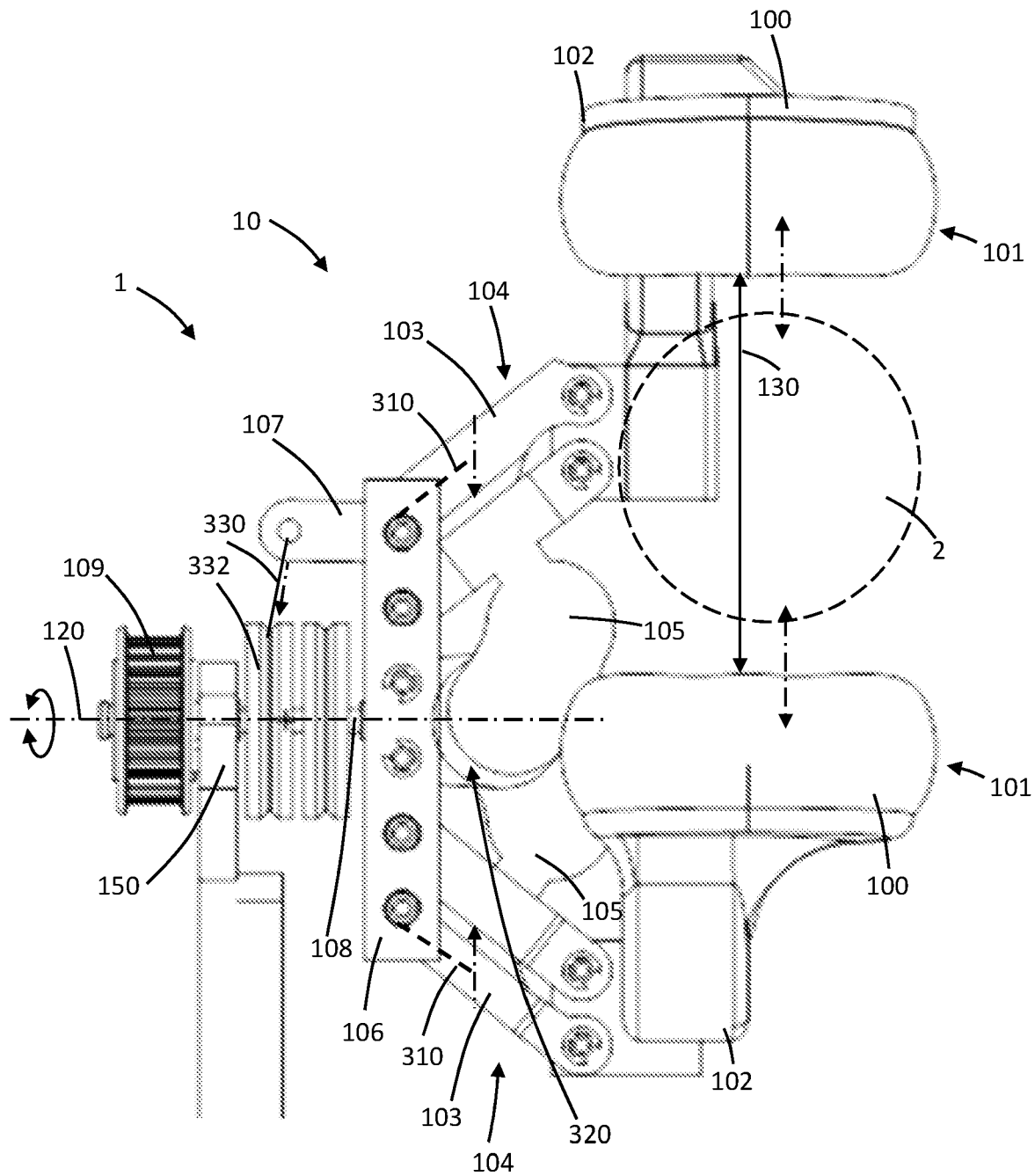

As described above and as can most clearly be seen in the views of FIGS. 9 and 17, the fingers 100 with their longitudinal axes extend substantially forward from the carrier 106 via the movement mechanism 104 in the direction of their extreme ends 101. According to the views shown, the carrier 106 which is bearing mounted on the basis 105 so as to be rotatable about the substantially horizontal axis of rotation 120, and extending transverse to this axis of rotation 120, therefore is disposed behind the fingers that extend forward. The movement mechanism 104 and the carrier 106 thus form a plane extending substantially parallel to the axis of rotation 120. As further shown, the exemplary embodiments of the fingers 100 shown furthermore comprise little arms 102, which particularly in the clamping stage 204, but preferably also during at least a part of the approach stage 202 extend substantially upwards. That means that the little arms 202 are configured for attaching the most extreme end of the fingers 100 to the carrier 106, optionally via a suitable movement mechanism 104, such that at least during the clamping stage 204 only a part of the fingers 100 near their extreme ends, meaning the part of the fingers contacting the fruit and optionally a part of the little arms 202, extends upwards past the bottom end of the fruit. The other parts of the gripper mechanism 10, such as for instance the carrier 106, the movement mechanism 104, the basis 150, etc. preferably during at least the clamping stage 204 and preferably also during other stages of the method described above, can remain below the position of the bottom end 11 of the fruit when in the clamping position 304. In that way the risk of these parts interfering with adjacent fruits and/or other parts of the plant 3 is reduced. Moreover, the inertia of the part of the gripper mechanism 10 that is rotated about the axis of rotation 120 is reduced when carrying out the shown rotary motion during the removal stage 206 as only the little arms 102 and the extreme end 101 of the fingers 100 are further removed from the axis of rotation 120 and the carrier 106, and movement mechanisms and optional parts of the drive 110 such as for instance the solenoids 320, the movement mechanisms 104 etc. can be disposed closer to the axis of rotation 120.

Figure 18:
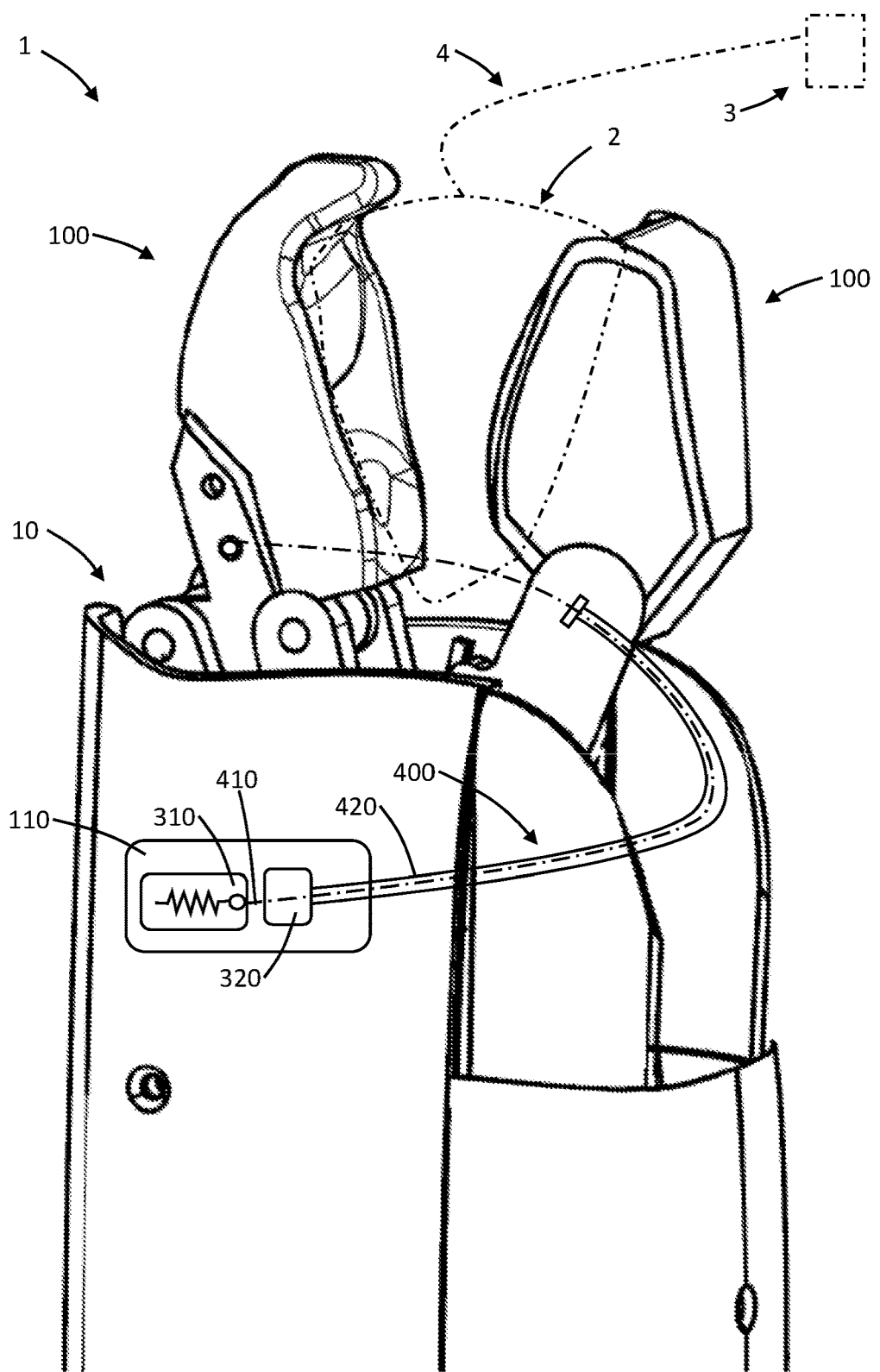
FIG. 18 shows a further alternative embodiment of such an apparatus.

FIG. 18 shows a further alternative embodiment of a gripper mechanism 10 including fingers and a movement mechanism similar to the one described in pending patent application BE2017/5889 and PCT/EP2017/068187 that are herewith incorporated by way of reference. It is clear that the longitudinal axis of these fingers 100, different from the embodiments described above, sooner extends according to the upward direction in the view shown. The rotary motion of the fingers during a removal stage, according to this exemplary embodiment is driven by a suitable rod mechanism. The embodiments of the gripper mechanism described above in relation to this embodiment provide the advantage that the mutual displacement of fingers that extend substantially forward from a rotatably bearing mounted carrier is capable of catering for a larger variation in sizes of the various fruits than the embodiment in FIG. 18 is. In addition, such a variation in size, shape or dimension of the fruits to be picked also affects the reliability of the clamping of the fruit by the fingers less as this only gives cause for changing the mutual distance 130 of the fingers during the clamping stage. The contact surface of the fingers with the clamped fruit, as well as the relative position of the fingers on the perimeter of the fruit, does not vary so strongly. In the embodiment of FIG. 18 the shape of the contact surface on the inside of the fingers must be chosen such that it is capable of handling a specific variation in size, shape, etc. of the fruits to be picked, which each time means a compromise and with varying shapes, sizes etc. gives cause for a changing contact surface etc. in the clamping position. Still, it may even be advantageous in an embodiment such as this to provide a drive 110 with suitable drive elements, in order for the method described above to be carried out in a similar manner.

Although it is clear that numerous alternative embodiments are possible, in the embodiment of FIG. 18 a drive 110 is used which cooperates with a Bowden cable 400 the housing 420 of which and the cable 410 movable in the housing are attached to the two mutually movable fingers 100, respectively, of the gripper mechanism. According to the exemplary embodiment shown, according to this view the cable 410 is coupled to the left-hand finger 100 and the housing 420 is coupled to the right-hand finger 100. It is clear that alternative embodiments are possible, wherein for instance each finger is suitably coupled to its own Bowden cable. The exemplary embodiment shown, as can be seen, as force determining drive element 310 for instance comprises a passive spring coupled to the other end of the cable 410, so that during the clamping stage 204 the spring 310 exerts a mutual force on the cable 410 relative to the housing 420 so that both fingers are urged towards each other, similar to what has been described above. As is further schematically indicated, according to this embodiment, the drive furthermore comprises a position determining drive element 320 which for instance comprises a selective coupling or clamping element configured for upon activation preventing a movement of the cable 410 relative to the housing 420, so that similar to what has been described above during at least a part of the removal stage 206 the risk that the mutual distance between the fingers would impermissibly increase or change, is reduced. It is clear that according to this embodiment, the selective clamping element or the selective coupling 320 when switched off allows a returning movement of the cable 410 relative to the housing 420, for instance to permit the drive 110 during a depositing stage or during an approach stage to open the fingers again until the mutual distance is sufficiently large again for in an upward motion inserting a fruit 2 between the fingers.

Figure 19:
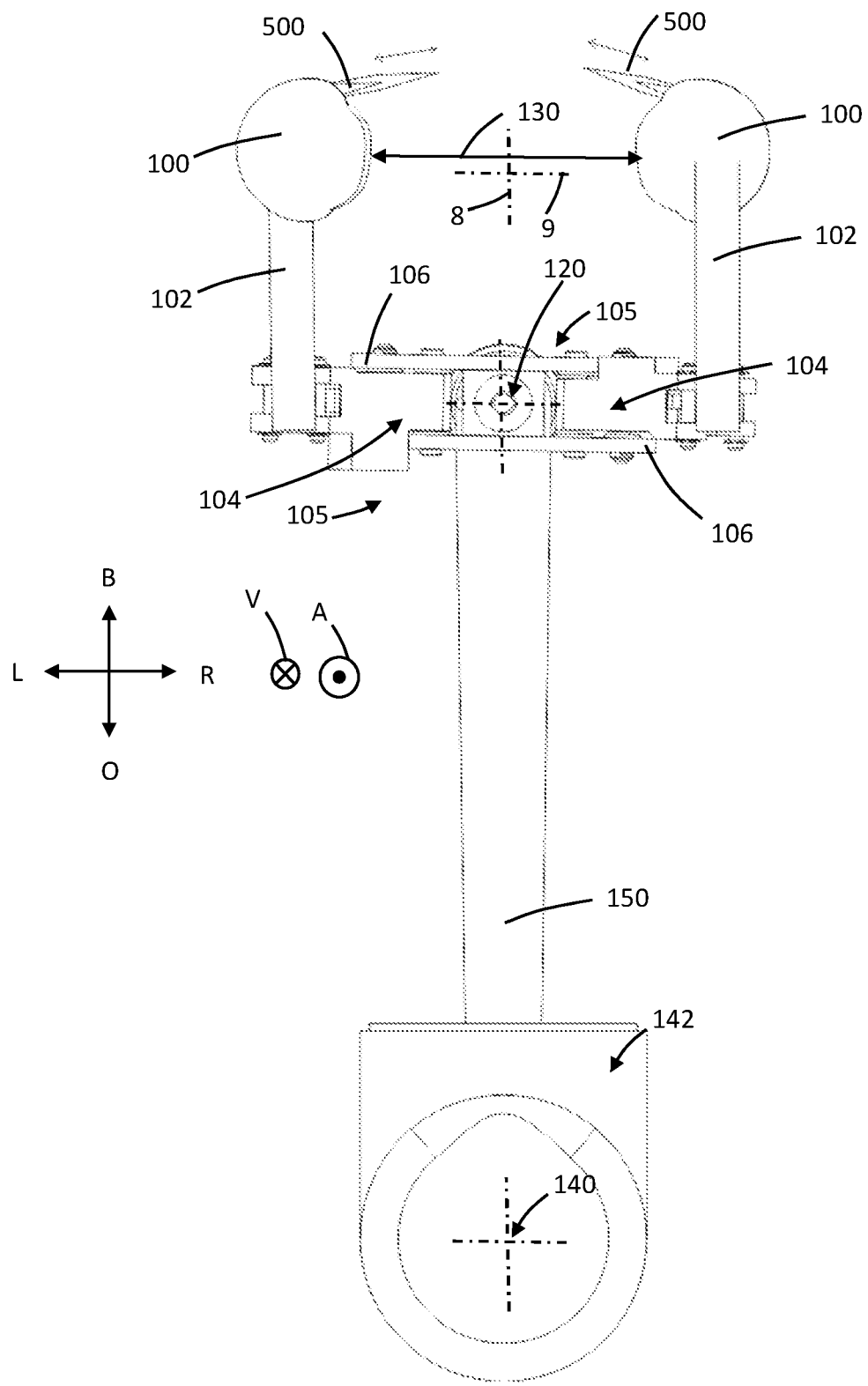

FIG. 19 shows yet a further embodiment, similar to the embodiment described in FIGS. 1-10 and similar elements are referred to with similar references and function similarly. The biggest difference with respect to the embodiment described above is that, as can be seen, one or more cutting elements 500 are disposed on the fingers 100. As can be seen, in particular also in FIGS. 20-24, the cutting elements 500 are disposed such that in the clamping position 304 they are oriented towards the stalk of the fruit to be picked and are situated next to the fruit to be picked. As indicated by the arrows, the cutting elements 500 may for instance be disposed on fingers 100 so as to be retractable, capable of being slid in, etc. in order for them to be extended only during the removal stage 206 when they perform their cutting operation as will be described in more detail below, so that the risk of interference with the fruit or the plant is avoided during the other stages of the method. According to the exemplary embodiment of FIG. 19, both fingers that are in the clamping position near the stalk 4 comprise such a cutting element 500. According to alternative embodiments, such as for instance will be elucidated below, it will sometimes suffice that only one finger is provided with such a cutting element and/or that the cutting elements are disposed on the fingers so as to be stationary.

FIGS. 20-24 show different stages of the method for picking a fruit using an embodiment of an apparatus similar to the one shown in FIGS. 11-15, wherein a cutting element 500 is disposed on the upper finger so that in the clamping stage 204 said cutting element 500 is oriented towards the stalk 4 of the clamped fruit, and in the removal stage 206 due to the rotation of the carrier with fingers about the axis of rotation 120, the cutting element contacts the stalk and cuts off the stalk so that at the end of the removal stage 206, as shown in FIG. 24, when the fruit 2 has already been detached from the plant 3 as is shown, a part of the stalk 4 is still attached to the fruit at the end 5 facing the fruit. This is advantageous for applying the method shown when it is wanted that the picked fruit still retains at least a part of the stalk 4.

Figure 25:
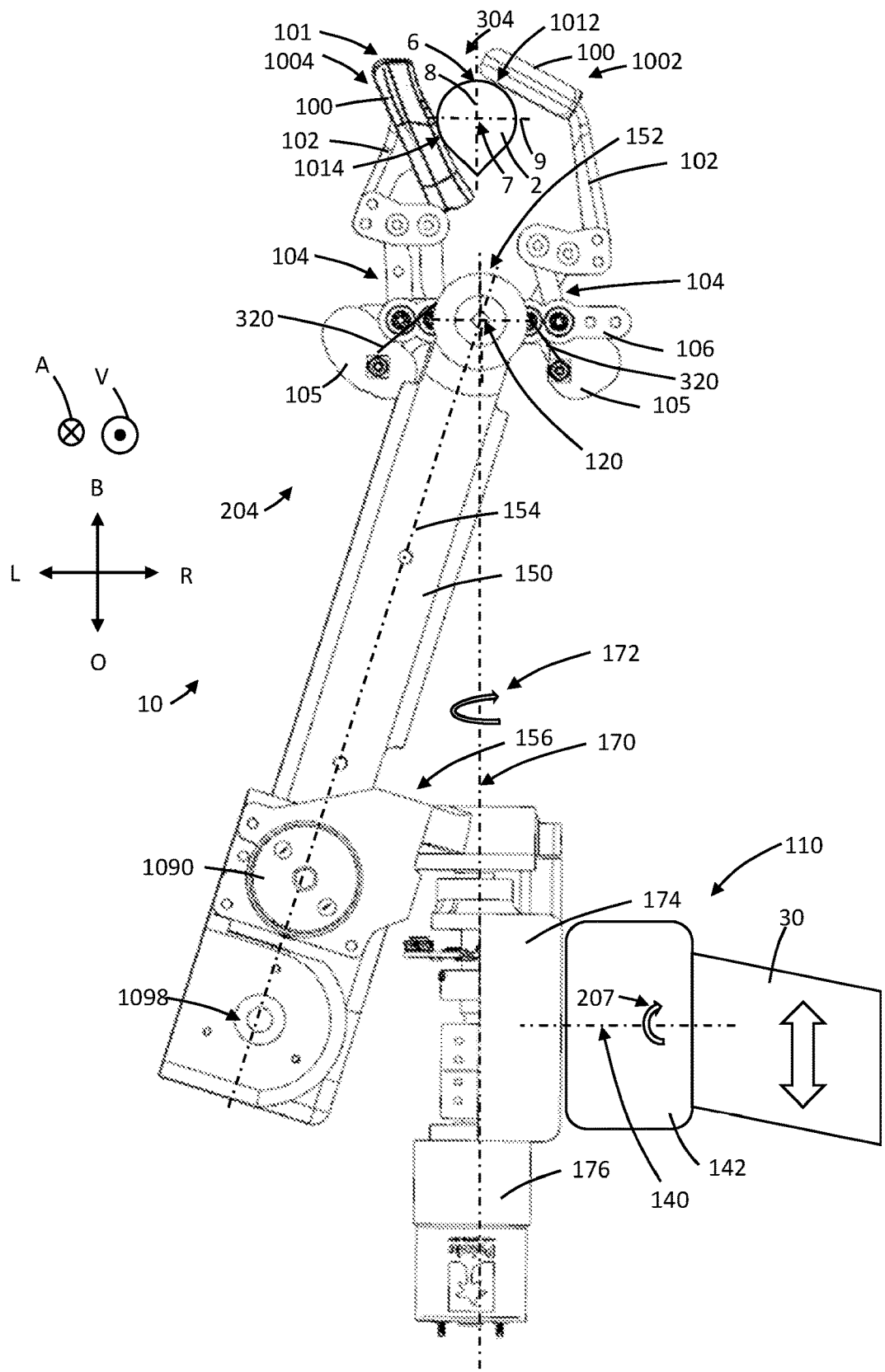
FIGS. 25-28 show a further alternative embodiment of the apparatus.

FIGS. 25-28 show a further embodiment of the gripper mechanism 10 similar to what has been described above. Similar elements are referred to by similar references and fulfill a similar function as described above. It is clear that this further embodiment of the gripper mechanism 10, also similar to what has been described above, can be used for carrying out a similar method for picking fruits. As can be seen, the gripper mechanism 10 also comprises two mutually movable fingers 100. The fingers 100, as can be seen in FIG. 25, are disposed on a carrier 106 so as to be mutually movable via a movement mechanism 104. The carrier 106 is then bearing mounted on a basis 150 so as to be rotatable about the axis of rotation 120. In the position of the gripper mechanism 10 shown in FIG. 25, said axis of rotation 120 is substantially horizontal. As can be seen the carrier 106, the movement mechanism, the little arms 102 and the fingers 100 sooner extend in the extension of the elongated carrier 150 from the outer end 152 where the axis of rotation 120 is situated. It is clear that in the previous exemplary embodiments as for instance shown in FIGS. 1-17, the carrier 106, the movement mechanism 104 and the fingers 100 sooner extend according to the direction of the longitudinal axis 120, or in other words sideward or transverse relative to the carrier 150. In the embodiment shown in FIG. 25, said elements are sooner situated in a plane transverse to the axis of rotation 120 and according to the longitudinal axis 154 of the elongated carrier 150. As can be seen, the elongated carrier 150 extends according to this longitudinal axis 154 from the one end 152 where the axis of rotation 120 is situated up to an opposing end 156. At the opposing end 156, the carrier 150 is rotatably bearing mounted for rotation about an axis of rotation 170, which in the position shown in the view of FIG. 25 is substantially vertical. Said axis of rotation 170 preferably is transverse to the axis of rotation 120 and preferably according to the view runs through the axis of rotation 120 and/or according to the direction of a first axis 8 through the point of attachment 6 and the center of gravity 7 of the fruit 2 during at least a part of the method for picking a fruit, for instance in the position as shown in FIG. 25 during a clamping stage 204. Not only does this embodiment of the gripper mechanism allow for the possibility of a suitable rotary motion about the axis of rotation 120 during for instance a subsequent removal stage 206, it also allows a suitable rotary motion about the axis of rotation 170. This makes it possible to supplement and/or replace any suitable tilting motion of the fruit, eccentrically relative to the axis of rotation 120, with and/or by a rotation about the axis of rotation 170, such as for instance indicated by arrow 172. The possibility of a suitable rotary motion about the axis of rotation 170 also allows the fingers 100 of the gripper to be positioned in the most suitable way relative to the fruit 2. In the position of the embodiment shown in FIG. 25 that makes use of two different types of fingers 1002 and 1004, the first finger 1002 being positioned on the right-hand side of the fruit, and the opposing second finger 1004 being positioned on the opposing left-hand side of the fruit 2. It is clear that a rotation of for instance 180° about the axis of rotation 170 from the position shown allows to position the fingers 1002 and 1004 the other way around relative to the fruit 2, that means with the first finger 1002 on the right-hand side and the second finger 1004 on the left-hand side of the fruit should this be more advantageous. It is clear that numerous alternative positions about the axis of rotation 170 are possible to make a suitable orientation of the fingers 100 relative to the fruit 2 possible. Therefore it is clear that in this way during any appropriate stage of the method for picking the fruit, the fingers 100 can be put in the most suitable position for grabbing, picking, retaining and depositing the fruit 2 to be picked by means of both axes of rotation 120 and 170.

According to the exemplary embodiment shown in FIG. 25, the elongated basis 150 is bearing mounted at its end 156 so as to be rotatable for rotation about axis of rotation 170 on an intermediate element 174. The rotary motion is for instance suitably realized by controlling a suitable actuator 176. As shown, this intermediate element 174 is also disposed so as to be rotatable on a drive element 142 for rotation about an axis of rotation 140, which similar to the exemplary embodiments described above is substantially horizontal in the position shown in FIG. 25. Similar to what has been described above, this drive element 142 according to the embodiment shown is for instance attached to an outer end of movable arm 30, which for instance allows the gripper mechanism to move up and down by means of suitable drive elements, as schematically shown by the dual arrow.

Furthermore, it is clear that according to the embodiment shown, both fingers 100 of the gripper mechanism are designed differently. At its free outer end, the first finger 1002 comprises a contact surface 1012 which, together with its little arm 102, as can be seen in the view of FIG. 25, when considered according to the direction of the axis of rotation 120, shows an L-shaped cross-section. It is clear then that the contact surface 1012 of said first finger 1002 is configured for, when considered according to the axis of rotation 120, contacting the fruit 2 at the top right-hand side. As can be seen, when considered according to the axis of rotation 120, as shown in FIG. 25, the fruit can be subdivided into four quadrants by means of axis 8 and reference plane 9. According to the embodiment shown, the contact surface 1012 of said first finger 1002 that only contacts the fruit 2 is situated in the top right-hand quadrant. Furthermore it is also clear that the second opposing finger 1004 comprises a contact surface 1014 which together with its little arm, in the view shown according to the direction of the axis of rotation sooner comprises a T-shape. The contact surface 104 of the second finger 1004 is then configured for only contacting the fruit in the opposing bottom quadrant, that means, for the situation shown in FIG. 25, in the quadrant on the bottom left-hand side of the fruit 2. Further, it is clear that when considered according to the axis of rotation 120, as shown in FIG. 25, the fingers 1002 and 1004 do not contact the fruit in both remaining quadrants, that means according to the situation shown in the top-left and bottom-right quadrants of the fruit 2. This is advantageous as this configuration allows realizing a clamping of the fruit 2, which even in case of relatively large variations in the dimension and shape of the fruit remains consistent and reliable. In addition, it is advantageous to leave one of the top quadrants of the fruit 2 free, so that when carrying out the picking motion, which uses a rotation about the axis of rotation 120 and/or axis of rotation 170, the stalk of the fruit 2 is given sufficient freedom to realize a suitable relative movement of the fruit with respect to the stalk when carrying out these rotary motions. This also ensures a reduction of the risk that the stalk is clamped between the fingers 100 and the fruit 2 during the clamping motion and/or the picking motion, which will make the removal of the fruit 2 from the stalk difficult. It is clear that alternative embodiments are possible wherein the shape of the finger 100, preferably the first finger 1002 is such that this finger also comprises a contact surface configured to clamp the fruit in the bottom quadrant of the fruit 2, or wherein more than two fingers 100 are present that also comprise a contact surface for the fruit 2 in the other bottom quadrant. It is clear that it is advantageous that also in such embodiments at least one top quadrant of the fruit remains free, or in other words, is not clamped by means of a contact surface of one or several fingers, in order for the stalk to remain free during the picking motion and not to get entangled or clamped between the fruit and the contact surface of a finger of the gripper mechanism.

Figure 26:
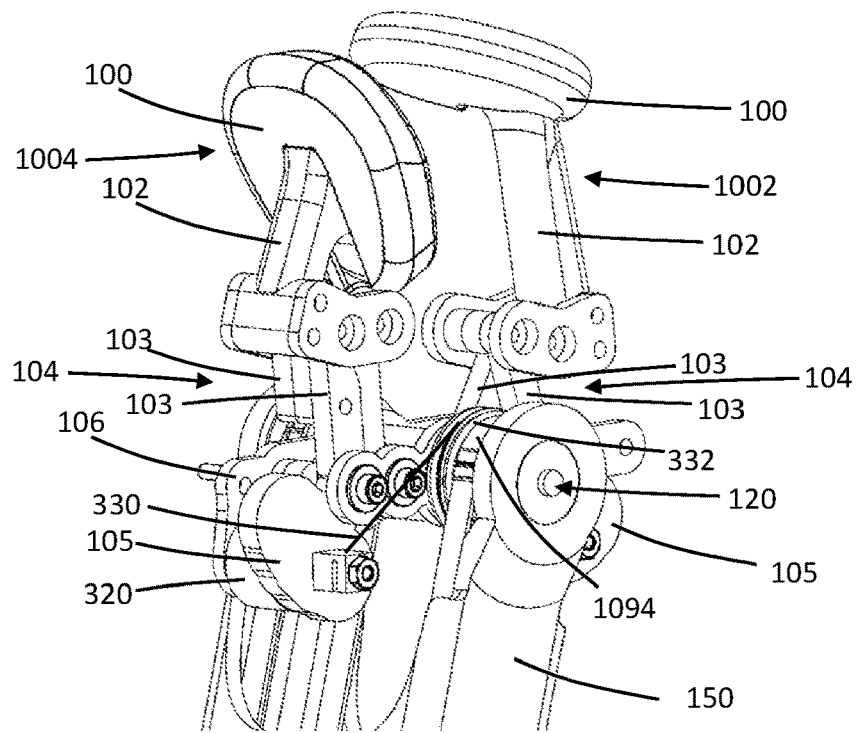
Figure 27:
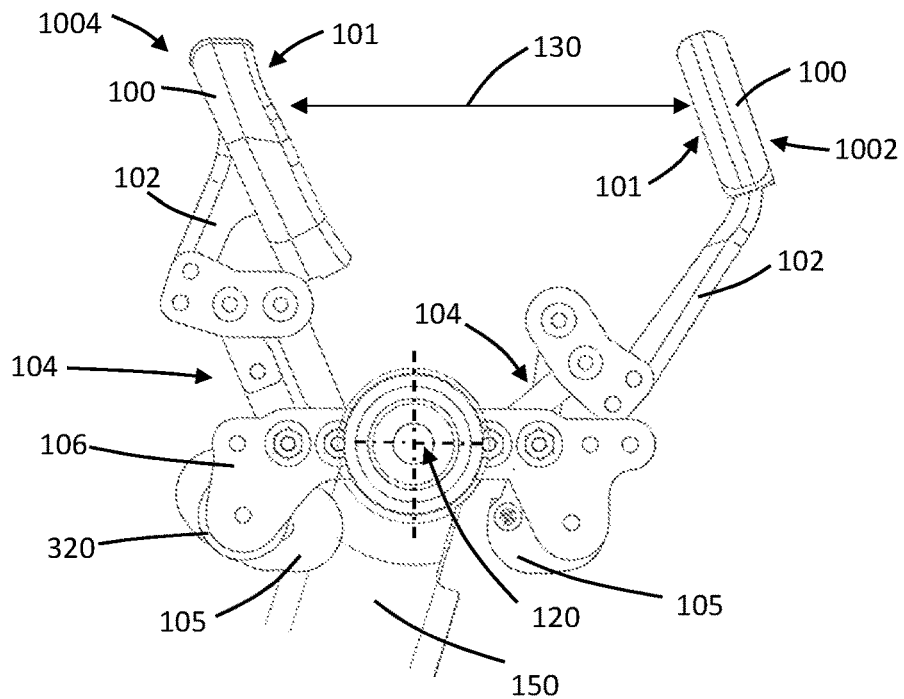

As can clearly be seen in FIG. 26, preferably the movement mechanisms of both fingers 100 are also preferably designed differently. In addition, the movement mechanism 104 is designed differently. It is clear that according to the exemplary embodiment shown both fingers, when considered according to the axis of rotation 120, move in a plane that is substantially transverse to the axis of rotation upon opening and closing the gripper mechanism, wherein the mutual distance between the contact surfaces of the fingers 100 is changed by means of suitable drive elements. Preferably the movement mechanism of the first finger 1002 with a contact surface 1012 for a top quadrant of the fruit 2 is then configured such that this finger carries out a movement the main component of which is a rotation or tilting motion relative to the carrier 106. As shown in FIGS. 25 and 26, the movement mechanism 104 to that end comprises a crossed rod mechanism 103 of which the points of rotation are situated in a plane transverse to the axis of rotation 120 and the points of rotation allow the outer ends of the crossed rod mechanism 103 to rotate about axes of rotation substantially according to the direction of the axis of rotation 120.

It is clear then that the crossed rod mechanism allows the contact surface of the first finger 1002, while closing the fingers 100 during the clamping stage 204, to slap onto the top side of the fruit next to the stalk. This tilting or slapping motion furthermore also allows to maximize the mutual distance between the fingers 100 in the opened position, such as for instance shown in FIG. 27, and also allows to maximize the mutual distance 130, so that for instance during the approach stage 202, the fruit 2 can be inserted in between the fingers without impediments.

The opposing second finger 1004 including a contact surface 1014 suitable for contacting an opposing bottom quadrant of the fruit 2, preferably comprises, as shown, a movement mechanism 104 configured for allowing the second finger 1004 to carry out a movement the main component of which is a translation or shifting relative to the carrier 106. According to the exemplary embodiment shown, the movement mechanism 104 of the second finger 1004 comprises a rod mechanism 103 with similar points of rotation as the first finger, however the rods are not crossed, but disposed substantially parallel, as a result of which the second finger 1004 will substantially carry out a translation relative to the carrier 106 when the movement mechanism 104 is driven by a suitable drive.

As can be seen in part in FIG. 26, this embodiment comprises a similar drive as described above for controlling the mutual distance between the fingers 100. In addition, the springs that act on the movement mechanism 104 of the fingers 100, for instance comprise a suitable elastic drive element that reduces the mutual distance between the fingers. According to the embodiment shown, this drive further comprises for instance a suitable cable drive 332 that is connected to the movement mechanism 104 to overcome the force of for instance the spring for increasing the mutual distance between the fingers. According to the exemplary embodiment shown this cable drive 332 is, for instance, driven via a pulley 1094 and belt 1096 operationally connected to an actuator 1098 that is disposed on the basis 150. Also similar to the exemplary embodiments described above, the rotation of the carrier 106 about the axis of rotation 120 is for instance controlled by means of pulley 109 coupled to the carrier 106, which pulley is controlled via a belt 1092 by means of an actuator 1090 that is also disposed on the basis 150. It is clear that, alternative embodiments similar to the ones described above are possible for on the one hand driving the opening and closing of the fingers of the gripper mechanism, and on the other hand carrying out the rotary motion about the axis of rotation 120.

Figure 28:
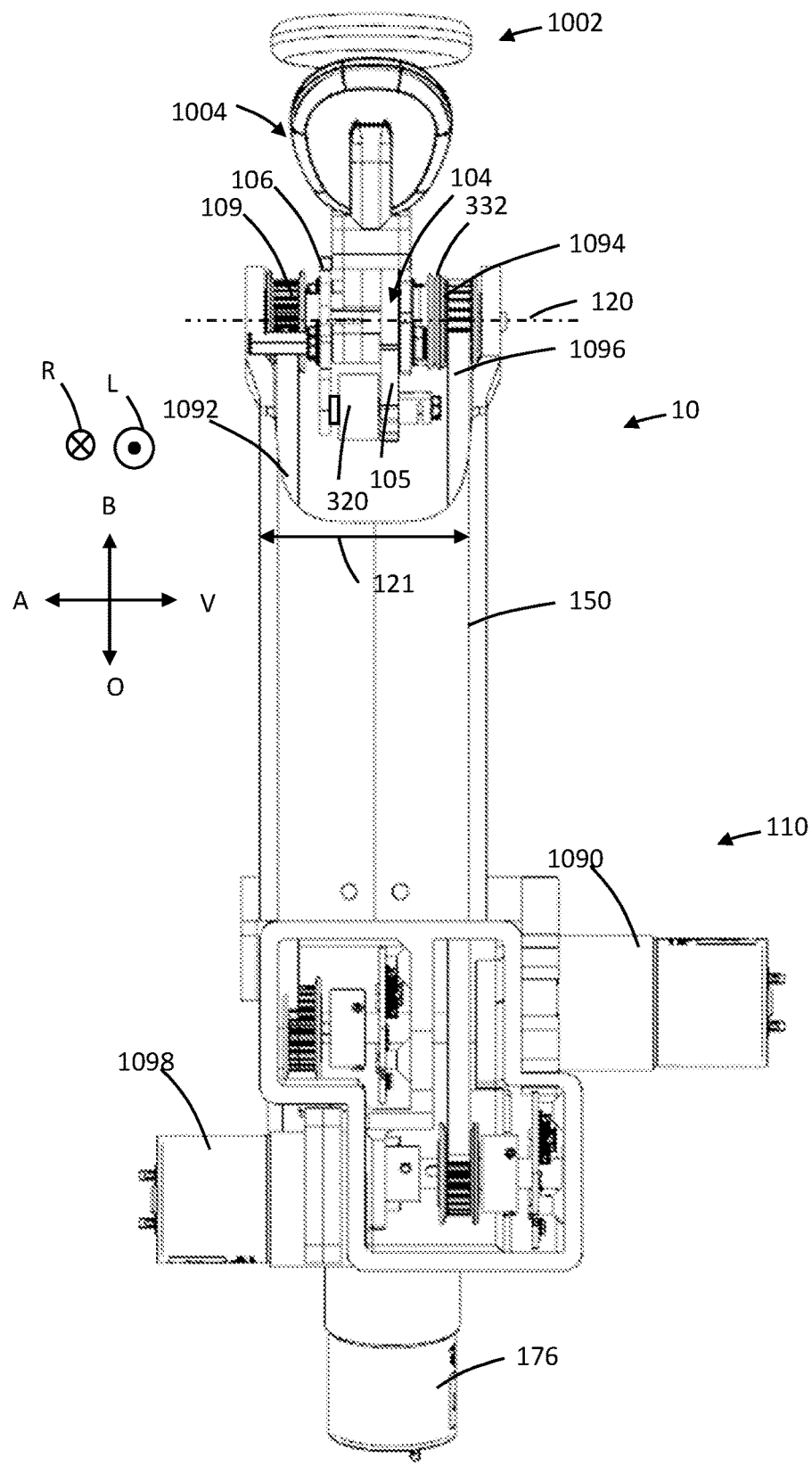

It is clear that, as can be seen in FIG. 28, the distance 121 which in accordance with the direction of the longitudinal axis 120 is covered by the basis 150, the fingers 100, the carrier 106, the movement mechanisms 104, etc., in particular from the outer end 152 of the basis 150, is kept to a minimum. This is particularly advantageous when picking fruits that may hang close to other fruits, for instance in case of fruits that may hang in bunches or strings, as in that way the gripper mechanism interfering with adjacent fruits during picking a fruit can be diminished. In other words, when considered from above, the part of the gripper mechanism that may get into contact with adjacent fruits during carrying out the method for picking a fruit is diminished. In particular that means that the distance 121, as can be seen in FIG. 28 according to the direction of the longitudinal axis 120 along which the basis 150, the fingers 100, the movement mechanism 104, etc. extend, in particular the elements of the gripper mechanism which during picking get close to the fruits is diminished, relative to the embodiments described above.

It is also clear that this embodiment, as shown in FIGS. 25-28 is also suitable for carrying out the method described above for picking a fruit wherein, as schematically shown, use can be made of similar position determining drive elements 320 and force determining drive elements, such as for instance the above-mentioned elastic drive element in the form of a spring.

It is clear that in the embodiment of the method as shown in FIGS. 20-28, the direction of rotation during the removal stage 206 is opposing the direction of rotation in the embodiment of the method shown in FIGS. 11-15. It will therefore be clear that the gripper mechanism according to the invention allows to select, according to choice, a suitable rotary direction for the carrier including fingers about the axis of rotation, in particular during the removal stage 206.

It is clear that further different embodiments are possible. In particular it may also be advantageous to apply the advantageous gripper mechanism the exemplary embodiments of which were shown in for instance FIGS. 1-17 and 19-28, in other methods for picking fruits. In such conditions for instance a position controlled drive element, such as for instance the solenoids shown, can be dispensed with, and the position of and/or the force delivered by the fingers can be driven by any other suitable drive.

FIGS. 29-41 show further embodiments of a gripper mechanism 10 similar to what has been described above. Similar elements are referred to by similar references and fulfill a similar function as described above. It is clear that these further embodiments of the gripper mechanism 10, similar to what has been described above, can be used for carrying out a similar method for picking fruits. As can be seen in for instance FIG. 29, the gripper mechanism 10 also comprises two mutually movable fingers 100. As can be seen in FIGS. 29-40, the fingers 100 are disposed on a carrier 106 so as to be mutually movable via a movement mechanism 104 and via an actuator 1098. The carrier 106 is then bearing mounted on a basis 150 so as to be rotatable about the axis of rotation 120. It is clear that, as will be described in more detail below that the actuator 1098 controlling the mutual positioning of the fingers 100 is disposed on the carrier 106 instead of on the basis 150. In the position of the gripper mechanism 10 shown in FIGS. 29-34, said axis of rotation 120 is substantially horizontal. As can for instance be seen in FIGS. 29-34, the carrier 106, the movement mechanism 104, the little arms 102 and the fingers 100 sooner extend in the extension of the elongated carrier 150 at the outer end 152, where the axis of rotation 120 is situated, similar to the embodiment described on the basis of FIGS. 25-28. In the embodiment shown in for instance FIGS. 29-34, said elements therefore are sooner situated in a plane transverse to the axis of rotation 120 and they generally comprise an elongated character in line with the longitudinal axis 154 of the elongated carrier 150.

Figure 29:
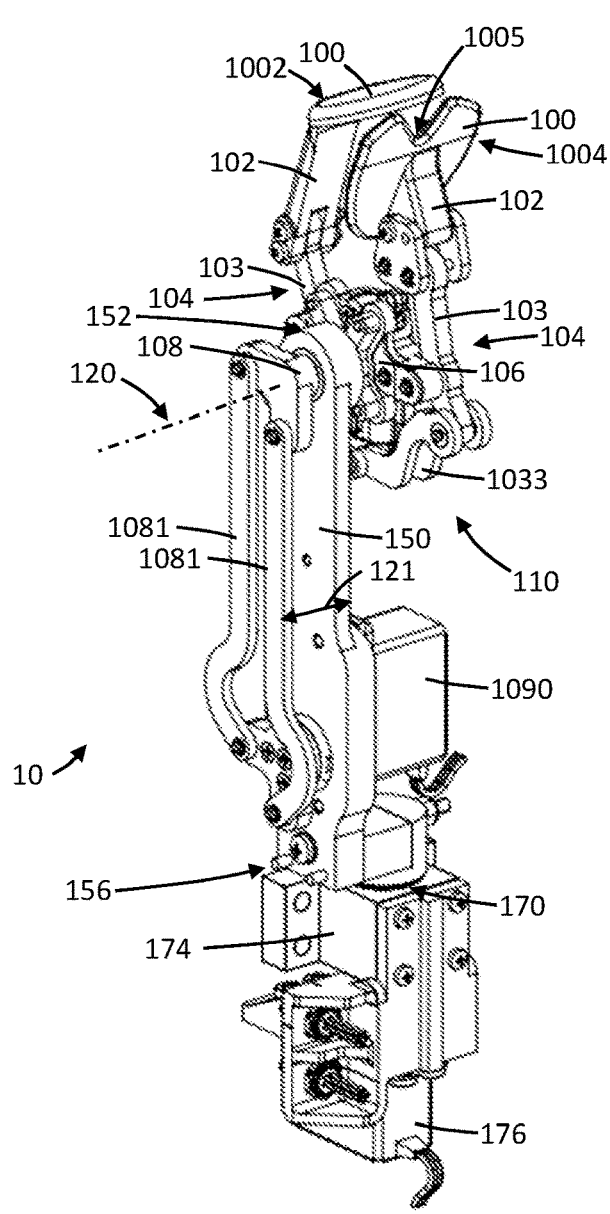
Figure 30:
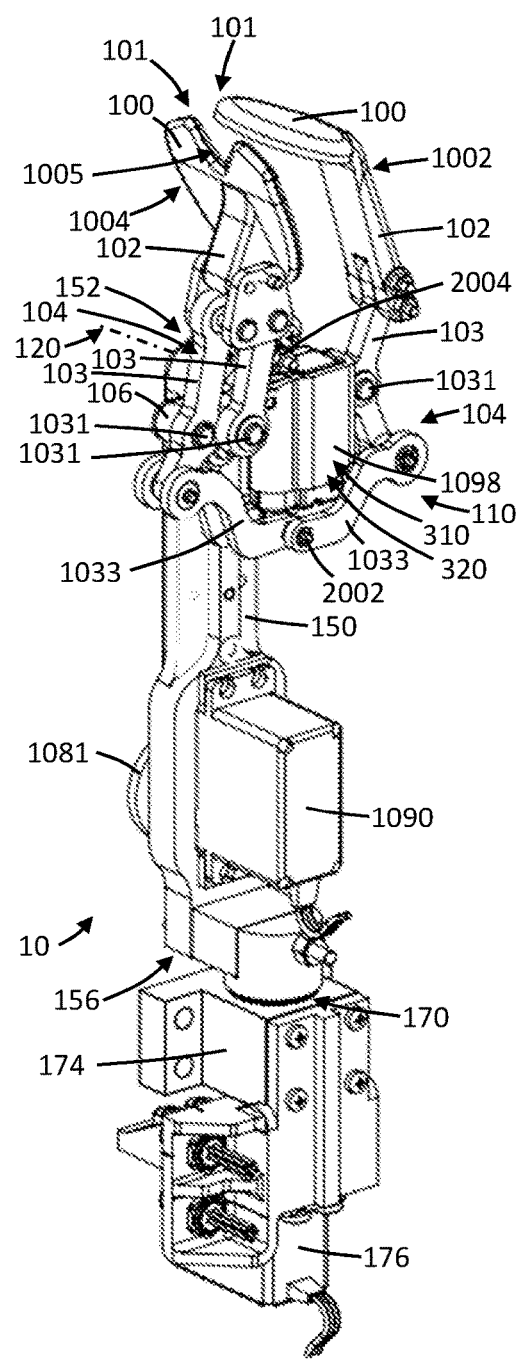
Figure 31:
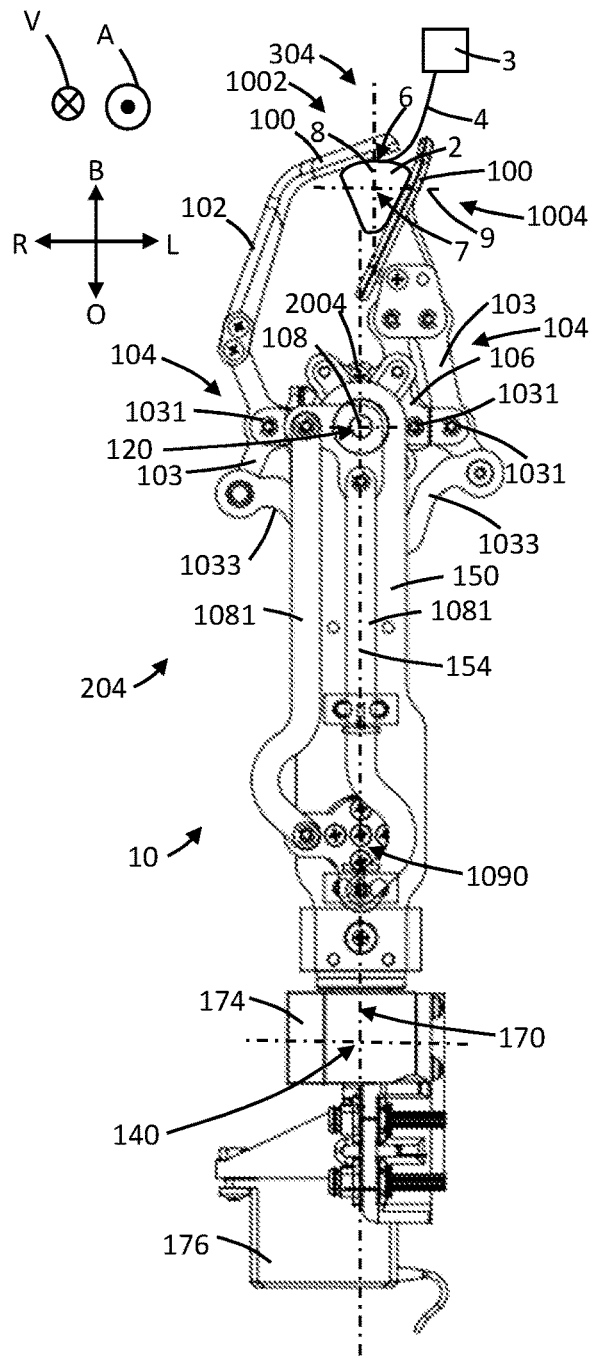
Figure 32:
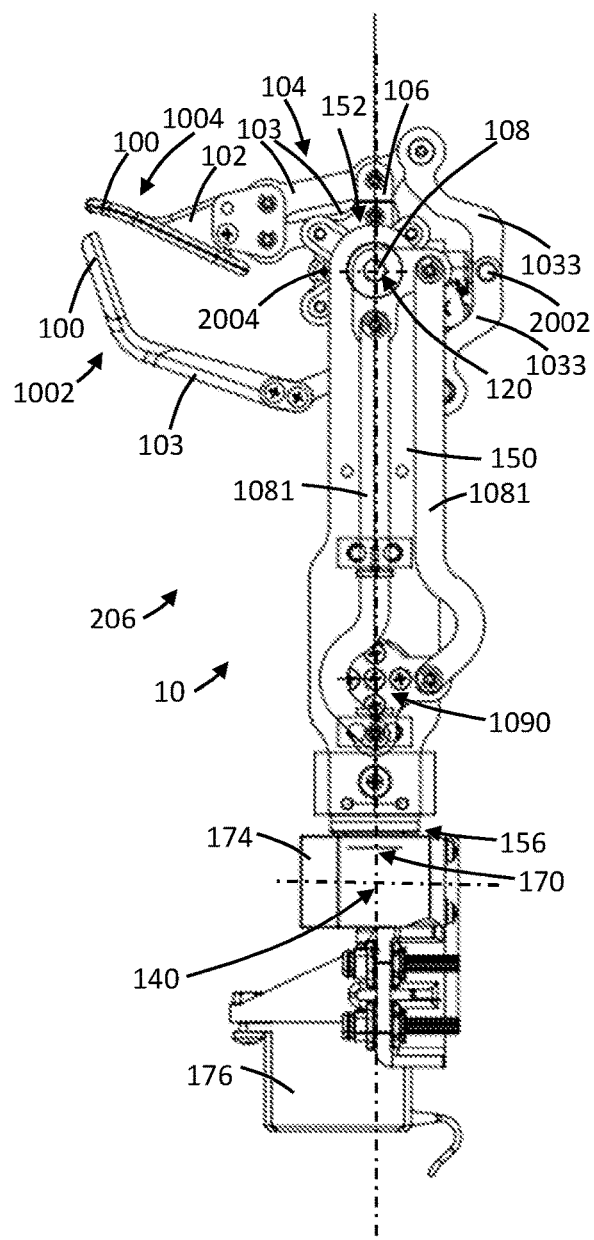

As can be seen, the elongated carrier 150 extends according to this longitudinal axis 154 from the one end 152, where the axis of rotation 120 is situated, up to an opposing end 156. At the opposing end 156 the carrier 150 is rotatably bearing mounted for rotation about an axis of rotation 170, which in the position shown in the view of FIGS. 29-34 is substantially vertical. Said axis of rotation 170 preferably is transverse to the axis of rotation 120 and for instance, similar to what has been described above, runs through the axis of rotation 120 and/or according to the direction of a first axis 8 through the point of attachment 6 and the center of gravity 7 of the fruit 2 during at least a part of the method for picking a fruit, for instance in the position as shown in FIG. 31 during a clamping stage.

Similar to what has been described above, this embodiment of the gripper mechanism not only allows the possibility of a suitable rotary motion about the axis of rotation 120 during for instance a subsequent removal stage 206, it also allows a suitable rotary motion about the axis of rotation 170. This makes it possible to supplement and/or replace any suitable tilting motion of the fruit, eccentrically relative to the axis of rotation 120, with and/or by a rotation about the axis of rotation 170, such as for instance indicated by arrow 172. The possibility of a suitable rotary motion about the axis of rotation 170 also allows the fingers 100 of the gripper to be positioned in most suitable manner, for instance relative to the fruit 2 for carrying out the picking motion or relative to the receptacle 40 for depositing the fruit 2, similar to what is shown in FIG. 6. FIGS. 29 and 30 show a similar view wherein the gripper mechanism 10 is placed with its basis 150 in various angular positions about this axis of rotation 170. Similar to what has been described above in relation to the embodiment shown in FIG. 25, which makes use of two different types of fingers 1002 and 1004, a rotation about the axis of rotation 170 may allow to position the fingers 1002 and 1004 in the most suitable manner relative to the fruit 2. It is clear that numerous alternative positions about the axis of rotation 170 are possible apart from the positions shown in the Figures, in order to make a suitable orientation of the fingers 100 possible, for instance relative to the fruit 2 during the picking motion, relative to the receptacle 40 during depositing the fruit, etc. Therefore it is clear that in this way, during any suitable stage of the method for picking the fruit, the fingers 100 can be put in the most suitable position for grabbing, picking retaining and depositing the fruit 2 to be picked by means of both axes of rotation 120 and 170, and optionally other axes of rotation present and/or other movement elements and/or degrees of freedom of the gripper device 10, such as for instance the axis of rotation 140, the movable arm 30, etc.

Figure 33:
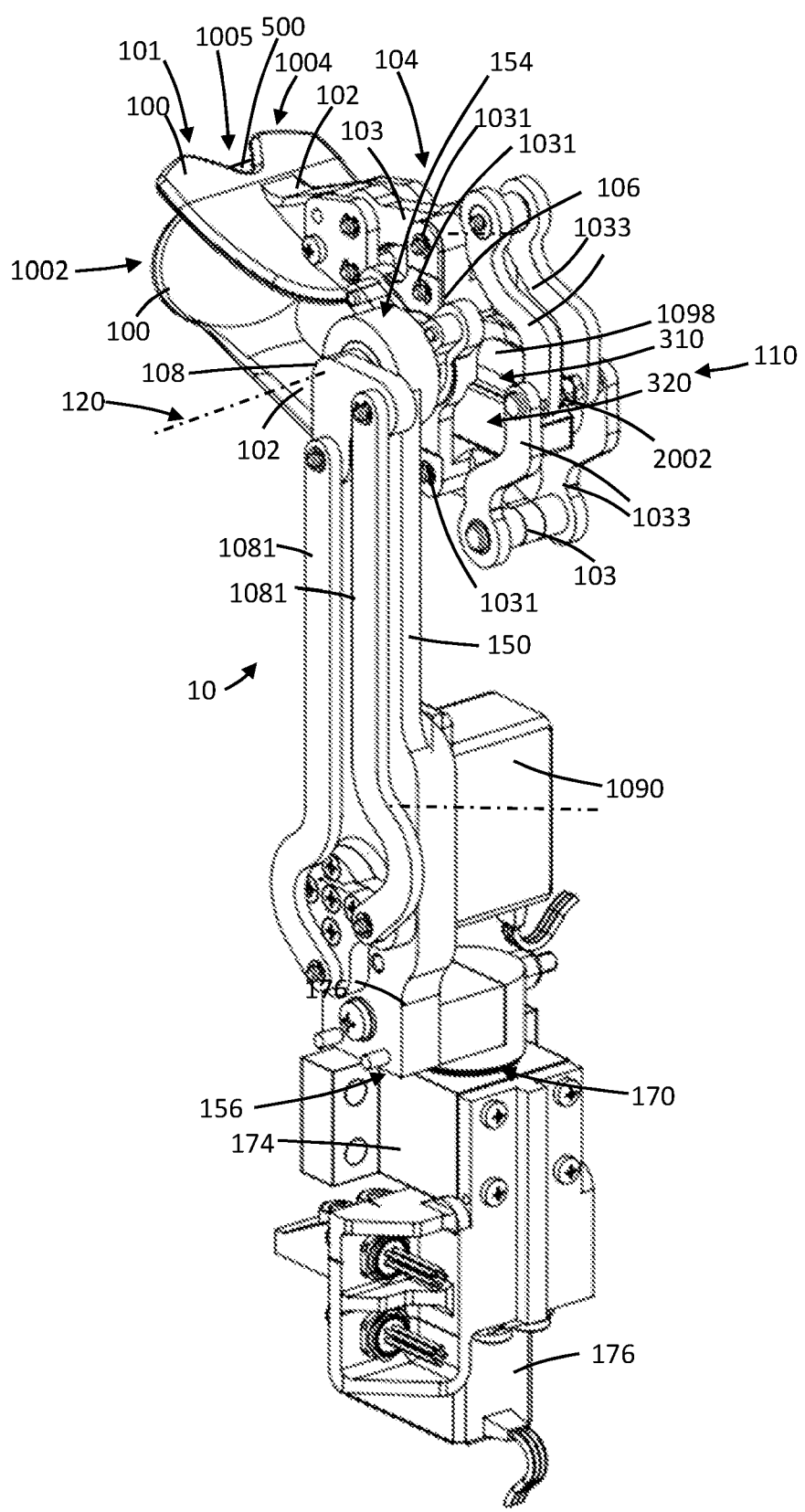
Figure 34:
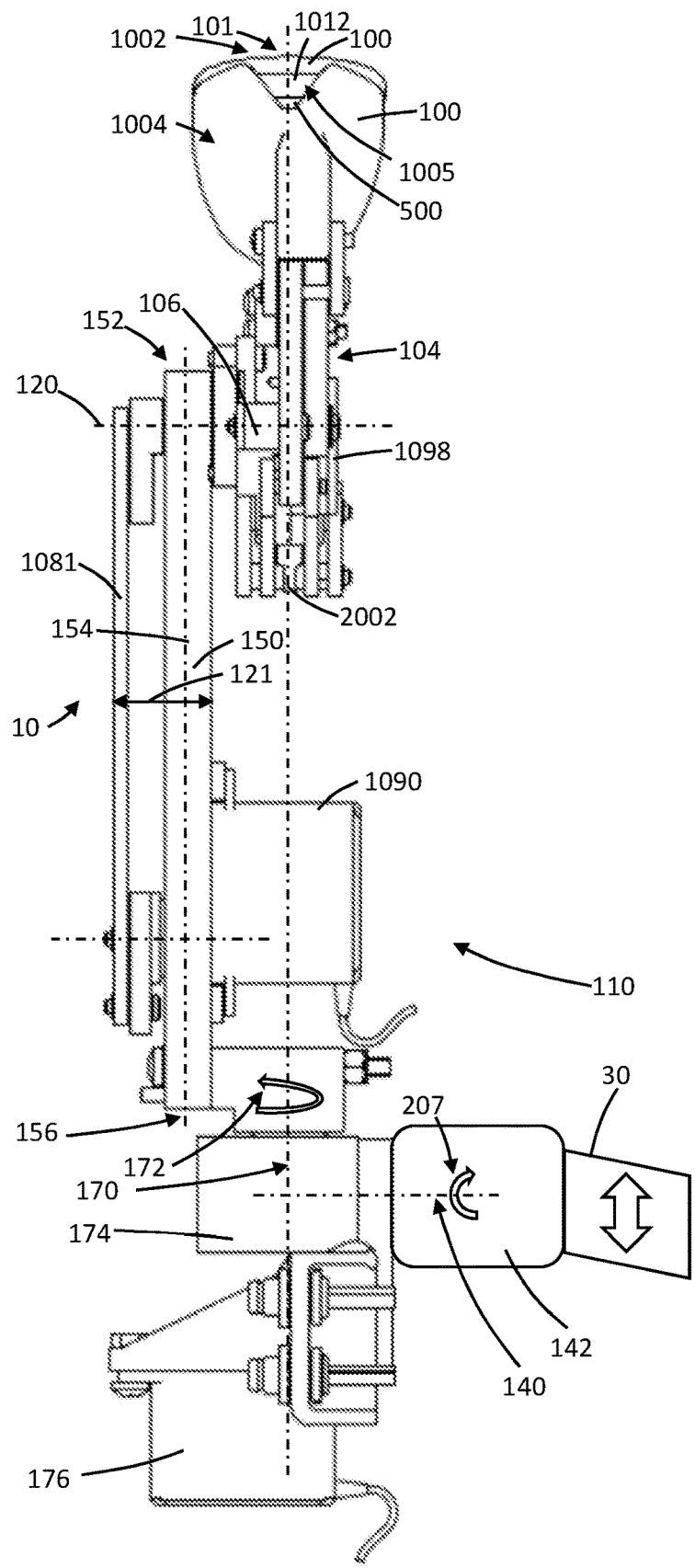

According to the exemplary embodiment shown in FIGS. 29-34, the elongated basis 150 is bearing mounted at its end 156 so as to be rotatable for rotation about axis of rotation 170 on an intermediate element 174. The rotary motion is for instance suitably realized by controlling a suitable actuator 176. Said intermediate element 174, as schematically shown in FIG. 34, is for instance also rotatably disposed on a drive element 142 for rotation about an axis of rotation 140, which similar to the embodiments described above, is substantially horizontal in the position shown in FIG. 34. Similar to what has been described above, this drive element 142 according to the embodiment shown is for instance attached to an outer end of movable arm 30, which for instance allows the gripper mechanism 10 to move up and down by means of suitable drive elements, as schematically indicated by the dual arrow.

Similar to what has been described above in relation to the embodiment of FIG. 25, the fingers 1002, 1004 preferably are configured differently in order to realize an optimal clamping of the fruit and leaving the stalk free to an optimal extent during carrying out the picking motion. According to the exemplary embodiment shown the second finger 1004, which for instance is configured such that this finger comprises a contact surface configured for clamping the fruit in the bottom quadrant of the fruit 2, comprises a central notch 1005 at the extreme end 101. Said central notch 1005 is advantageous as the risk of an unwanted clamping of the stalk of a fruit during carrying out the picking motion is even further diminished. Especially during the tilting motion from for instance the position shown in FIG. 31 to the position shown in FIGS. 32 and 33, said notch 1005, which acts as a kind of guide for the stalk 4 of the fruit 2, increases the free space for the stalk of the fruit at the top. According to a different embodiment, such as for instance shown in FIGS. 33 and 34, this notch 1005 is particularly suitable for disposing for instance a cutting element 500 similar to what has been described above, as a cutting element 500 inserted into this notch 1005 during approaching the fruit is retracted relative to the extreme end 101 of the finger 100, but during and/or after carrying out the tilting motion, in particular about the axis of rotation 120, such as for instance shown in FIG. 33, is nevertheless put into contact with the stalk of the fruit which is guided to the cutting element 500 via the notch in order to make an efficient cutting motion possible in that way. It is clear that further alternative embodiments of the method and the apparatus for picking a fruit are possible, wherein a cutting element can be utilized advantageously. It is advantageous for instance when the gripper mechanism 10 comprises a cutting element 500, wherein the cutting element 500 is able to selectively contact the stalk 4 of the fruit 2. This means that during carrying out a method for picking a fruit, such a cutting element selectively, that means not always, on the basis of the setting and/or control of the gripper mechanism or cutting element, and/or on the basis of the setting and/or arrangement of the cutting element, contacts the stalk of the fruit during the picking motion for carrying out a cutting operation or not.

For instance, depending on the wanted picking method, meaning for instance wanting to pick fruit either with or without a part of the stalk, it may be advantageous that the cutting element 500 can be set such that the cutting element 500 either does or does not contact the stalk. According to an embodiment, depending on the wanted picking method, the cutting element can be set in a retracted position or a position in which it is extended to the outside. According to an embodiment, the selective controlling of the cutting element 500 can take place by controlling a suitable controller and/or actuator, however it is also clear that a manual setting of the cutting element 500 is possible, wherein for instance depending on the wanted picking method the cutting element is manually placed in the appropriate condition.

It is clear that further alternative embodiments are possible for an apparatus wherein the gripper mechanism 10 comprises a cutting element 500 that is configured for selectively contacting the stalk 4 of the fruit 2. For instance, the cutting element 500 can selectively contact the stalk during for instance the removal stage on the basis of the force exerted on the stalk. The cutting element 500 may for instance be positioned such that for instance in the tilting motion about the axis of rotation as described above, the stalk does not contact the cutting element 500 if a specific threshold value for the force on the stalk is not exceeded. Should this threshold value be exceeded indeed before the fruit is removed from the stalk, the stalk contacts the cutting element 500 and is cut off by the cutting element 500. It is clear that such an embodiment of the method ensures that the cutting element 500 is for instance utilized only when the tilting motion does not suffice to remove the fruit from the stalk. However, it is clear that alternative embodiments are possible wherein when carrying out a plurality of picking motions it is determined beforehand, or on the basis of a specific pattern, point in time, temperature, type of fruit, etc. to either utilize the cutting element 500 or not during a number of the picking motions. It is clear that for instance selectively in a plurality of picking motions, for instance during picking a specific type of fruit, the cutting element 500 cannot be utilized, and that subsequently in a plurality of picking motions, for instance during picking a different type of fruit, the cutting element 500 can be utilized indeed. In such embodiments, this means that the cutting element is selectively utilized, because when carrying out several picking motions, during one or more picking motions the cutting element is indeed utilized and during one or more picking motions it is not utilized. Or in other words, that such an embodiment of the gripper device comprises a cutting element 500 configured for during carrying out a plurality of picking motions: during at least one or more picking motions getting into contact with the stalk 4 of the fruit 2; and during at least one or more picking motions not getting into contact with the stalk 4 of the fruit 2.

Figure 38:
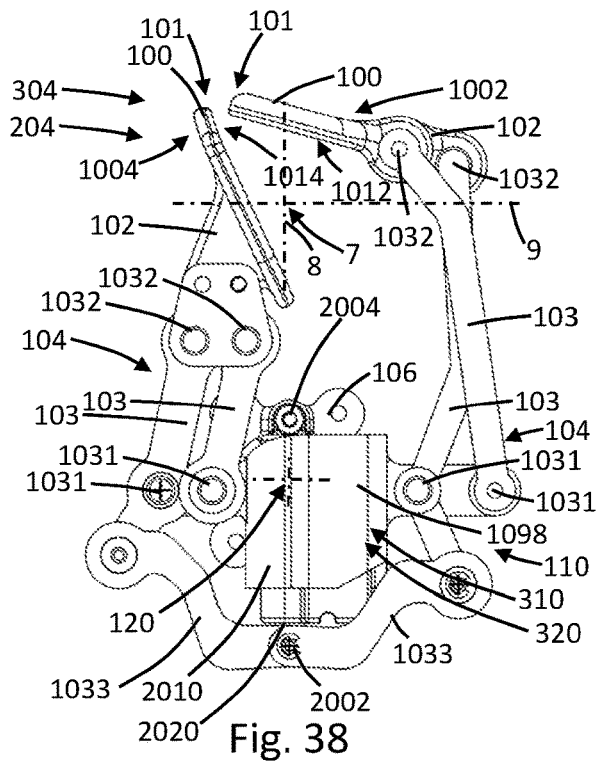
Figure 39:
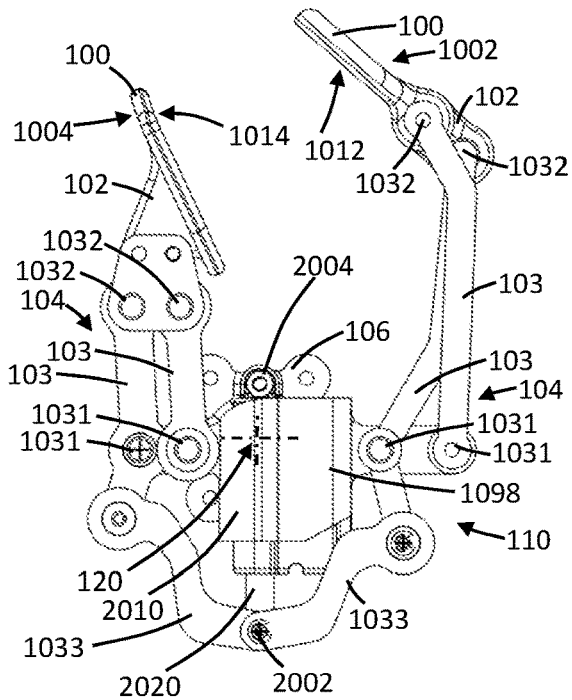
Figure 40:
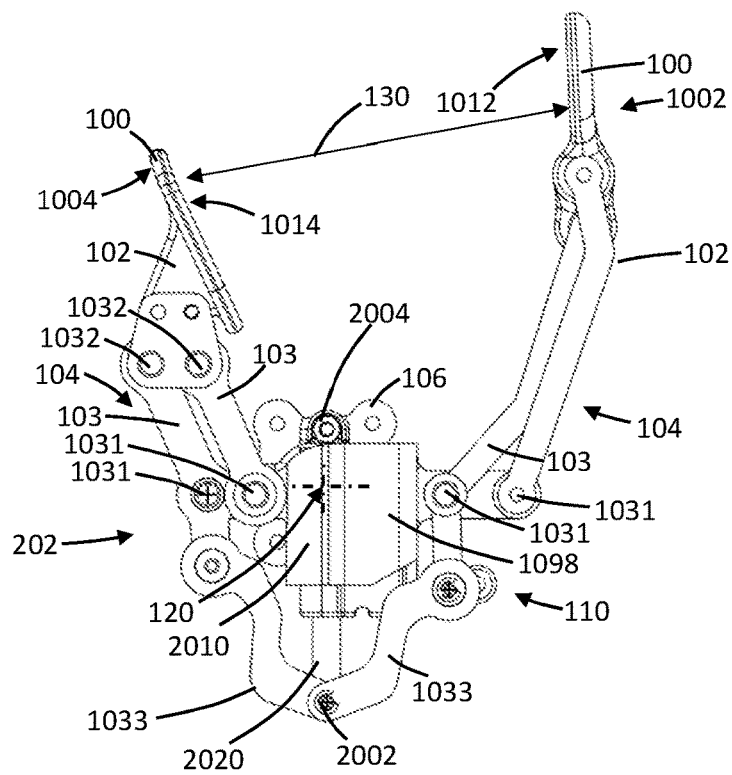

According to further embodiments, similar to the ones described above, the cutting element can be selectively utilized by means of for instance the choice of the specific angular displacement of the fingers about the axis of rotation 120. If the angular displacement does not exceed a specific threshold value, for instance the cutting element disposed on the finger will not contact the stalk. Should the threshold value be exceeded indeed, the cutting element 500 will indeed contact the stalk during the picking motion to cut the stalk in order for the fruit to be removed. Clearly, further alternative embodiments are possible, wherein for instance the cutting element 500 is or is not activated, or in other words is selectively activated, on the basis of for instance a force exerted on the stalk, on the fingers, on the fruit, etc., wherein said force is for instance measured using a suitable sensor or was derived from the As shown in more detail in FIGS. 35-41, the exemplary embodiment shown of the actuator 1098 for controlling the mutual movement of the fingers 100 is a linear actuator 1098 disposed between the carrier 106 and the movement mechanism 104 of the fingers 100. The rod mechanism 104 of the fingers 100 is configured similar to the embodiment of FIG. 25 described above. That means that on the side facing away from the fingers 100, the little arms 102 of the fingers 100 are suitably coupled to one or more little arms 103 that are bearing mounted on the carrier 106 so as to hinge. Similar to the embodiment in FIG. 25, the movement mechanism 104 of both fingers 1002, 1004 is designed differently. It is clear then that according to the exemplary embodiment shown in FIGS. 29-41 both fingers, when considered according to the axis of rotation 120, move in a plane, substantially transverse to the axis of rotation 120, when opening and closing the gripper mechanism. For that purpose, as shown, similar to the embodiment of FIG. 25, the movement mechanism 104 comprises a rod mechanism including rods 103 that are bearing mounted to the carrier 106 in bearing points 1031 for rotation about an axis of rotation substantially parallel to the axis of rotation 120. Preferably the movement mechanism 104 of the first finger 1002 with a contact surface 1012 for a top quadrant of the fruit 2 is then configured such that this finger carries out a movement having a rotation or tilting motion relative to the carrier 106 as main component. In the exemplary embodiment shown in FIGS. 29-37, the rod mechanism, as shown, for that purpose comprises a single rod 103 that is fixedly connected to the little leg 102 of the finger 1002 so that the finger hinges about the hinge point 1031 of said rod 103. According to an alternative embodiment, similar to the exemplary embodiment shown in FIG. 25, use can also be made of a crossed rod mechanism 104, such as for instance shown in FIGS. 38-40. Similar to what has been described above, the movement mechanism 104 with such a crossed rod mechanism comprises rods 103 the points of rotation 1031, 1032 of which are situated in a plane transverse to the axis of rotation 120, or in other words with the axes of rotation parallel to the axis of rotation 120. As shown in FIGS. 29-37, the points of rotation 1031 with which the crossed rods 103 are attached to the carrier 106, are configured such that they allow the points of rotation 1031 at the outer ends of the crossed rods 103 to which the first finger 1002 is attached, to rotate such about axes of rotation, substantially according to the direction parallel to axis of rotation 120, that this first finger 1002 carries out a tilting or slapping motion as shown in the sequence of FIGS. 38-40. It is clear then that such movement mechanisms 104 that enable a tilting motion, allow the contact surface of the first finger 1002, while closing the fingers 100 during the clamping stage 204, to slap onto the top side of the fruit, preferably next to the stalk. Furthermore, said tilting or slapping motion also allows to maximize the mutual distance 130 between the fingers 100 in the opened position in an optimal manner, such as for instance shown in FIGS. 37 and 40, respectively, so that for instance during the approach stage 202, the fruit 2 is able to slide in between the fingers 100 unimpeded, whereas interference with adjacent fruits is avoided as much as possible. In addition, the embodiment of FIGS. 38-40 is particularly advantageous because the points of rotation 1032 of the rods 103 at the end of the finger 1002 are situated in a top quadrant of the fruit, that means, as shown above the substantially horizontal reference plane 9 through the center of gravity 7 of a fruit 2 to be picked in the clamping position 304 such as for instance shown in FIG. 38. As a result the mutual distance 130 between the fingers, for instance during the approach stage 202 as shown in FIG. 40, can be maximized for an associated minimum width of the gripper mechanism 10 according to this direction, so that the risk of interference with adjacent fruits is avoided. Furthermore it is clear that the opposing points of rotation 1031 of said rods 103 of said finger 1002 are situated below this reference plane 9 in the clamping position 304, as schematically shown in FIG. 38. According to the embodiment shown in FIGS. 38-40, an optimal slapping motion can thus be carried out using the rods 103 of the crossed rod mechanism 104, wherein the movement of the finger 1002 is situated above the reference plane 9, in the top quadrant of the fruit to be picked, and wherein the rod mechanism 104 bridges the distance between the carrier 104 and the finger 1002 such that when moving the finger 1002, the width of the gripper mechanism according to the direction of the mutual distance between the fingers or when considered from above not, remains as limited as possible. It is clear that alternative embodiments are possible, wherein similar to the exemplary embodiment shown, the movement mechanism 104, for at least one of the fingers 100 comprises a rod mechanism including one or more rods 103 which at one end are bearing mounted to a point of rotation 1031 on the carrier 106 and at an opposite end are bearing mounted to a point of rotation 1032 on the finger 100, wherein the points of rotation 1031, 1032 of the rods 103 have an rotary shaft that is parallel to the axis of rotation 120 of the bearing of the carrier 106 in the basis 150. Similar to what has been described above, such fingers 100 preferably are configured such that during the clamping stage 204 and/or the removal stage 206, and/or in the clamping position 304, they are positioned such that they clamp the fruit with a contact surface in the top quadrant and the opposing bottom quadrant of the fruit 2. Preferably, similar to the exemplary embodiment shown in FIGS. 38-40 the one or more points of rotation 1032 of the one or more rods 130 at the end of the finger 100 with the contact surface in the top quadrant of the fruit 2, are also situated above the reference plane 9 in the clamping position, and preferably in the same top quadrant as this finger. Preferably this rod mechanism makes use of a crossed rod mechanism, which, as described above, is configured to have this finger carry out a slapping motion above the reference plane 9 wherein, on the side of this finger, the width of the gripper mechanism is changed as little as possible.

Similar to the embodiment of FIG. 25, in the embodiments of FIGS. 29-40 the opposing second finger 1004 is also provided with a contact surface 1014 that is suitable for contacting for instance an opposing bottom quadrant of the fruit 2. Preferably, as shown, a movement mechanism 104 is coupled to the second finger which mechanism is configured for having the second finger 1004 carry out a movement of which the main component is a translation or shifting relative to the carrier 106. According to the exemplary embodiment shown, the movement mechanism 104 of the second finger 1004 for that purpose comprises for instance a parallel rod mechanism 103 that is disposed at the carrier 106 with hinge points 1031 and at the opposing side with points of rotation 1031 to which the little arm 102 of the second finger 1004 is disposed. It is clear that as a result, the second finger 1004 will substantially carry out a translation relative to the carrier 106 when the movement mechanism 104 is driven by the actuator 1098 of the drive 110, such as for instance shown in the sequence from the closed position into the opened position of the fingers in FIGS. 35-37 and 38-40, respectively.

As for instance can be seen in FIGS. 35-40, according to the exemplary embodiment shown the actuator 1098 of the drive 110 is configured as a linear actuator 1098, which is suitably coupled between the carrier 106 and the movement mechanism 104 of the gripper to control the mutual distance between the fingers 100. Clearly, alternative exemplary embodiments are possible wherein for instance another suitable type of actuator is utilized, and/or wherein one or more actuators are directly coupled to one or more respective fingers, etc. According to the exemplary embodiment shown, the linear actuator 1098 at a first end 2002 is coupled to suitable rods 1033 of the movement mechanism 104, which couple this first end 2002 so as to hinge to the rods 103 at the opposing end of the fingers 100. The linear actuator 1098, as shown, comprises an opposing end 2004 that is disposed on the carrier 106. It is clear then that the linear actuator 1098 is configured for suitably controlling the distance between both ends 2002 and 2004, so that by means of the movement mechanism 104 the mutual distance between the fingers 100 can be suitably controlled, for instance by means of a suitable controller 2100 coupled to the actuator 1098, as is further shown in more detail in FIG. 41. According to the exemplary embodiment shown, starting from a retracted condition wherein the distance between the ends 2002, 2004 is minimal, the linear actuator 1098 can realize a closed condition of the fingers 100 wherein the mutual distance 130 is minimal, such as for instance shown in FIG. 35 or 38. Subsequently, by extending itself, that means increasing the distance of the movable end 2002 relative to the end 2002 attached to the carrier 106, the linear actuator 1098 can increase the mutual distance 130 between the fingers 100 via the movement mechanisms 104, such as for instance shown in FIGS. 36 and 39, until this distance becomes maximal and the opened condition of FIG. 37 or 40 is reached. In other words, controlling the movable end 2002 of the linear actuator 1098, via the movement mechanism 104 controls the mutual distance 130 between the fingers 100. It is clear that different embodiments of an actuator 1098 disposed on the carrier 106 capable of realizing such a functionality, are possible. According to alternative embodiments two or more actuators 1098 can be disposed, for instance one per finger. A linear actuator, such as for instance shown in the exemplary embodiments of FIGS. 29-41, however, is highly suitable as it allows a compact design of this actuator 1098. Such an actuator is also particularly suitable for cooperation with a movement mechanism 104, such as the rod mechanism similar to the embodiments shown. Furthermore it is clear that the actuator 1098 preferably is configured as lightweight and compact as possible and is disposed on the carrier 106 as close as possible to the position of the axis of rotation 120 in order to keep the inertia of the actuator 1098 during the fast picking motion as little as possible.

As can be seen in the exemplary embodiment shown in FIGS. 29-34, disposing the actuator 1098 on the carrier 106 allows to dispense with the cable drive 332, and the pulley 1094 and belt 1096, etc. coupled thereto in the exemplary embodiment of FIGS. 25-28. This offers the advantage that, as shown in FIGS. 29-34, according to that exemplary embodiment the basis 150 can be configured particularly compact, as one elongated leg, wherein the carrier 106 is bearing mounted on one side at the outer end 154 of the basis 150 for a rotation about the axis of rotation 120. This makes the gripper mechanism more compact, reducing the risk of interference and also making it more lightweight which is advantageous in carrying out a fast picking motion.

As can further be seen in the exemplary embodiment shown in FIGS. 29-34, the carrier 106, similar to the exemplary embodiment of FIG. 25, comprises a shaft 108 bearing mounted in the basis 150 so as to be rotatable and configured to allow the carrier 106 to rotate about the axis of rotation 120. As can be seen said shaft 108 is coupled to an actuator 1090 disposed on the basis via a suitable rod mechanism 1081 so that a wanted rotation of the carrier 106 about the axis of rotation 120 can be realized. It is clear that the rod mechanism 1081 functions similar to the belt drive described above. The advantage of such a parallel rod mechanism, configured for transmitting the rotary motion of the actuator 1090 about an axis of rotation parallel to the axis of rotation 120 to the shaft 108, is that when realizing a very fast picking motion the angular position of the carrier 106 can be controlled more accurately as such a rod mechanism is capable of realizing a more rigid coupling than a belt drive is. However, it is clear that alternative embodiments are possible, wherein, instead of the rod mechanism 1081 shown, a suitable belt drive, chain drive or any other suitable coupling mechanism can be utilized to couple the actuator 1090 of the drive 110 to the carrier 106, with the fingers 100 attached thereto, in order to control the wanted angular position about the axis of rotation 120.

As shown in FIG. 35, in the closed condition of the fingers the actuator 1098 is in an inserted condition, wherein a linearly movable plunger 2020 is in a retracted position in the housing 2010 of the actuator 1098. FIG. 36 shows a partially opened condition of the fingers 100, wherein the mutual distance 130 is larger than in FIG. 35, and wherein the movable plunger 2020 is in a position that is slightly more extended out of the housing 2010. FIG. 37 shows a position of the fingers 100 which in comparison with FIG. 36 is even further opened. The movable plunger 2020 is in that case slid slightly further out of the housing 2010. It is clear that for the exemplary embodiment shown with a linear actuator 1098, sliding the plunger 2020 in and out relative to the housing 2010, reduces and enlarges the distance between the end 2004 attached to the housing 2010 and the end 2002 of the actuator 1098 attached to the movable plunger 2020. The advantage of a linear actuator 1098 is that the actuator 1098 can be integrated in an easy and compact fashion into the shown rod mechanism of the movement mechanism 104, the coupling rods 1033, etc. Although alternative embodiments for the actuator 1098 are possible, such as for instance a suitable rotating actuator, etc. a linear actuator is particularly suitable for that purpose. It is clear that various alternative embodiments are possible for the linear actuator 1098, such as for instance a pneumatic actuator, a hydraulic actuator, an electromagnetic linear actuator, a piezoelectric linear actuator, etc. Preferably, the housing 2010 of the actuator 1098 is attached to the carrier 106, for instance to the end 2004 by means of suitable attachment means. As shown, the actuator is preferably disposed between the bearing points or hinge points 1031 of the rods 103 of the respective movement mechanisms 104 of the fingers 100, because in that way a compact construction is achieved. Although, as is the case in the embodiment shown, the movable plunger 2020 protrudes from the housing 2010 in a direction away from the fingers 100, which reduces the risk of interference with adjacent fruits, it is clear that alternative orientations of the actuator 1098 are also possible. Furthermore, it is clear that the actuator 1098 of the alternative embodiment shown in FIGS. 38-40 functions similar to what has been described above, wherein the end 2002 of the movable plunger 2020 is coupled to the movement mechanism 104 of the fingers 100 via coupling rods 1033, so that the movable plunger 2020 sliding in and out of the housing 2010 of the actuator 1098 controls the relative position of the fingers 100, so that the fingers 100 can suitably be opened and closed.

Figure 41:
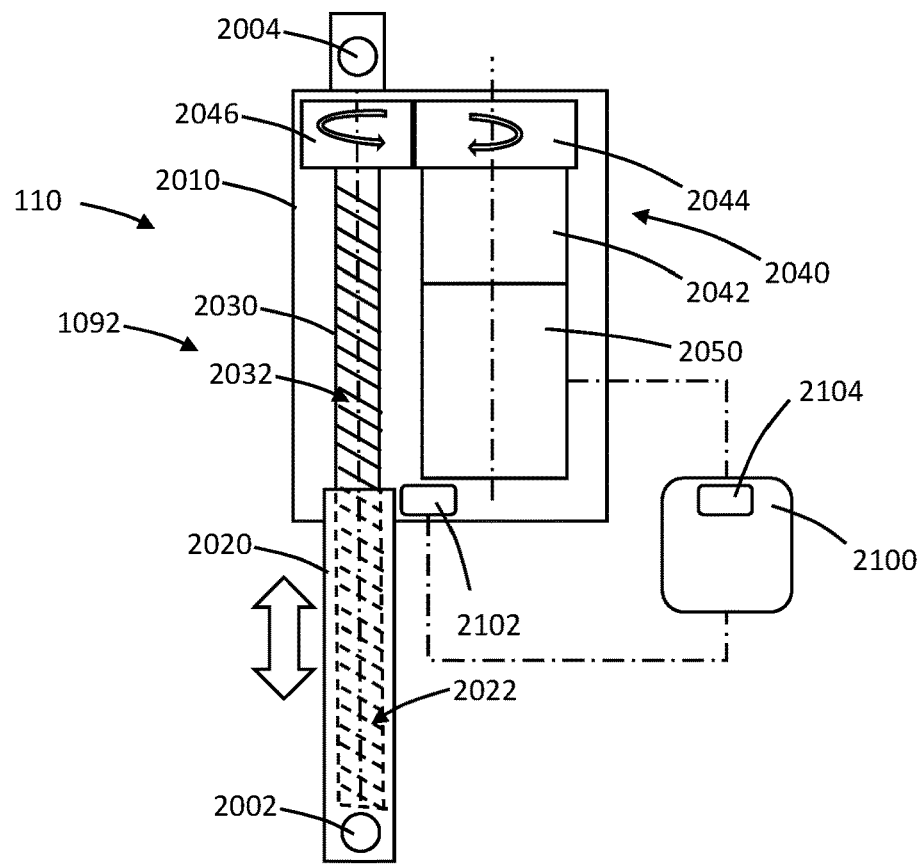

FIG. 41 shows a schematic partial cross-section of an advantageous embodiment of the linear actuator 1098 in more detail. According to the exemplary embodiment shown in FIG. 41, this actuator is a so-called linear actuator of the electromechanical type wherein a rotating electromagnetic motor 2050 is mechanically coupled for driving a lead screw 2030 in a rotating manner. At its exterior, said lead screw 2030 is provided with a suitable screw thread 2032, corresponding with internal screw thread 2022 disposed in the movable plunger 2020. The movable plunger 2020 is prevented from rotating by its hinging attachment to the coupling rods 1033 at the end 2002. As a result, a rotation of the lead screw 2030 will reciprocally move the movable plunger 2020 according to the central axis of rotation of the lead screw 2030. According to the condition as shown, this means up and down. It is clear that alternative embodiments are possible, and that typically, the housing 2010 comprises a suitable guide for the movable plunger 2020. According to the exemplary embodiment shown, the actuator 1098 further comprises a suitable reduction 2040 disposed between the lead screw 2030 and the motor 2050. Said reduction for instance comprises a number of coupled toothed wheels which by means of the mutual relation in the number of teeth convert the number of revolutions of the motor 2050 in a smaller number of revolutions of the lead screw 2030. According to the exemplary embodiment of FIG. 41, the actuator 1098 for that purpose comprises a suitable gearbox 2042 and toothed wheels 2044, 2046 coupled thereto. The reduction thus realized has a ratio in the range of 1/100 to 1/10 inclusive, for instance in the range of 1/50 to 1/20 inclusive. Such a reduction allows making use of a small, fast rotating motor 2050 that can be configured lightweight as the reduction reduces the torque that has to be delivered by the motor. Such a lightweight motor is advantageous as it reduces the contribution of the actuator to the mass of the gripper, which is advantageous for the energy consumption when in a fast gripper motion, large accelerations have to be realized. Furthermore, it is also clear that the actuator 1098 is disposed centrally, as close to the axis of rotation 120 as possible, so that the inertia of the gripper mechanism is also reduced, which is advantageous in fast, varying movements around this axis of rotation 120. Furthermore it is also advantageous, as for instance shown in FIGS. 29-34, that the actuator 1098, but also the actuator 1090, is disposed near the axis of rotation 170, in other words that the axis of rotation 170 intersects with these actuators, wherein the same advantages are realized in case of fast, varying movements around this axis of rotation 170.

As is further schematically shown in FIG. 41, the actuator 1098 is suitably coupled to a controller 2100 configured for controlling the actuator 1098 for carrying out the method for picking a fruit from a plant similar to what has been described above. As will now be described in more detail, it is a fact that according to the embodiments shown in FIGS. 29-40, the actuator 1098 advantageously fulfills the function of the force determining drive element 310 as well as the function of the position determining drive element 320. Similar to what has been described above, the controller 2100 is configured for, during the clamping stage 204, controlling the actuator 1098 as force determining drive element 310, wherein in a suitable manner the fingers 100 are moved towards the fruit 2 to be clamped for clamping the fruit 2, wherein a specific maximum clamping force is not exceeded. According to the exemplary embodiment shown this is realized with a suitable sensor 2104 that is coupled or integrated in the controller 2100. Such a sensor 2104 is configured for generating a signal that is representative of the force exerted by the fingers 100. The sensor 2104 may for instance directly measure said force at or on the fingers, at or on the movement mechanism, at or on the actuator or parts thereof, for instance by means of suitable sensors such as resistance strain gauges, pressure sensors, etc. However, an advantageous embodiment of the sensor 2104 is capable of generating a signal representative of the force exerted on the fingers 100 by measuring the current or power supplied to the motor 2050 of the actuator 1098 during the clamping stage 204. The controller 2100 can then be configured such that during the clamping stage 204, the motor 2050 of the actuator 1098 is controlled such that a specific maximum current or a specific maximum power is not exceeded, so that the resulting force of the fingers 100 during the clamping stage 204, in particular when clamping the fruit, cannot exceed the maximum clamping force. This can for instance be realized by providing the controller 2100 with a specific threshold value for the current or power that is permitted to be supplied to the actuator 1098 during the clamping stage 204, by during the clamping stage 204 letting the controller 2100 monitor the supplied current or the supplied power by means of a suitable sensor 2104, and by configuring the controller 2100 such that during the clamping stage 204 the current or power supplied to the actuator 1098 does not exceed said threshold value. It is clear that as will be described in more detail below, the controller 2100 preferably comprises a suitable processor, memory, storage means, input and output ports, communication interfaces etc., wherein as a person skilled in the art knows the memory comprises programming instructions which, when executed by the processor, allow the controller 2100 to control the actuators of the gripper device 10 in a suitable manner.

It is clear that according to alternative embodiments the actuator 1098 is controlled by a suitable controller 2100 such that the driving force is limited to a specific maximum value, for instance by limiting the current or the power for the actuator 1098 to a specific maximum value. According to another alternative embodiment, the actuator 1098 can be selected such that its maximum driving force is limited to a specific maximum force ensuring that the resulting clamping force in the fingers does not exceed the maximum clamping force. According to further alternative embodiments, the actuator 1098 can be controlled by a controller 2100 in order for one or more sensors 2104 for measuring the clamping force of the fingers 100, which sensors are coupled to the controller, to register a clamping force is that does not exceed the maximum clamping force or the fingers 100 to suitably contact the fruit 2 to be picked. In the exemplary embodiment shown one actuator 1098 is coupled to both fingers 100, however, alternative embodiments are possible wherein the drive comprises one or more actuators that are suitably coupled to one or more fingers 100.

According to the exemplary embodiment shown in FIG. 41, the actuator 1098 of the drive 110 is configured as an electromagnetic actuator 1098. Such an embodiment of the actuator 1098, in particular when use is made of a suitable screw thread form and pitch angle for the screw thread 2022, 2032 of the lead screw 2030 and the movable plunger 2030, can have a static load capacity that is sufficiently high to prevent a mutual movement of the fingers 100, even when a force exceeding a specific maximum clamping force is exerted on one or more of the fingers 100. A suitable screw thread form is for instance trapezoidal screw thread, such as for instance screw thread known as Acme screw thread according to the US standard ASME/ANSI B1.5-1997, or for instance trapezoidal screw thread according to the German standard DIN 103, or any other suitable screw thread form. A suitable pitch angle for the screw thread for instance is a pitch angle in the range of 3° to 60° inclusive, for instance 10° to 45° inclusive, for instance 20° or 30°. It is clear that such a linear electromagnetic screw actuator 1098 has a static load capacity, that means that when the motor 1050 stops, the actuator 1098 blocks on the spot and is capable of resisting a specific load or force that either pulls at or presses onto the actuator 1098. The screw thread form and pitch angle described above for the screw thread of the lead screw 2030 and the movable plunger 2020 result in a high static load capacity. That means that during at least a part of the removal stage 206, the actuator 1098 can be controlled as a position determining drive element 320, similar to what has been described above. Similar to the selective blocking elements described above this allows to prevent a mutual movement of the fingers 100 during at least a part of the removal stage 206, even when a force exceeding the specific maximum clamping force is exerted on the fingers 100. The exemplary embodiment shown of the actuator 1098 realizes this in a simple fashion by being configured with a suitable static load capacity, as a result of which the energy consumption of the actuator 1098 can be reduced during this part of the removal stage 206. The static load capacity of the embodiment of the actuator, furthermore allows to dimension the motor 2050 of the actuator 1098 small, as the configuration of the screw thread 2022, 2032 described above allows to absorb any forces that are larger than the maximum clamping force during the part of the removal stage 206 wherein the relative position of the fingers 100 and/or the position of the fingers 100 relative to the carrier 106 remains constant, without a force or power having to be supplied by the motor 2050 of the actuator 1098. This for instance allows to dimension the motor 2050 such that the actuator 1098 is only capable of delivering the wanted maximum clamping force. When subsequent thereto during a fast tilting motion of the fingers about the axis of rotation 120 as described above during the removal stage, the fingers 100 are exposed to forces that are larger than this maximum clamping force, sufficient static load capacity of the actuator 1098 will ensure that the mutual distance 130 of the fingers 100 does not increase, does not decrease, and/or remains constant, similar to what has been described above, without the necessity of additional blocking elements having to be provided. It is clear that according to an advantageous embodiment, upon activation of the actuator 1098 as position determining drive element 320, the controller 2010 is able to control the actuator 1098 very easily, namely by no longer providing current or power to the actuator 1098, as a result of which the braking and/or blocking operation related to the static load capacity of the linear actuator 1098 is activated. In addition, or according to an alternative embodiment, the controller 2100 can also make use of a suitable sensor 2102 for measuring the position of the movable plunger 2020, which sensor is coupled to the controller 2100. This allows the controller, for instance during at least a part of the removal stage 206, to control the actuator 1098 as a position determining drive element 320 which upon activation is controlled to prevent a movement of the movable plunger 2020, and therefore a mutual movement of the fingers 100, in particular in a direction away from the clamped fruit 2. If during this part of the removal stage 206, wherein for instance as a result of the fast tilting motion about the axis of rotation 120 and/or other movements of the gripper mechanism 10, the fingers 100 are exposed to forces that are larger than the specific maximum clamping force, the position sensor 2012 detects a change in the position of the movable plunger, the controller 2100 will control the motor 2050 of the actuator 1098 such that these changes are undone even if the actuator 1098 has to generate a force exceeding the maximum clamping force in order to do so.

Clearly, further alternative embodiments are possible, wherein for instance the static load capacity of the actuator 1098 is supplemented by blocking elements similar to what has been described above, such as for instance an electromagnetic braking system, which when activated places a brake pad against the drive nut to exert additional friction on the lead screw 2030, a switchable blocking element that selectively interferes with the toothed wheels of the reduction 2040, etc.

According to an alternative embodiment, for instance one or several actuators can be used which are suitably coupled to the fingers 100 or to a movement mechanism coupled to the fingers. Said actuators can then for instance be controlled by a suitable controller such that their driving force is limited to a specific maximum value. According to yet another alternative embodiment, the one or more actuators can be selected such that their maximum driving force is limited to a specific maximum force ensuring that the resulting clamping force in the fingers does not exceed the maximum clamping force. According to yet further alternative embodiments, the force determining drive elements 310 of the drive 110 may comprise one or several actuators that are controlled by a controller in order for one or more sensors for measuring the clamping force of the fingers 100, which sensors are coupled the controller, to register a clamping force that does not exceed the maximum clamping force or the fingers to suitably contact the fruit 2 to be picked.

It is clear that further alternative embodiments are possible, wherein similar to the exemplary embodiment described above, one or more electromechanical linear actuators 1098 of the drive 110 are controlled during the clamping stage 204 as one or more force determining drive elements 310 and during at least a part of the removal stage 206 are controlled as one or more position determining drive elements 320.

Therefore it is clear that, as described in more detail above, the drive 110 comprises position determining elements 320 in the form of a suitable actuator 1098 such as for instance an electromagnetic actuator such as a solenoid, or an electromagnetic actuator 1098 such as the linear actuator 1098 including movable plunger 2020, with which the mutual position of the fingers 100 can selectively be decelerated, blocked or prevented, or preferably their mutual distance increasing is at least prevented, even when a force exceeding the specific maximum clamping force is exerted on one or more of the fingers 100. In this way it is ensured that during carrying out the removal stage 206, the mutual position of the fingers 100 does not impermissibly change, in particular during carrying out a fast tilting motion about the axis of rotation 120 to remove the fruit 2 to be picked from the plant 3 fast and efficiently. There is a risk then that the fingers 100 are subjected to accelerations and consequently forces that exceed the above-mentioned maximum clamping force, and therefore the risk that the mutual distance 130 between the fingers 100 could impermissibly increase, which could result in the risk of the fruit 2 not being sufficiently clamped by the fingers 100 during the removal stage 206 or subsequent thereto, which in turn might give cause for damage to the fruit 2 or the fruit being lost. It is also clear then that for instance the reactive force of the stalk 4 during the part of the removal stage 206 up until the fruit 2 is removed from the stalk or a portion thereof, is absorbed by the fingers 100, and that this reactive force during at least a part of the removal stage can also give cause for exposing the fingers 100 to a force that is larger than the maximum clamping force. The position determining elements 320 described above of the drive 110, ensure that these forces as well can be withstood without the risk that the distance 130 between the fingers 100 would increase in an impermissible manner. In that way a very fast picking motion can be carried out reliably as during the removal stage 206 and even subsequent thereto the fingers can be exposed to accelerations generating forces that are larger than the maximum clamping force, without a reliable clamping of the fruit being compromised. By means of the force determining drive elements 310, the method and apparatus described above further reduce the risk of damage to the fruit 2 as during the clamping stage 204 the fingers 100 are controlled such that the maximum clamping force is not exceeded.

Figure 42:
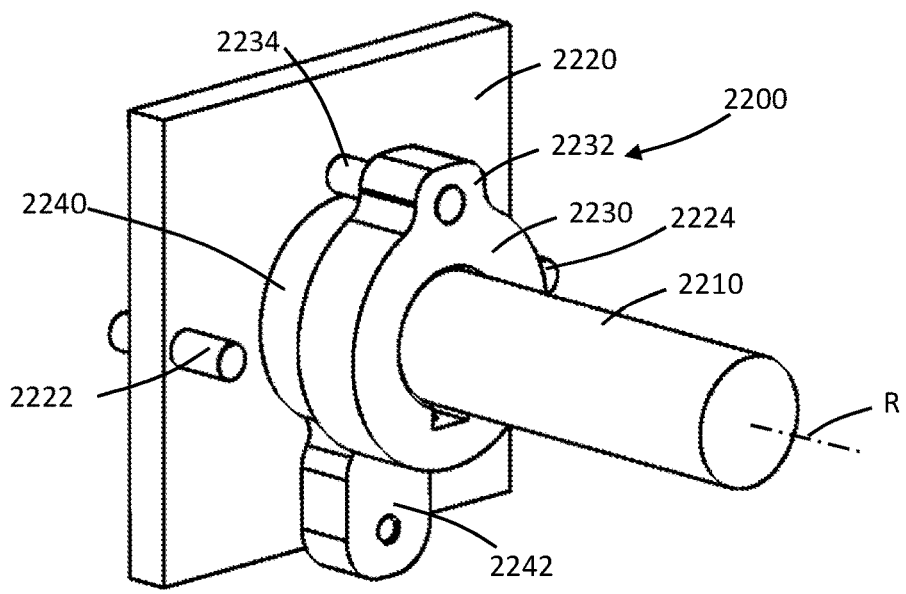

FIGS. 42-51 show and embodiment of an advantageous robust and simple rotation limiter 2200 for a rotating drive shaft 2210 of a rotating actuator, for instance a rotating actuator similar to what has been described above in relation to the gripper device 10 as described above, wherein a limited angular displacement of over 360° can be realized. This is particularly advantageous for allowing a limited movement at an angular displacement around an axis of rotation R of over 360° without additional transmissions such as gear wheel transmissions, belt transmissions, etc. needing to be utilized between the rotating drive shaft 2210 of an actuator and an element to be driven of a device. For the gripper device 10 described above, this is especially advantageous in realizing a limited angular displacement of over 360° about for instance one or more of the axes of rotation 120, 140, 170, . . . by means of one or more of the actuators 1090, 1098, 176, . . . . However, it is clear that alternative embodiments are possible, wherein such a rotation limiter 2100 can be utilized. FIG. 42 shows a view with an angular position of the rotating drive shaft 2210 corresponding to the angular position of FIGS. 43 and 47 and which will be considered a reference angular position of 0° on the basis of a simple description of the operation of the exemplary embodiment shown. As can be seen, the rotation limiter 2100 comprises a revolving stop element 2230 and is secured to the axis of rotation, the stop element 2230 comprising a radial protrusion 2232 extending transverse to the axis of rotation. An axial pin 2234 is attached to the radial protrusion 2232 which pin, parallel to the central axis of rotation R of the rotating drive shaft 2210, protrudes from the revolving annular stop element 2230 in the direction of a freely rotating stop element 2240 that is disposed next to the revolving stop element 2230 so as to be rotatable about the rotating drive shaft 2210. It is clear that the freely rotating stop element 2240 also comprises a radial protrusion which, as will be described in more detail below, is configured for interfering with the axial pin 2234. The rotation limiter further comprises two rotating stops 2222 and 2224, which as will be described in more detail below, limit the angular displacement of the rotating drive shaft 2210 on either side. According to the exemplary embodiment shown, the angular displacement is limited between −220° and +220° relative to the 0° reference position as shown in FIG. 42, or in other words the rotating drive shaft 2210 is able to move in a range of 440°. It is clear that alternative embodiments are possible wherein the rotating stops 2222 and 2224 are arranged at alternative angular positions relative to drive shaft so that a different range of over 360° can be realized. It is clear that the stops 2222 and 2224 are configured such that they only interfere with the radial protrusion 2242 of the freely rotating stop element 2240, and therefore not with the radial protrusion 2232 or the axial pin 2234 of the revolving stop element 2230. According to the exemplary embodiment shown, the distance from the stops 2222 and 2224 to the axis of rotation R is larger than the distance along which the radial protrusion 2232 extends, but smaller than the distance along which the radial protrusion 2242 extends, wherein as a consequence the radial protrusion 2242 of the freely rotating stop element 2240 extends along a larger distance to the axis of rotation R than the radial protrusion 2232 of the revolving stop element 2230 does. The stops 2222, 2224 may for instance be attached to the housing 2220 of the rotating actuator or to another suitable housing 2220 defining a fixed limitation to the angular displacement of the drive shaft 2210.

Figure 43:
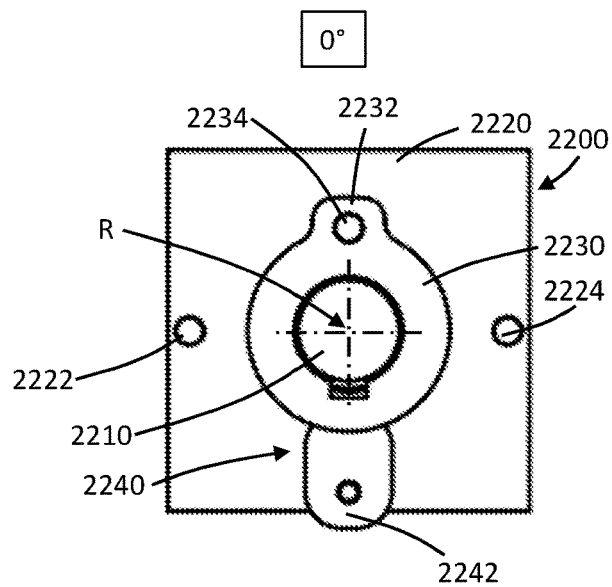
Figure 44:
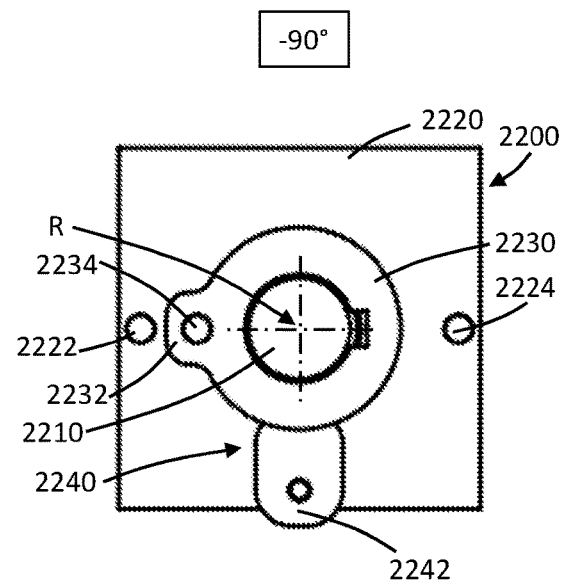
Figure 45:
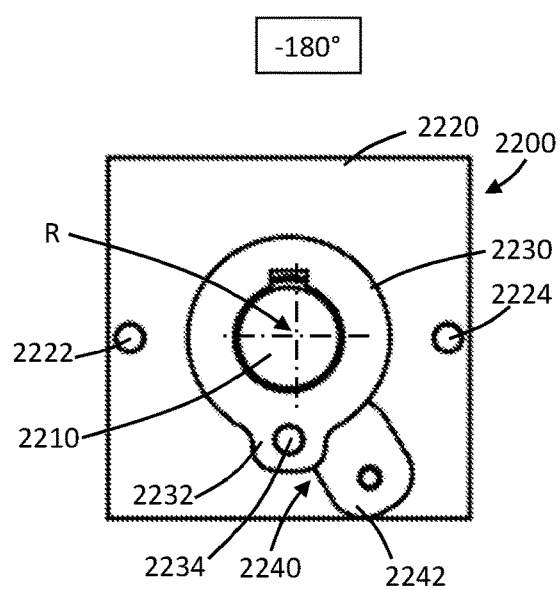
Figure 46:
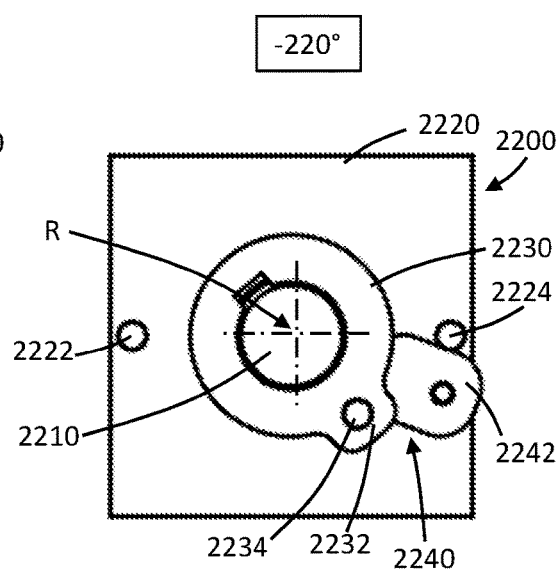
Figure 47:
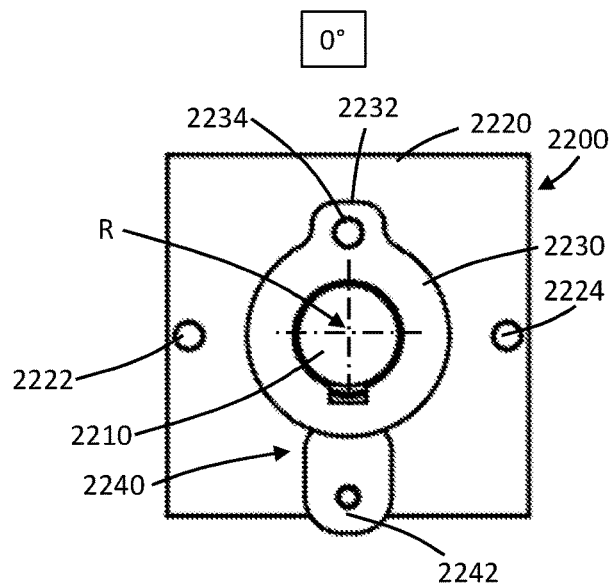
Figure 48:
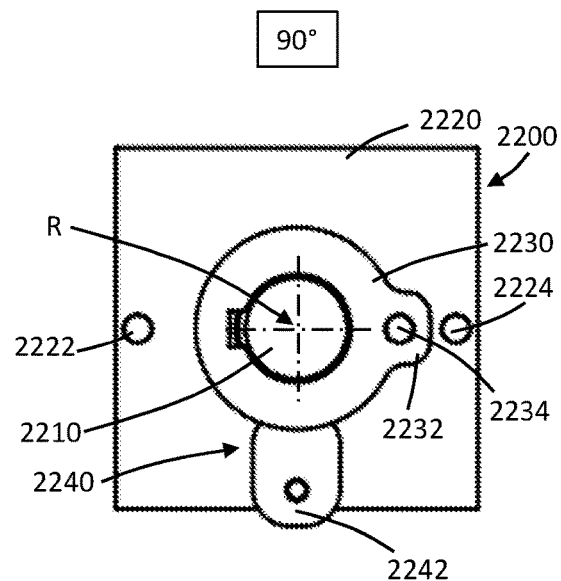
Figure 49:
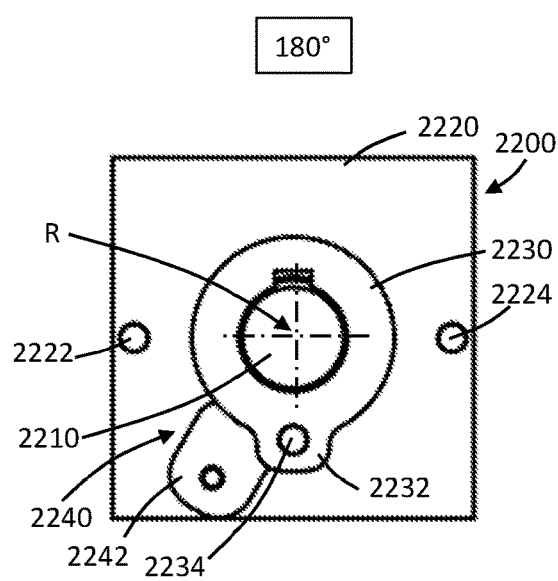
Figure 50:
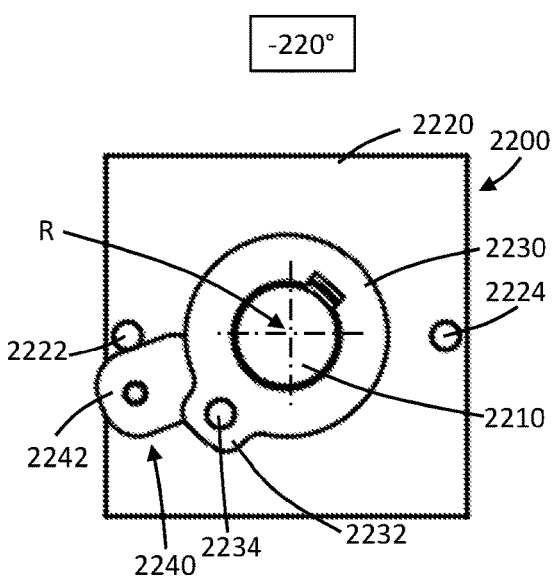
Figure 51:
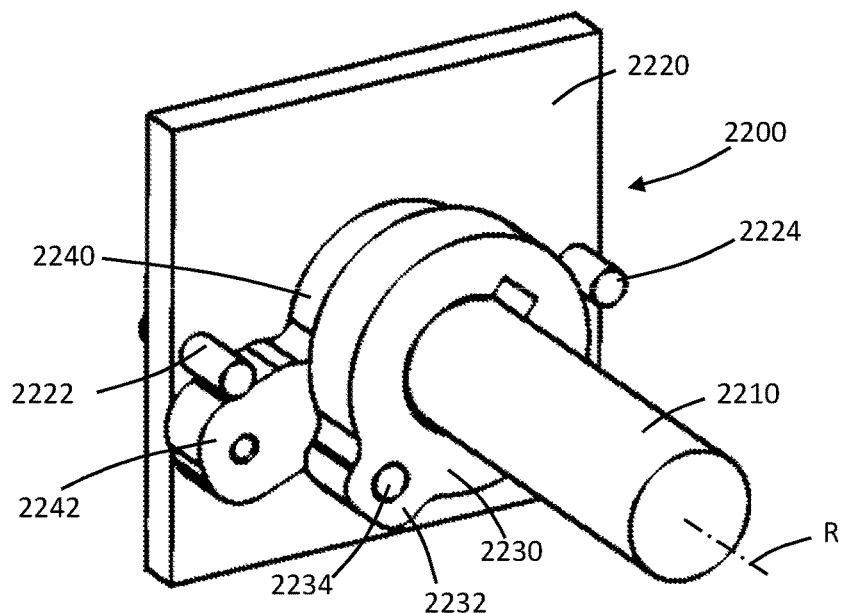

The operation of this embodiment of the rotation limiter 2200 will now be further elucidated on the basis of FIGS. 43-46 in case of an anticlockwise angular displacement, wherein the condition in case of an angular displacement of 0°, −90°, −180° and −220°, respectively, relative to the reference position in FIG. 43 is shown. As can be seen in FIG. 44, the revolving stop element 2030 can move past the stop 2222 without interference. Subsequently, the axial pin 2234, as can be seen in FIG. 45, interferes with the radial protrusion 2242 of the rotatable stop element 2242 as a result of which this rotatable stop element 2242 is taken along for an onward anticlockwise rotation by the revolving stop element 2230. Subsequently, as shown in FIG. 46, upon an angular displacement of −220° the radial protrusion 2242 of the rotatable stop element 2240 interferes with the stop 2224 as a result of which the drive shaft 2210 is stopped and consequently limited via the revolving stop element 2230. In a similar manner FIGS. 47-50 show how a clockwise angular displacement from the reference position of 0° shown in FIG. 47 is limited. As can be seen in FIG. 48, in case of an angular displacement of 90°, the revolving stop element 2030 can move past the stop 2224 without interference. Subsequently, as can be seen in FIG. 49, in case of an angular displacement of 180°, the axial pin 2234 interferes with the radial protrusion 2242 of the rotatable stop element 2242 as a result of which this rotatable stop element 2242 is taken along for an onward clockwise rotation by the revolving stop element 2230. Subsequently, as shown in FIG. 50, in case of an angular displacement of 220° the radial protrusion 2242 of the rotatable stop element 2240 interferes with the stop 2222 as a result of which the drive shaft 2210 is stopped and consequently limited via the revolving stop element 2230. FIG. 51 shows a view in perspective of the angular position corresponding to FIG. 50.

Figure 52:
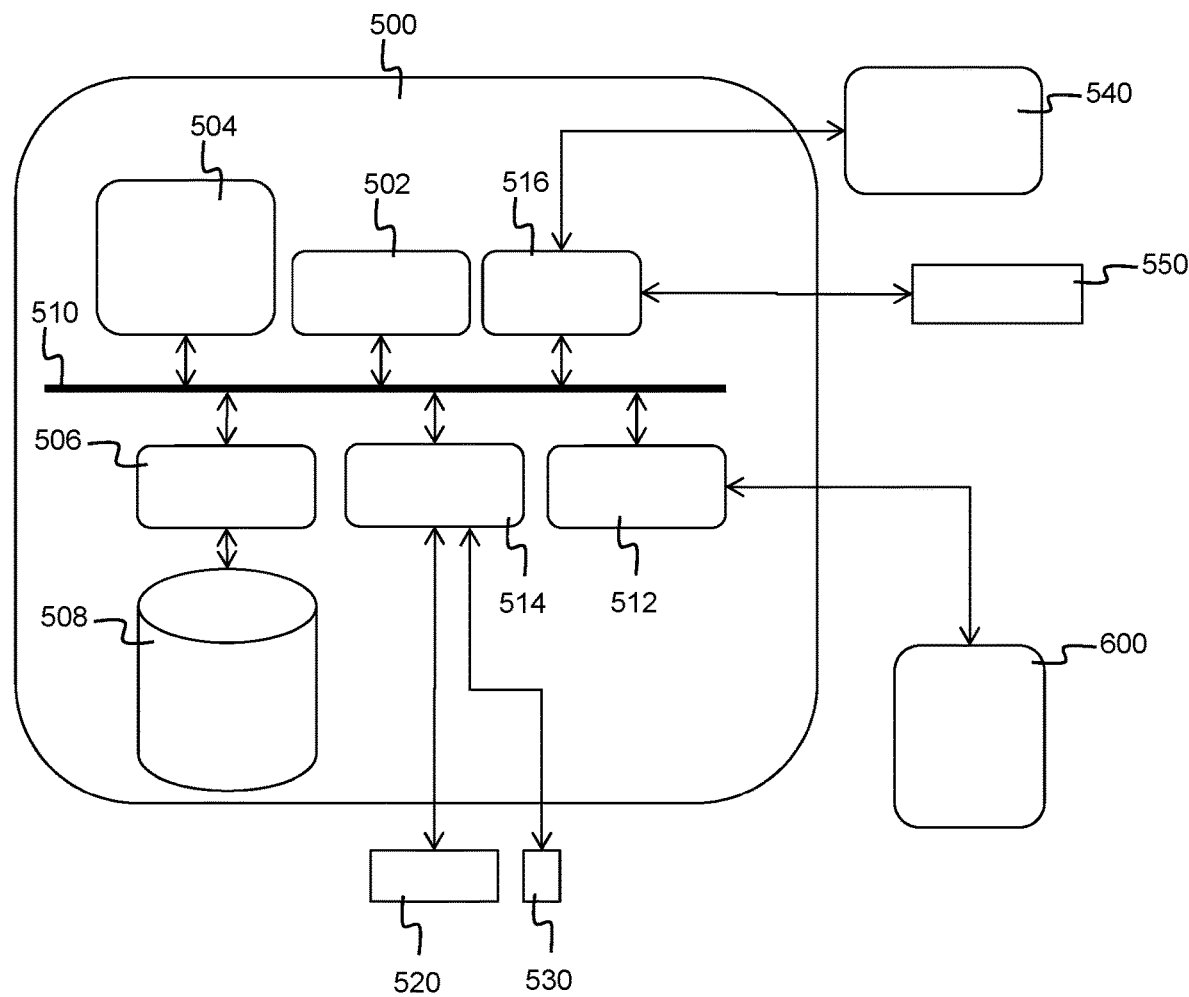

FIG. 52 shows a suitable computer system 500 for implementing the controller or the operating system 2100 for the method and the apparatus for automatically picking a fruit as described above. The computer system 500 may in general be formed as a suitable computer system, such as for instance an industrial computer system, a micro-controller system, a controller for a motor control, etc. and for instance comprises a bus 510, a processor 502, a local memory device 504, one or more optional input interfaces 514, one or more optional output interfaces 516, a communication interface 512, an interface for storage elements 506 and one or more storage elements 508. Bus 510 may comprise one or more guides allowing communication between the various components of the computer system. Processor 502 may comprise a generally known type of processor or microprocessor interpreting and executing programming instructions. Local memory device 504 may comprise a random access memory (RAM) or another suitable type of dynamic memory storage device storing information and instructions for execution by the processor 502 and/or a read only memory (ROM) or another suitable type of static memory storage device storing information and instructions for use by the processor 504. Input interface 514 may comprise one or more interfaces for receiving signals from an input element such as for instance a sensor, operation interfaces, etc., however it may also comprise one or more conventional mechanisms allowing the operator to enter information in the computer system 500 such as for instance a keyboard 520, a mouse 530, etc. Output interface 516 may comprise one or more output mechanisms for controlling for instance actuators, elements for displaying messages or warning signals, etc., however it may also comprise conventional mechanisms displaying output information to the operator, such as for instance a display 540, a printer 550, a speaker, etc. Communication interface 512 may comprises a suitable transceiver mechanism, such as for instance industrial or conventional network interfaces allowing the computer system 500 to communicate with other devices or systems for instance with one or more other computer systems 600 for instance of the apparatus itself, of other devices or of a management system. The communication interface 512 of computer system 500 may for instance be connected in a suitable manner with a communication network such as for instance a local area network (LAN) or a wide area network (WAN), such as for instance the internet. The interface for storage elements 506 may comprise a known storage interface such as a Serial Advanced Technology Attachment (SATA) interface or a Small Computer System Interface (SCSI) for connecting bus 510 to one or more storage elements 508, such as for instance local drives, for instance 1TB SATA hard drives, and for controlling reading and writing of data to and/or from these storage elements 508. It is clear that alternative storage elements 508, generally any suitable computer readable medium such as for instance a removable magnetic drive, SSDs, flash-based storage devices, optical drives, ROM drives, etc. can be used. Furthermore, it is also clear that network-based storage means can be accessed via the network interface. The embodiments of the method for automatically picking a fruit using an apparatus as described above, can be implemented as programming instructions that are loaded into the local memory device 504 of computer system 500 for execution by its processor 502. Said programming instructions can for instance be loaded from a storage element 508 or be made accessible from another computer system 600 through the communication interface 512.

It is clear that further combinations and different embodiments are possible without deviating from the scope of protection as defined in the claims.

The invention claimed is:

1. A method for automatically picking a fruit from a plant using an apparatus comprising a gripper mechanism comprising two or more mutually movable fingers, the method comprising:
    an approach stage wherein the gripper mechanism is put into a clamping position, wherein the fingers are positioned next to the fruit to be picked for a subsequent clamping of the fruit to be picked;
    a clamping stage wherein, while the gripper mechanism is in the clamping position, the fingers are mutually moved towards the fruit to be picked until they clamp the fruit; and
    a removal stage wherein the fruit clamped in the fingers is removed from the plant,
    wherein during the clamping stage, the fingers are moved such that a specific maximum clamping force is not exceeded; and
    during at least a part of the removal stage, the mutual position of the fingers with respect to each other is controlled by one or more selective blocking elements of a drive such that a distance between the fingers does not increase, even when a force exceeding the specific maximum clamping force is exerted on one or more of the fingers;
    wherein the one or more selective blocking elements are separate from the drive and arranged to be selectively activated and deactivated; and
    wherein, upon activation, the one or more selective blocking elements selectively prevent movement of the fingers, and wherein upon deactivation, the one or more selective blocking elements are arranged to permit movement of the fingers.

2. The method according to claim 1, wherein during at least a part of the removal stage the mutual position of the fingers is controlled by the drive such that the distance between the fingers does not decrease, even when a force exceeding the specific maximum clamping force is exerted on one or more of the fingers.

3. The method according to claim 1, wherein during at least a part of the removal stage the mutual position of the fingers is controlled by the drive such that the distance between the fingers remains constant, even when a force exceeding the specific maximum clamping force is exerted on one or more of the fingers.

4. The method according to claim 1, wherein during the clamping stage, movement of the fingers is controlled by the drive such that:
    the maximum clamping force is not exceeded and a specific minimum clamping force, that is lower than the maximum clamping force, is exceeded; and/or
    contact is made with the fruit to be picked.

5. The method according to claim 1, wherein during the clamping stage, mutual movement of the fingers is controlled by the drive, which comprises one or more of the following force determining drive elements, to move the fingers mutually in a direction of the fruit to be picked:
    an elastic element limiting the driving force to a specific maximum force that is lower than the maximum clamping force;
    one or more actuators that are controlled in order for driving force to be limited, or one or more actuators having a maximum driving force that is limited to a specific maximum force on the basis of the maximum clamping force of the fingers;
    one or more actuators that are controlled by a controller in order for one or more sensors for measuring the clamping force of the fingers, which sensors are coupled to the controller, to register a clamping force that does not exceed the maximum clamping force.

6. The method according to claim 5, wherein during at least a part of the removal stage the mutual movement of the fingers is controlled by the drive which further comprises one or more position determining drive elements which, during this part of the removal stage, are activated to limit the mutual movement of the fingers in a direction away from the clamped fruit.

7. The method according to claim 6, wherein the drive comprises
    one or more actuators which upon activation are controlled in order for their driving force to suffice for preventing a mutual movement of the fingers, even when a force exceeding the specific maximum clamping force is exerted on one or more of the fingers.

8. The method according to claim 6, wherein during the clamping stage the drive is controlled such that the one or more position determining drive elements are switched off in order for the mutual movement of the fingers to be determined by the force determining drive elements; and/or
    wherein the drive comprises one or more electromechanical linear actuators that have a static load capacity that is sufficiently high for preventing a mutual movement of the fingers, even when a force exceeding the specific maximum clamping force is exerted on one or more of the fingers, and
    wherein the one or more electromechanical linear actuators;
    during the clamping stage, are controlled as one or more of the force determining drive elements; and
    during at least a part of the removal stage, are controlled as one or more of the position determining drive elements.

9. The method according to claim 1, wherein, after removal of the fruit from the plant, during a part of the removal stage and/or subsequent thereto, the drive is controlled such that mutual movement of the fingers is no longer prevented.

10. The method according to claim 9, wherein after removing the fruit from the plant, during a part of the removal stage and/or subsequent thereto, the drive is controlled such that one or more position determining drive elements are switched off in order for the mutual movement of the fingers to be no longer prevented.

11. The method according to claim 1, wherein:
during the approach stage, by an upward motion, from an approach position below a bottom end of the fruit, the fingers are put into the clamping position; and
wherein as early as in the approach position, considered from above, the fruit is in at least partial overlap with a space situated in between at least two of the fingers.

12. The method according to claim 1, wherein:
during at least a part of the removal stage, the fingers are rotated eccentrically about an axis of rotation; and/or
the gripper mechanism comprises a cutting element, wherein the cutting element is able to selectively contact the stalk of the fruit.

13. The method according to claim 1, wherein the method is used for picking one or more of the following fruits, including false fruits:
strawberries;
tomatoes;
raspberries;
blackberries;
kiwi fruits;
the *Capsicum annuum* species;
the *Cucumis sativus* species;
the genus *Rubus*;
the genus *Vaccinium*;
the genus *Ribes*.

14. The method according to claim 1, wherein during the clamping stage and/or the removal stage the fingers are positioned such that they clamp the fruit with a contact surface in a top quadrant and an opposing bottom quadrant of the fruit.

15. The method according to claim 14, wherein during the clamping stage and/or the removal stage the fingers are positioned such that the fruit remains free in another top quadrant.

16. The method according to claim 14, wherein during the clamping stage and/or the removal stage the fingers are positioned such that they only clamp the fruit with a contact surface in the top quadrant and an opposing bottom quadrant of the fruit.

17. The method according to claim 14, wherein during the clamping stage and/or the removal stage the fingers are positioned such that the fruit remains free in both other quadrants.

18. An apparatus for automatically picking a fruit from a plant, the apparatus comprising a gripper mechanism comprising two or more mutually movable fingers and a drive,
wherein the drive comprises a force determining drive element that is configured such that, during a clamping stage, the fingers are moved such that a specific maximum clamping force is not exceeded;
and a position determining drive element that is configured such that, during at least a part of a removal stage, the mutual position of the fingers with respect to each other is controlled by one or more selective blocking elements of the drive such that a distance between the fingers does not increase, even when a force exceeding the specific maximum clamping force is exerted on one or more of the fingers;
wherein the one or more selective blocking elements are separate from the drive and configured to be selectively activated and deactivated; and
wherein, upon activation, the one or more selective blocking elements selectively prevent movement of the fingers, and wherein upon deactivation, the one or more selective blocking elements are arranged to permit movement of the fingers.

19. The apparatus according to claim 18, wherein the drive:
comprises one or more force-determining drive elements configured for, during the clamping stage, moving the fingers mutually in a direction of the fruit to be picked in order for the maximum clamping force not to be exceeded;
comprises one or more position determining drive elements, which are activated during at least a part of the removal stage, for limiting mutual movement of the fingers in a direction away from the clamped fruit, even when a force exceeding the specific maximum clamping force is exerted on one or more of the fingers.

20. The apparatus according to claim 19, wherein
one or more of the force-determining drive elements comprises an elastic element configured for providing or limiting the clamping force for the fingers; and/or
one or more of the position determining drive elements comprises one or more of the following elements:
one or more Bowden cables of which a housing and cable are coupled to two mutually movable fingers, respectively, and a selective coupling which is configured for upon activation preventing a movement of the cable relative to the housing and when switched off allowing a movement of the cable relative to the housing; and
one or more clamping elements disposed on the gripper mechanism so as to be selectively activated, which clamping elements are configured for preventing a mutual movement upon activation of one or more mutually movable fingers; and/or
wherein the drive comprises one or more electromechanical linear actuators that have a static load capacity that is sufficiently high for preventing a mutual movement of the fingers, even when a force exceeding the specific maximum clamping force is exerted on one or more of the fingers, and wherein the one or more electromechanical linear actuators:
during the clamping stage are controlled as one or more force determining drive elements; and
during at least a part of the removal stage are controlled as one or more position determining drive elements.

21. The apparatus according to claim 18, wherein the gripper mechanism comprises the following:
a carrier to which the at least two mutually movable fingers are attached;
a basis to which the carrier is bearing mounted so as to be rotatable about a substantially horizontal axis of rotation; and
wherein the fingers are disposed on the carrier so as to be mutually movable via a movement mechanism; and
wherein the gripper mechanism is configured for rotating the carrier about the axis of rotation during at least a part of the removal stage.

22. The apparatus according to claim 21, wherein the gripper mechanism further comprises little arms configured for attaching the fingers on the carrier such that at least during the clamping stage the fingers contact the fruit at a position above the carrier, and/or
wherein the movement mechanism, for at least one of the fingers comprises a rod mechanism including one or more rods which at one end are bearing mounted to a point of rotation on the carrier and at an opposite end are bearing mounted to a point of rotation on the finger,
wherein the points of rotation of the rods have an axis of rotation that is parallel to the axis of rotation of a bearing of the carrier in the basis;

the fingers are configured such that during the clamping stage and/or the removal stage they are positioned such that they clamp the fruit with a contact surface in a top quadrant and an opposing bottom quadrant of the fruit; and wherein one or more points of rotation of the one or more rods at the end of the finger with a contact surface in the top quadrant of the fruit, are also situated in said top quadrant.

23. The apparatus according to claim 18, wherein:

a cutting element is disposed on at least one of the fingers in order for during at least a part of the removal stage the cutting element getting into contact with the stalk of the fruit; and/or a gripper device comprises a cutting element, configured for selectively getting into contact with the stalk of the fruit; and/or the gripper device comprises a cutting element, configured for, during performing a plurality of picking motions:

during at least one or more picking motions getting into contact with the stalk of the fruit; and during at least one or more picking motions not getting into contact with the stalk of the fruit.

24. The apparatus according to claim 23, wherein:

the cutting element is configured for being retracted into the finger and to be moved to an outside of the finger during a part of the removal stage only; and/or wherein in at least one of the fingers a notch is disposed at the extreme end, and wherein the cutting element is disposed retracted relative to the extreme end, wherein the notch is configured such that during performing the picking motion the stalk of the fruit can be guided to the cutting element via the notch.

25. The apparatus according to claim 18, wherein the one or more selective blocking elements comprise at least one of the following:

a solenoid arranged to clamp a plate against a carrier to which the at least two mutually movable fingers are attached;

one or more blocking pins; or one or more ratchet mechanisms.

* * * * *